US011706397B2

(12) United States Patent
Hur et al.

(10) Patent No.: US 11,706,397 B2
(45) Date of Patent: *Jul. 18, 2023

(54) METHOD AND APPARATUS FOR OVERLAY PROCESSING IN 360 VIDEO SYSTEM

(71) Applicant: LG ELECTRONICS INC., Seoul (KR)

(72) Inventors: Hyejung Hur, Seoul (KR); Sejin Oh, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,923

(22) Filed: Feb. 3, 2022

(65) Prior Publication Data

US 2022/0159232 A1    May 19, 2022

Related U.S. Application Data

(63) Continuation of application No. 16/556,156, filed on Aug. 29, 2019, now Pat. No. 11,277,599.

(30) Foreign Application Priority Data

Oct. 2, 2018  (KR) .................. 10-2018-0117716

(51) Int. Cl.
  *H04N 13/133*  (2018.01)
  *H04N 13/161*  (2018.01)
  (Continued)

(52) U.S. Cl.
  CPC ......... *H04N 13/183* (2018.05); *H04N 13/133* (2018.05); *H04N 13/161* (2018.05); *H04N 13/178* (2018.05); *H04N 13/282* (2018.05)

(58) Field of Classification Search
  None
  See application file for complete search history.

(56) References Cited

U.S. PATENT DOCUMENTS

| 10,284,753 | B1 | 5/2019 | Naik et al. |
| 2009/0115901 | A1 | 5/2009 | Winter et al. |

(Continued)

FOREIGN PATENT DOCUMENTS

| KR | 1020070122179 | 12/2007 |
| KR | 1020140037144 | 3/2014 |

(Continued)

OTHER PUBLICATIONS

U.S. Appl. No. 16/556,156, Office Action dated Jan. 2, 2020, 16 pages.

(Continued)

*Primary Examiner* — Mohammad J Rahman
(74) *Attorney, Agent, or Firm* — Lee, Hong, Degerman, Kang & Waimey PC

(57) ABSTRACT

Provided is a 360-degree image data processing method performed by a 360-degree video reception apparatus. The method includes receiving 360-degree image data, obtaining information on an encoded picture and metadata from the 360-degree image data, decoding a picture based on the information on the encoded picture, rendering the decoded picture and an overlay based on the metadata, in which the metadata includes overlay related metadata, the overlay is rendered based on the overlay related metadata, the overlay related metadata includes information on an alpha plane of the overlay, and the information on the alpha plane of the overlay is included in a image item or a video track.

16 Claims, 69 Drawing Sheets

(51) Int. Cl.
*H04N 13/178* (2018.01)
*H04N 13/183* (2018.01)
*H04N 13/282* (2018.01)

(56) References Cited

U.S. PATENT DOCUMENTS

| | | |
|---|---|---|
| 2010/0215347 A1 | 8/2010 | Ikeda et al. |
| 2011/0033170 A1 | 2/2011 | Ikeda et al. |
| 2011/0128555 A1 | 6/2011 | Rotschild et al. |
| 2013/0121567 A1* | 5/2013 | Hadap .................... G06V 10/60 345/426 |
| 2013/0229391 A1* | 9/2013 | DiVerdi ................ G06F 3/03545 345/179 |
| 2013/0249947 A1 | 9/2013 | Reitan |
| 2014/0040070 A1 | 2/2014 | Pereymer |
| 2014/0063061 A1 | 3/2014 | Reitan |
| 2014/0340427 A1 | 11/2014 | Baker |
| 2014/0375764 A1 | 12/2014 | Choe et al. |
| 2015/0016712 A1* | 1/2015 | Rhoads ............... G06F 16/5838 707/769 |
| 2015/0156469 A1 | 6/2015 | Qu et al. |
| 2015/0193409 A1 | 7/2015 | Portnoy et al. |
| 2015/0249817 A1 | 9/2015 | Roelen et al. |
| 2016/0277863 A1* | 9/2016 | Cahill .................... G01S 3/8083 |
| 2017/0126972 A1 | 5/2017 | Evans, V et al. |
| 2018/0025752 A1 | 1/2018 | Patel et al. |
| 2018/0063505 A1 | 3/2018 | Lee et al. |
| 2018/0167613 A1 | 6/2018 | Hannuksela et al. |
| 2018/0376125 A1 | 12/2018 | Wang et al. |
| 2018/0376152 A1 | 12/2018 | Wang et al. |
| 2019/0075351 A1 | 3/2019 | Hall et al. |
| 2019/0124260 A1* | 4/2019 | Lin ........................ G06T 3/0087 |
| 2019/0222822 A1 | 7/2019 | Wang et al. |
| 2019/0273903 A1 | 9/2019 | Chan et al. |
| 2019/0373243 A1 | 12/2019 | Jeong et al. |
| 2020/0043214 A1 | 2/2020 | Velevski et al. |
| 2020/0107008 A1 | 4/2020 | Hur et al. |

FOREIGN PATENT DOCUMENTS

| | | |
|---|---|---|
| KR | 1020150010752 | 1/2015 |
| WO | 2017142353 | 8/2017 |

OTHER PUBLICATIONS

U.S. Appl. No. 16/556,156, Final Office Action dated Jul. 2, 2020, 16 pages.
U.S. Appl. No. 16/556,156, Office Action dated Jan. 6, 2021, 10 pages.
U.S. Appl. No. 16/556,156, Final Office Action dated Jul. 6, 2021, 12 pages.
U.S. Appl. No. 16/556,156, Notice of Allowance dated Nov. 16, 2021, 9 pages.
ISO/IEC, "Information technology—Coding of audio-visual objects-" ISO/IEC 14496-12:2015(E), Dec. 2015, 248 pages.
IP.com, Search Report, 1 page.
PCT International Application No. PCT/KR2019/010300, Notification of Transmittal of The International Search Report and the Written Opinion of the International Searching Authority, or Declaration dated Nov. 22, 2019, 12 pages.

* cited by examiner

FIG. 9A
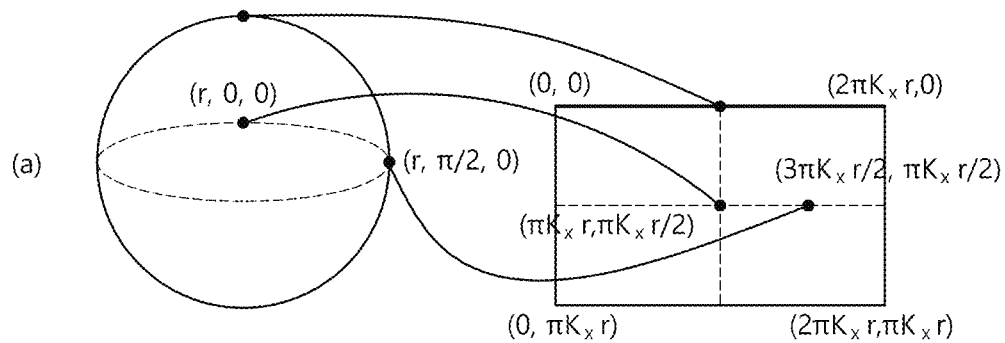
(a)
(b) 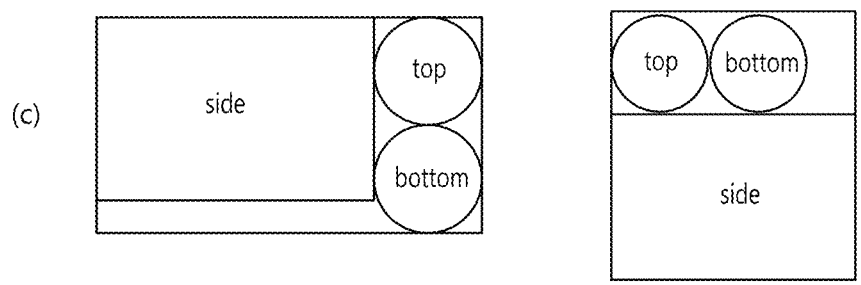
(c) 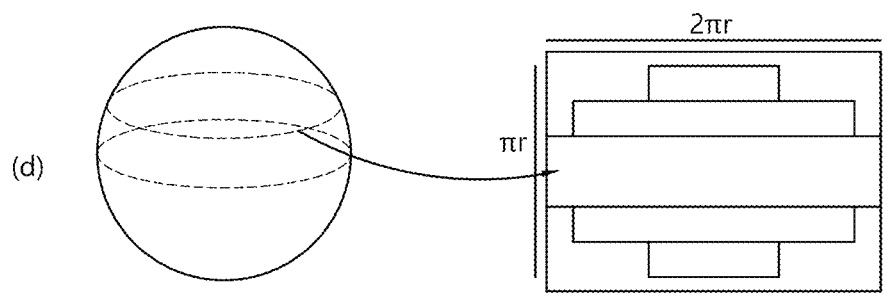
(d)

FIG. 9B
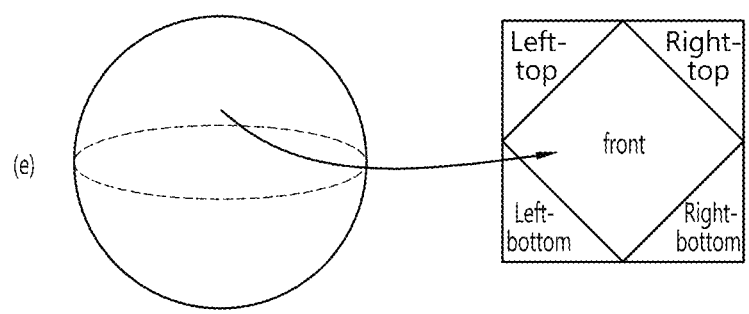
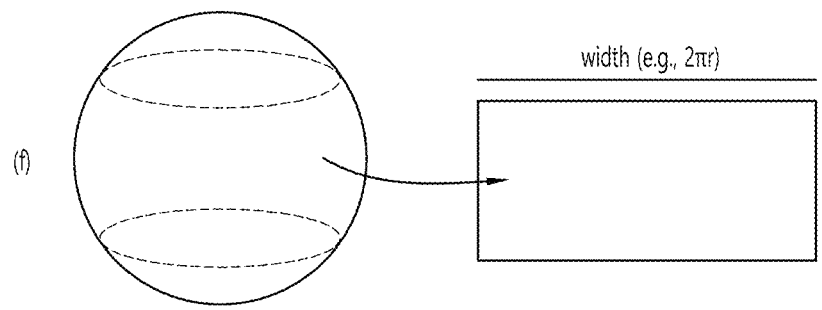

FIG. 11

```
...
        <Basic metadata>
unsigned    int(8)    vr_geometry;
unsigned    int(8)    projection_schme;
        <Stereoscopic related metadata>
unsigned    int(1)    is_stereoscopic;
unsigned    int(3)    stereo_mode;
        <Initial View related metadata>
signed      int(8)    initial_view_yaw_degree;
signed      int(8)    initial_view_pitch_degree;
signed      int(8)    initial_view_roll_degree;
        <ROI related metadata>
unsigned int(1)       2d_roi_range_flag;
unsigned int(1)       3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <FOV related metadata>
unsigned int(1)           content_fov_flag;
if (content_fov_flag==1) {
  unsigned int(16)        content_fov;
}
        <Cropped Region related metadata>
unsigned int(1)           is_copped_region;
if (content_fov_flag==1) {
  unsigned int(16)        cr_region_left_top_x;
  unsigned int(16)        cr_region_left_top_y;
  unsigned int(16)        cr_region_width;
  unsigned int(16)        cr_region_height;
}
...
```

FIG. 18
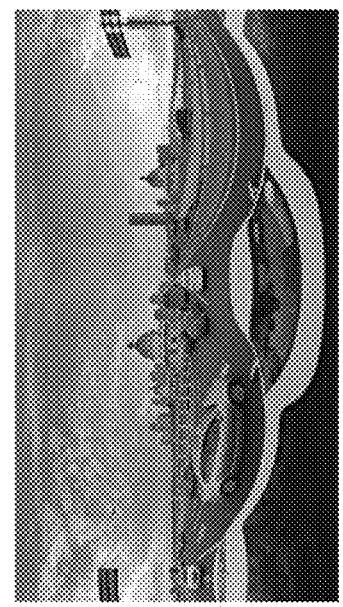
360-DEGREE VIDEO
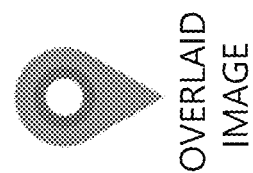
OVERLAID IMAGE
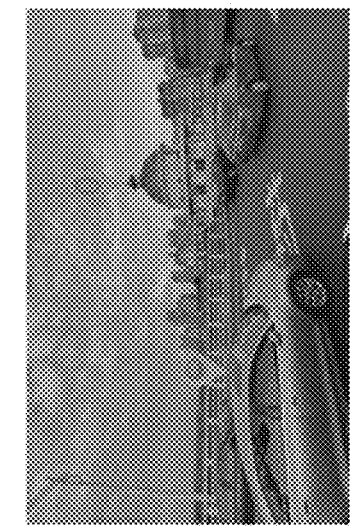
OVERLAY RENDERED ON 360-DEGREE VIDEO

FIG. 22

| | Case1 | Case2 | Case3 | Case4 |
|---|---|---|---|---|
| # of IMAGE | 1 | N (SUB-SAMPLE) | 1 | M (SUB-SAMPLE) |
| # of OVERLAY | 1 | N | N | M |
| Example* | | | | |

*IMAGE TO WHICH TEXTURE ATLAS HAS BEEN APPLIED

WHEN PLACED ON 3D SPACE

METHOD AND APPARATUS FOR OVERLAY PROCESSING IN 360 VIDEO SYSTEM

CROSS-REFERENCE TO RELATED APPLICATIONS

This application is a continuation of U.S. patent application Ser. No. 16/556,156, filed on Aug. 29, 2019, which pursuant to 35 U.S.C. § 119 (a), claims the benefit of earlier filing date and right of priority to Korean Patent Application No. 10-2018-0117716, filed on Oct. 2, 2018, the contents of which are hereby incorporated by reference herein in its entirety.

BACKGROUND OF THE INVENTION

Field of the Invention

The present invention relates to a 360 video, and more particularly, to a method and apparatus for overlay processing in a 360 video system.

Related Art

Virtual reality (VR) system provides a user with sensory experiences through which the user may feel as if he/she were in an electronically projected environment. An Augmented Reality (AR) system overlay a three-dimensional (3D) virtual image on an actual image or background of a real word, thereby allowing a user to feel as if the user is placed in an environment where a virtual reality and the real word are mixed. A system for providing VR may be further improved in order to provide higher-quality images and spatial sound. The VR or AR system may enable the user to interactively enjoy VR or AR content.

SUMMARY OF THE INVENTION

The present invention provides a method and apparatus for processing 360-degree video data.

The present invention also provides a method and apparatus for transmitting metadata for 360-degree video data.

The present invention also provides a method and apparatus for overlay processing for 360 video.

The present invention also provides a method and apparatus for transmitting metadata for overlaying 360 video.

According to an embodiment of the present invention, a 360-degree image data processing method performed by a 360-degree video reception apparatus is provided. The method includes receiving 360-degree image data, obtaining information on an encoded picture and metadata from the 360-degree image data, decoding a picture based on the information on the encoded picture, rendering the decoded picture and an overlay based on the metadata, in which the metadata includes overlay related metadata, the overlay is rendered based on the overlay related metadata, the overlay related metadata includes information on an alpha plane of the overlay, and the information on the alpha plane of the overlay is included in a image item or a video track.

According to another embodiment of the present invention, a 360-degree image data processing method performed by a 360 video transmission apparatus is provided. The method includes obtaining a 360-degree image, processing the 360-degree image to thereby derive a picture, generating metadata about the 360-degree image, encoding the picture, and performing a process for storage or transmission of the encoded picture and the metadata, in which the metadata includes overlay-related metadata, the overlay-related metadata includes information on an alpha plane of the overlay, and the information on the alpha plane is included in an image item or a video track.

According to further another embodiment of the present invention, a 360-degree video reception apparatus is provided. The apparatus includes a reception processing unit configured to receive 360-degree image data and obtain information on an encoded picture and metadata from the 360-degree image data, a data decoder configured to decode a picture based on the information on the encoded picture, and a renderer configured to render the decoded picture and an overlay based on the metadata, in which the metadata includes overlay-related metadata, the renderer renders the overlay based on the overlay-related metadata, the overlay-related metadata includes information on an alpha plane of the overlay, and the information on the alpha plane is included in an image item or a video track.

According to further another embodiment of the present invention, a 360-degree video transmission apparatus is provided. The apparatus includes a data input unit configured to obtain a 360-degree image, a projection processing unit configured to derive a picture by processing the 360-degree image, a metadata processing unit configured to generate metadata about the 360-degree image, a data encoder configured to encode the picture, and a transmission processing unit configured to perform a process for storage or transmission of the encoded picture and the metadata, in which the metadata includes overlay-related metadata, the overlay-related metadata includes information on an alpha plane of the overlay, and information on the alpha plane is included in an image item or a video track.

BRIEF DESCRIPTION OF THE DRAWINGS

FIGS. 9A to 9B exemplarily show projection formats according to some embodiments of the present invention.

FIG. 11 is a diagram showing an example of 360-degree-video related metadata according to an embodiment of the present invention.

FIG. 18 is a diagram showing an example of an overlay of 360-degree video data

FIG. 22 shows an example of four possible overlay media packing configurations in the case of file #1.

DESCRIPTION OF EXEMPLARY EMBODIMENTS

Figure 1:
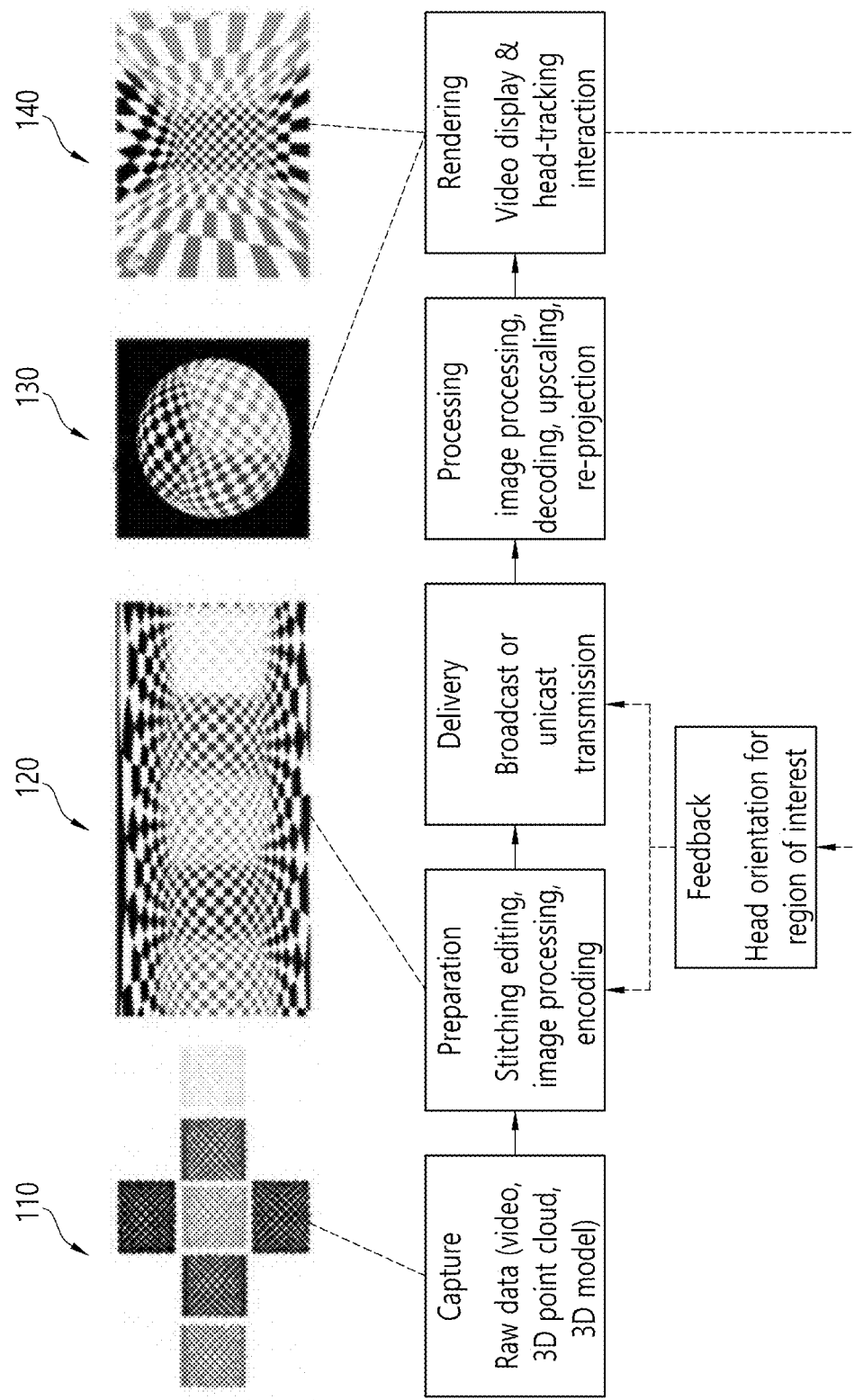
FIG. 1 is a diagram showing an overall architecture for providing 360 contents according to an embodiment of the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 contents according to an embodiment of the present invention.

The present invention proposes a method for providing 360-degree content for providing Virtual Reality (VR) to a user. VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360-degree video may refer to a 260-video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content. Hereinafter, 360 video may be called an omnidirectional video, and the 360 image may be called an omnidirectional image.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated by 130 in FIG. 1. The image/video indicated by 130 in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present invention may have a file format based on ISO base media file format (ISO BMFF).

Figure 2:
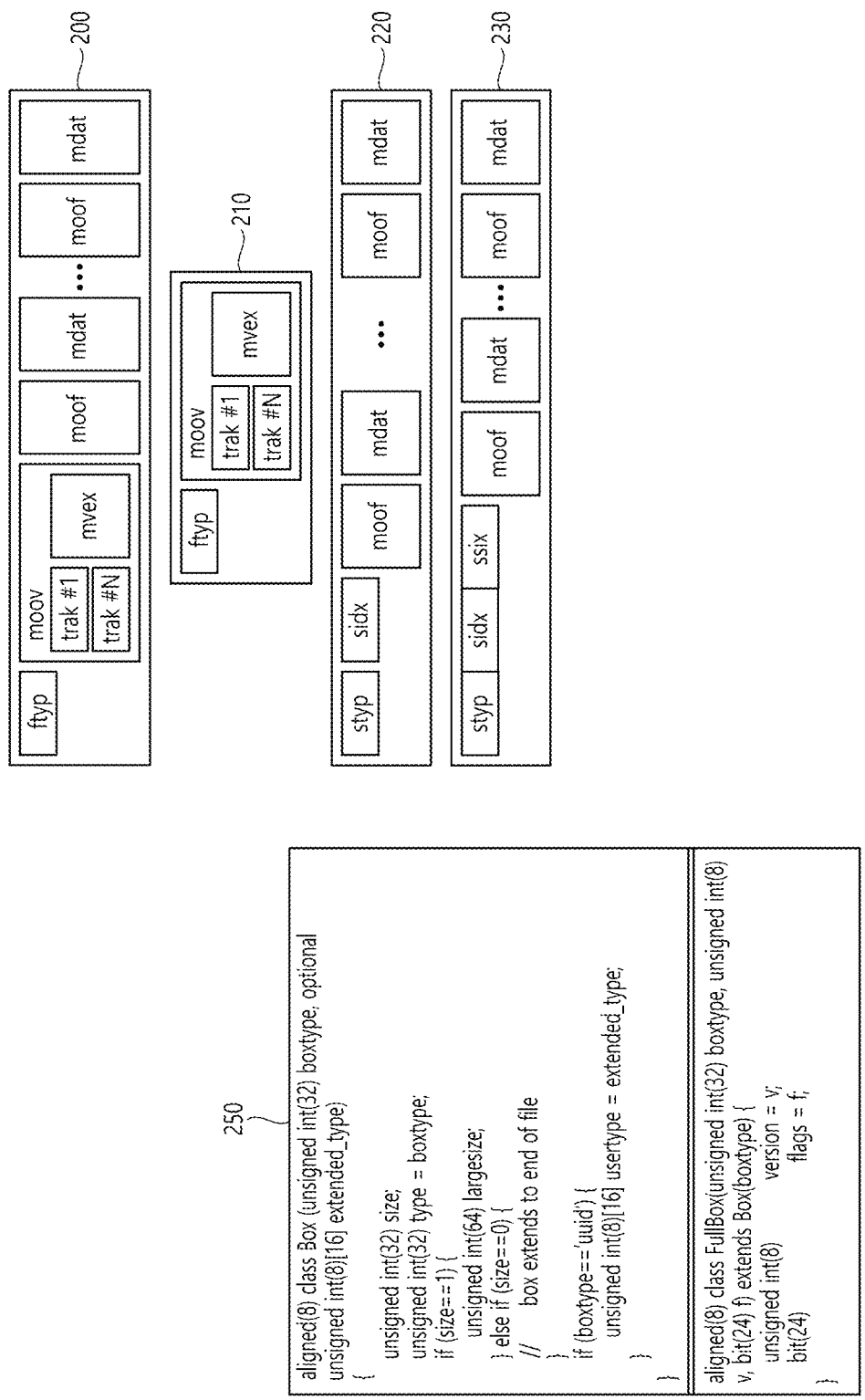
FIGS. 2 and 3 are diagrams illustrating the structure of a media file according to an aspect of the present invention.
Figure 3:
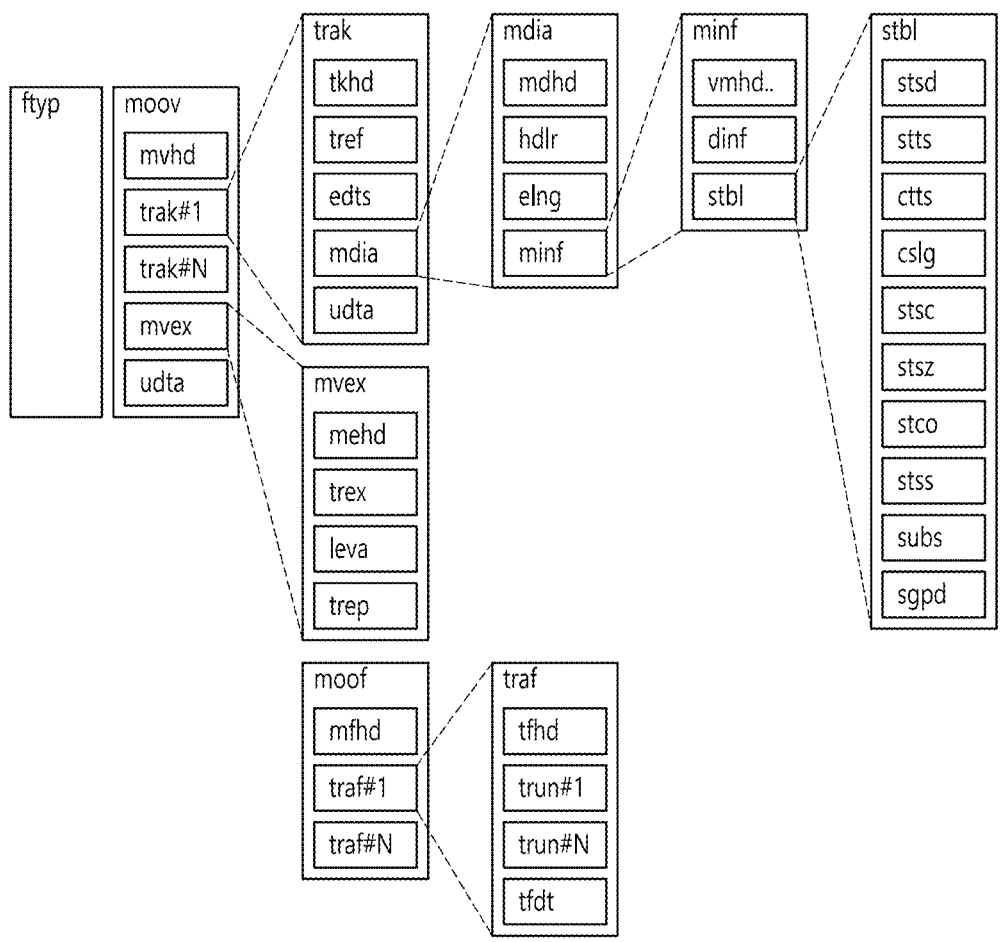

FIGS. 2 and 3 are diagrams illustrating the structure of a media file according to an aspect of the present invention.

The media file according to an embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) related to 360-degree video according to an embodiment of the present invention may be included in a DASH-based adaptive streaming model to be transmitted.

Figure 4:
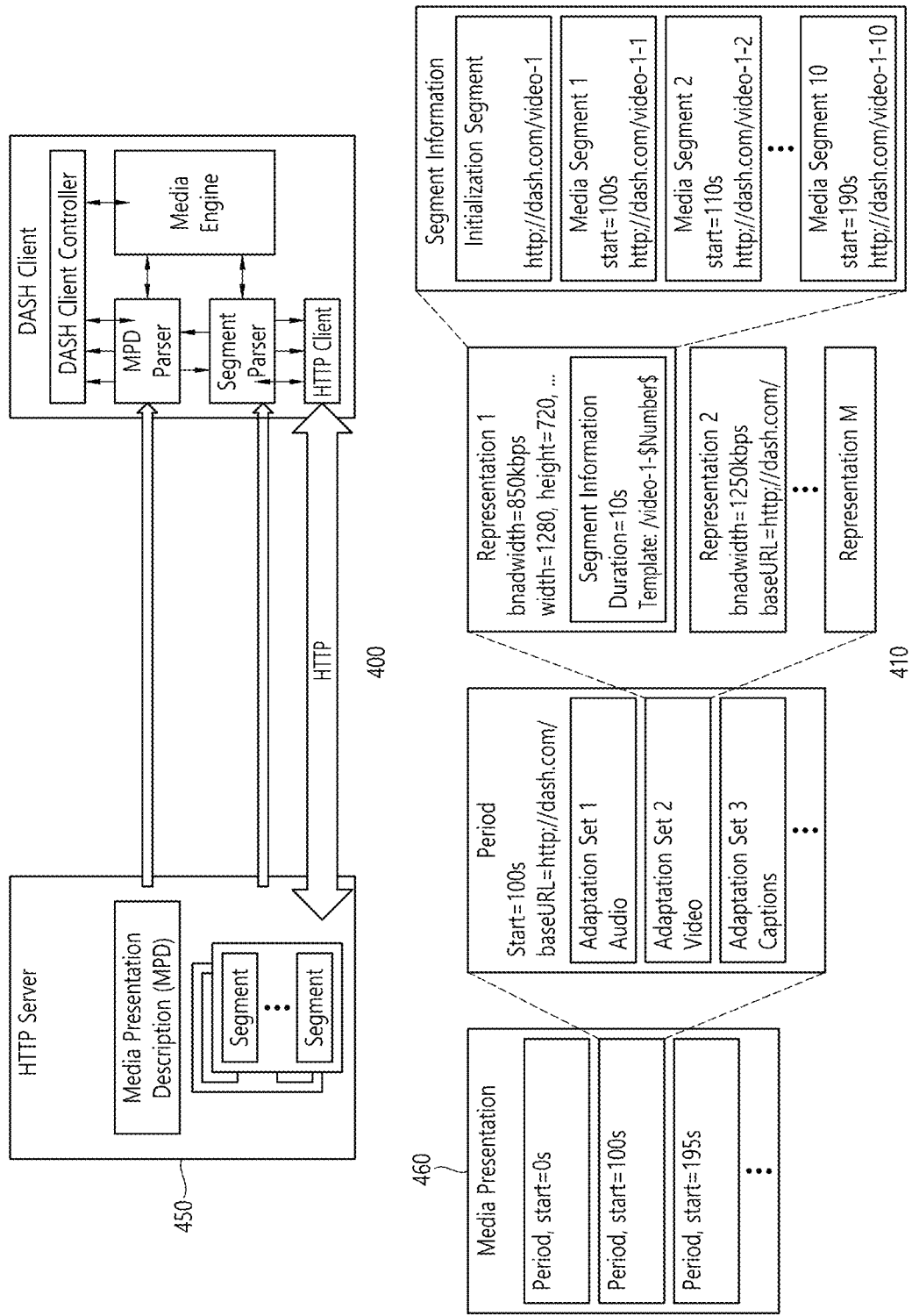
FIG. 4 is a diagram illustrating the overall operation of a Dynamic Adaptive Streaming over HTTP (DASH)-based adaptive streaming model according to an embodiment of the present invention.

FIG. 4 is a diagram illustrating the overall operation of a DASH-based adaptive streaming model according to an embodiment of the present invention.

A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming). As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information can be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Figure 5:
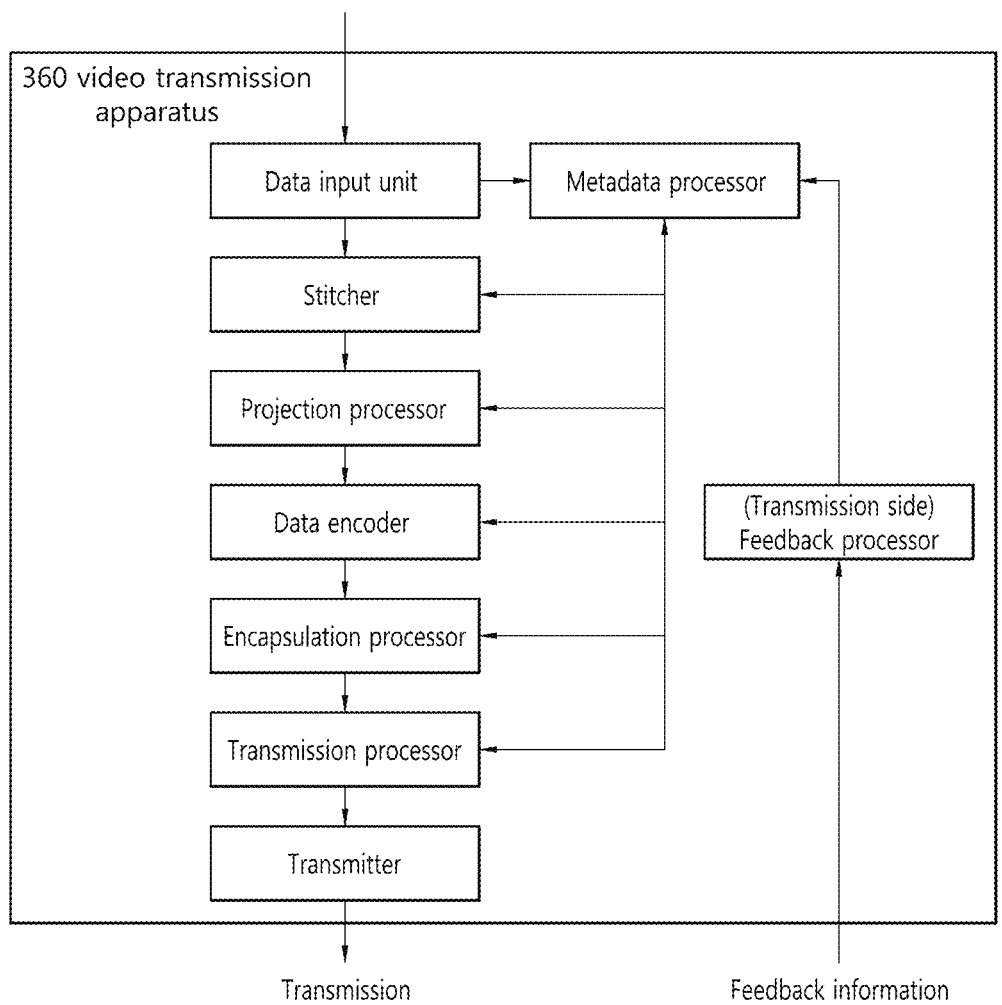
FIG. 5 is a diagram schematically showing configuration of a 360 video transmission apparatus according to an embodiment of the present invention.

FIG. 5 is a diagram schematically showing configuration of a 360 video transmission apparatus according to an embodiment of the present invention.

The 360 video transmission apparatus according to an embodiment can perform operations related the above-described preparation process and the transmission process. The 360 video transmission apparatus may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360 video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to an embodiment, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to an embodiment, the 360 video transmission apparatus may further include a (transmission side) feedback processor and/or a network interface (not shown) as internal/external elements. The network interface can receive feedback information from a 360 video reception apparatus according to an embodiment and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to an embodiment, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to an embodiment, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to an embodiment, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to an embodiment may be hardware elements. According to an embodiment, the internal/external elements may be changed, omitted, replaced by other elements or integrated.

Figure 6:
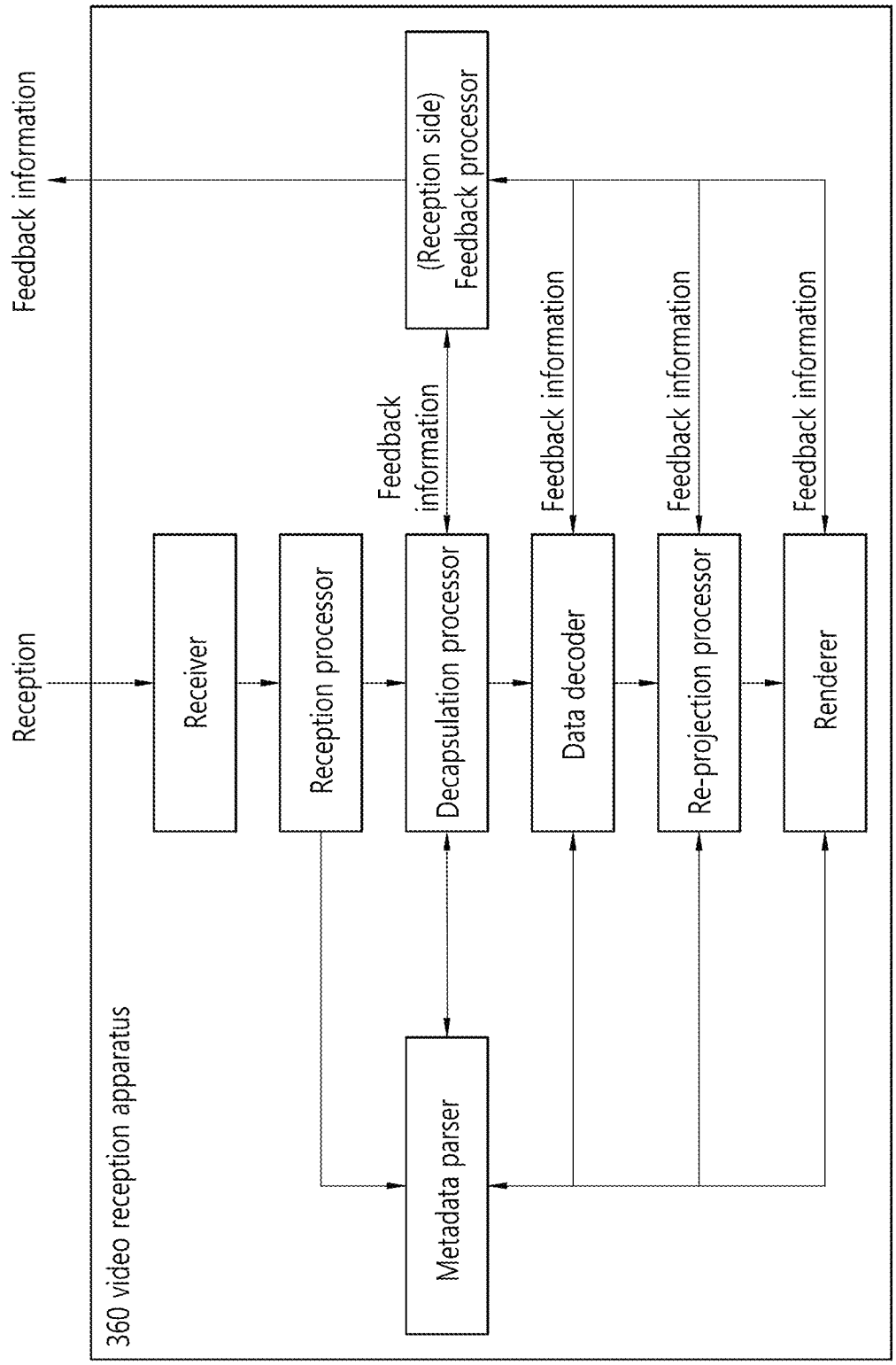
FIG. 6 is a diagram schematically illustrating a configuration of a 360 video reception apparatus according to an embodiment.

FIG. 6 is a diagram schematically illustrating a configuration of a 360 video reception apparatus according to an embodiment.

The 360 video reception apparatus according to an embodiment can perform operations related to the above-described processing process and/or the rendering process. The 360 video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver can receive 360 video data transmitted from the 360 video transmission apparatus according to an embodiment. The receiver may receive the 360 video data through a broadcast network or a broadband depending on a channel through which the 360 video data is transmitted.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to an embodiment, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to an embodiment may be hardware elements. According to an embodiment, the internal/external elements may be changed, omitted, replaced by other elements or integrated. According to an embodiment, additional elements may be added to the 360 video reception apparatus.

In another aspect, the operation method of the 360 video reception apparatus according to the aforementioned embodiment may be related to a 360 video transmitting method and a 360 video receiving method. The 360 video transmitting/receiving method according to an embodiment may be performed by the aforementioned 360 video transmission/reception apparatus or embodiments of the apparatus.

Respective embodiments of the 360 video transmission/reception apparatus and the 360 video transmission/reception method according to the aforementioned embodiments, and embodiments of inner/external elements thereof may be combined. For example, embodiments of the projection processor and embodiments of the data encoder may be combined to produce embodiments of the 360 video transmission apparatus as much as the combined embodiments of the projection processor and the data encoder.

Figure 7:
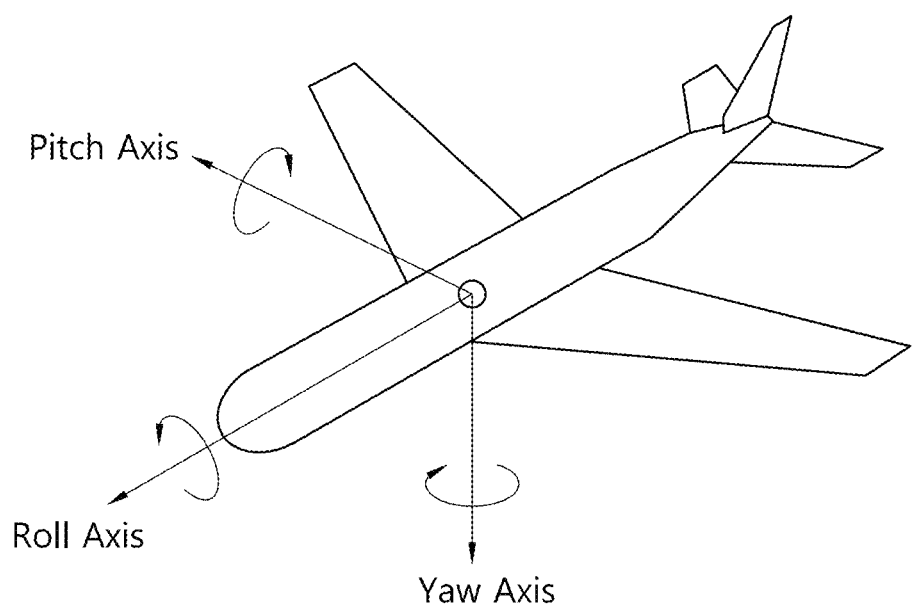
FIG. 7 is a diagram showing the concept of aircraft principal axes for describing 3D space according to an embodiment of the present invention.

FIG. 7 is a diagram showing the concept of aircraft principal axes for describing 3D space according to an embodiment of the present invention.

In the present invention, the concept of aircraft principal axes may be used in order to express a specific point, position, direction, distance, area, etc. in the 3D space. That is, in the present invention, the 3D space before projection or after re-projection may be described, and the concept of principal aircraft axes may be used in order to perform signaling thereon. In some embodiments, a method of using an orthogonal coordinate system or a spherical coordinate system using X, Y, and Z-axes may be used.

An aircraft may freely rotate in three dimensions. Axes constituting the three dimensions are referred to as a pitch axis, a yaw axis, and a roll axis. In the present specification, these terms may also be expressed either as pitch, yaw, and roll or as a pitch direction, a yaw direction, and a roll direction.

In one example, the roll axis may correspond to X axis in the orthogonal coordinate system or the back-to-front axis. Or, in the shown concept of principal aircraft axes, the roll axis may be an axis extending from the forward portion to the tail of the aircraft. Rotation in the roll direction may be rotation performed about the roll axis. The range of a roll value indicating an angle of rotation about the roll axis may be between −180 degree and 180 degree. In this case, −180 degree and 180 degree, which are edge values, may be included in the range of a roll value.

In another embodiment, the pitch axis may correspond to Y axis in the orthogonal coordinate system or the side-to-side axis. Or, the pitch axis may be an axis about which the forward portion of the aircraft is rotated upwards/downwards. In the shown concept of principal aircraft axes, the pitch axis may be an axis extending from one wing to another wing of the aircraft. The range of a pitch value indicating an angle of rotation about the pitch axis may be between −90 degree and 90 degree. In this case, −90 degree and 90 degree, which are edge values, may be included in the range of a pitch value.

In yet another example, the yaw axis may correspond to Z axis in the orthogonal coordinate system or the vertical axis. Or, the yaw axis may be an axis about which the forward portion of the aircraft is rotated leftwards/rightwards. In the shown concept of principal aircraft axes, the yaw axis may be an axis extending from the top to the bottom of the aircraft. The range of a yaw value indicating an angle of rotation about the yaw axis may be between −180 degree and 180 degree. In this case, −180 degree and 180 degree, which are edge values, may be included in the range of a yaw value.

The center point, which is the basis for determining the yaw axis, the pitch axis, and the roll axis in a 3D space according to an embodiment, may not be static.

As described above, the 3D space in the present invention may be described using the pitch, yaw, and roll concept.

Meanwhile, as described above, video data projected on a 2D image may undergo a region-wise packing process in order to improve video coding efficiency. The region-wise packing process may be a process of individually processing the video data projected on the 2D image for each region. The term "regions" may indicate divided parts of the 2D image on which 360 video data are projected, and the regions may be partitioned depending on a projection scheme. The 2D image may be referred to as a video frame or a frame.

Regarding this, the present invention proposes metadata for the region-wise packing process depending on a projection scheme, and a method for signaling the metadata. The region-wise packing process may be performed more efficiently based on the metadata.

Figure 8:
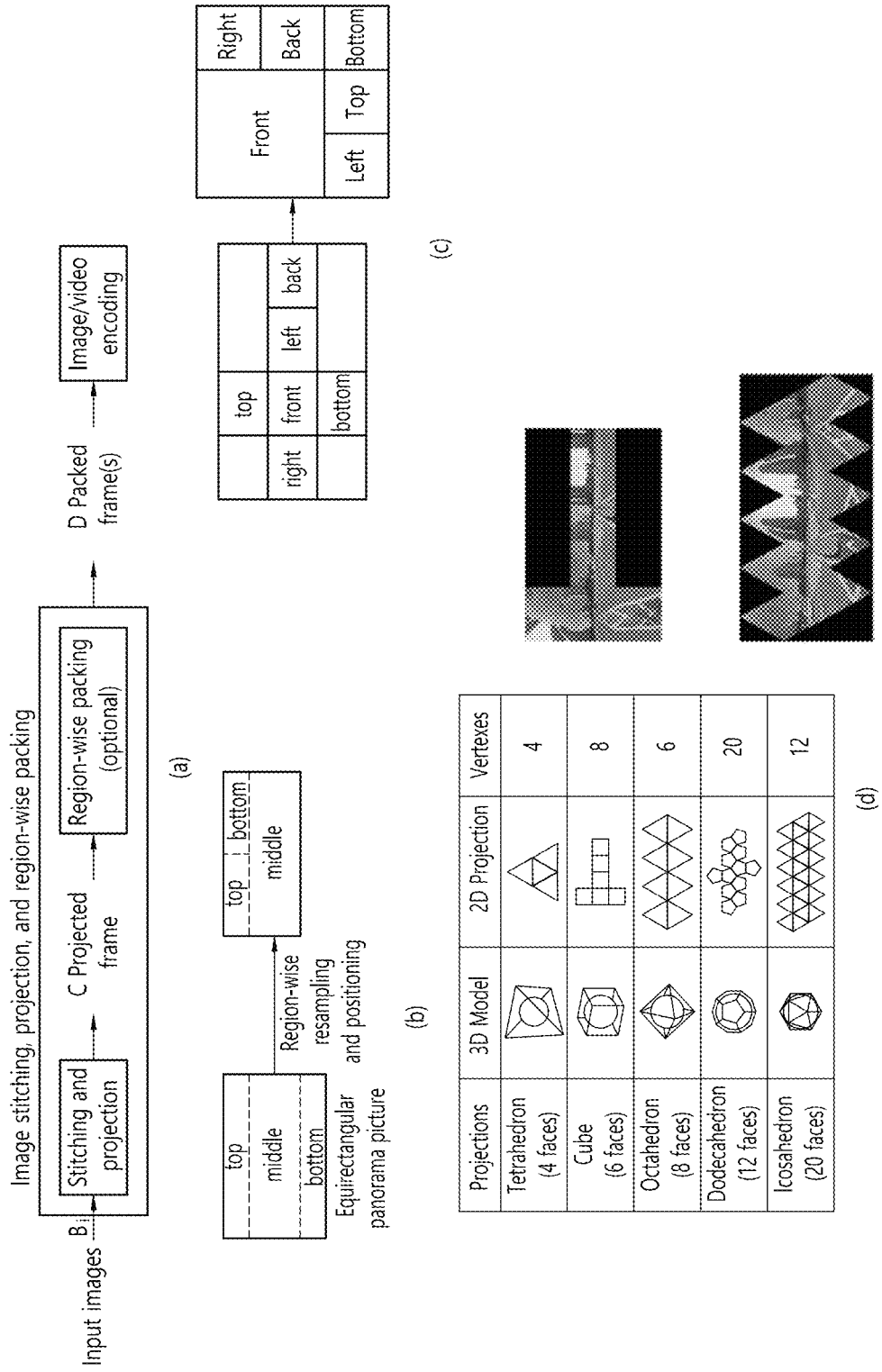
FIG. 8 exemplarily shows a 2D image having underwent 360-degree video processing process and a region-wise packing process according to a projection format.

FIG. 8 exemplarily shows a 2D image having underwent 360 video processing process and a region-wise packing process according to a projection format.

In FIG. 8, (a) may show a process of processing input 360 video. Referring to (a) of FIG. 8, input viewpoint-wise 360 video data may be stitched or projected on a 3D projection structure according to various projection schemes, and the 360e video data projected on the 3D projection structure may be expressed as a 2D image. That is, the 360 video data may be stitched, and may be projected as the 2D image. The 2D image, on which the 360 video is projected, may be expressed as a projected frame. In addition, the projected frame may undergo the aforementioned region-wise packing process. That is, a process of dividing an area including the projected 360 video data on the projected frame into regions, and rotating or rearranging each region or increasing or decreasing resolution of each region may be performed. In other words, the region-wise packing process may indicate a process of mapping the projected frame as one or more packed frames. The region-wise packing process may be optionally performed, and, if the region-wise packing process is not performed, the packed frame and the projected frame may be identical to each other. If the region-wise packing process is performed, each region of the projected frame may be mapped to the region of the packed frame, and it is possible to derive metadata that represents a position, a shape, and a size of a region of the packed frame to which each region of the projected frame is mapped.

In FIG. 8, (b) and (c) may show examples in which each region of the projected frame is mapped to a region of the packed frame. Referring to (b) of FIG. 8, the 360 video data may be projected on a 2D image (or frame) according to a panoramic projection scheme. The top region, the middle region, and the bottom region of the projected frame may undergo the region-wise packing process and hence rearranged as shown in the right drawing. Here, the top region may be a region representing the upper surface of the panorama on the 2D image, the middle region may be a region representing the middle surface of the panorama on the 2D image, and the bottom region may be a region representing the bottom surface of the panorama on the 2D image. In addition, referring to (c) of FIG. 8, the 360 video data may be projected on a 2D image (or frame) according to a cubic projection scheme. The front region, the back region, the top region, the bottom region, the right-side region, and the left-side region of the projected frame may undergo the region-wise packing process and hence rearranged as shown in the right drawing. Here, the front region may be a region representing the front surface of the cube on the 2D image, the back region may be a region representing the back surface of the cube on the 2D image. In addition, the top region may be a region representing an upper surface of the cube on the 2D image, and the bottom region may be a region representing the bottom surface of the cube on the 2D image. In addition, the right-side region may be a region representing the right-side surface of the cube on the 2D image, and the left-side region may be a region representing the left-side surface of the cube on the 2D image.

In FIG. 8, (d) may show various 3D projection formats into which the 360 video data can be projected. Referring to (d) of FIG. 8. The 3D projection formats may include a tetrahedron, a cube, a octahedron, a dodecahedron, and an icosahedron. The 2D projections shown in (d) of FIG. 8, may represent projected frames which represents the 360 video data projected into a 3D projection format on a 2D image.

The projection formats are merely exemplary, and, according to an embodiment, some or all of various projection formats (or projection schemes) may be used. A projection format used for 360 video may be indicated, for example, through a projection format field of metadata.

FIGS. 9A to 9B exemplarily show projection formats according to some embodiments of the present invention.

In FIG. 9A, (a) may show an equirectangular projection format. When the equirectangular projection format is used, a point $(r, \theta 0, 0)$, that is, a point where $\theta=\theta 0$ and $\varphi=0$, on a spherical surface and a central pixel on a 2D image may be mapped. A principal point of a front camera may be assumed to be a point $(r, 0, 0)$ on the spherical surface. In addition, $\varphi 0=0$ may be fixed. Therefore, a value $(x, y)$ transformed into XY coordinate system may be transformed into a $(X, Y)$ pixel on the 2D image through the following equation.

$$X = K_X^* x + X_O = K_X^* (\theta - \theta_0)^* r + X_O$$

$$Y = -K_y^* y - Y_O \qquad [\text{Equation 1}]$$

In addition, if a left top pixel on the 2D image is positioned at $(0, 0)$ in the XY system, an offset value for X axis and an offset value for Y axis may be represented by the following equation.

$$X_O = K_X^* \pi^* r$$

$$Y_O = -K_y^* \pi/2^* r \qquad [\text{Equation 2}]$$

Using the above, a transformation equation into the XY coordinate system may be as below.

$$X = K_X x + X_O = K_X^* (\pi + \theta - \theta_0)^* r$$

$$Y = -K_y y - Y_O = K_y^* (\pi/2 - \varphi)^* r \qquad [\text{Equation 3}]$$

For example, if $\theta 0=0$, that is, if a central pixel on a 2D image indicates data of $\theta=0$ on a spherical surface, the spherical surface may be mapped to an area of a horizontal length (width)=$2K \times \pi r$ and a vertical length (height)=$K \times \pi r$ on the 2D image on the basis of $(0,0)$. Data of $\varphi=\pi/2$ on the spherical surface may be mapped to the whole upper edge on the 2D image. In addition, data of $(r, \pi/2, 0)$ on the spherical surface may be mapped to a point of $(3\pi K \times r/2, \pi K \times r/2)$ on the 2D image.

At the reception side, 360 video data on the 2D image may be re-projected to the spherical surface. This may be represented by a transformation equation as below.

$$\theta = \theta_0 + X/K_x * r - \pi$$

$$\varphi = \pi/2 - Y/K_y * r \quad \text{[Equation 4]}$$

For example, a pixel at XY coordinates of (K×πr, 0) on a 2D image may be re-projected to a point where θ=θ0 and φ=π/2 on a spherical surface.

In FIG. 9A, (b) may show a cubic projection format. For example, stitched 360 video data may appear on a spherical surface. The projection processor may project the 360 video data on a 2D image in the form of a cube. The 360 video data on the spherical surface may correspond to respective surfaces of the cube. As a result, the 360 video data may be projected on the 2D image, as shown in at the left side or the right side of (b) in FIG. 9A.

In FIG. 9A, (c) may show a cylindrical projection format. On the assumption that stitched 360 video data appear on a spherical surface, the projection processor may project the 360 video data on a 2D image in the form of a cylinder. The 360-degree video data on the spherical surface may correspond to the side, the top, and the bottom of the cylinder. As a result, the 360 video data may be projected on the 2D image, as shown in the left side or the right side of (c) in FIG. 9A.

In FIG. 9A, (d) may show a tile-based projection format. If the tile-based projection scheme is used, the aforementioned projection processor may divide 360 video data on a spherical surface into one or more sub-areas, as shown in (d) of FIG. 9A, and project on a 2D image. The sub-areas may be called tiles.

In FIG. 9B, (e) may show a pyramid projection format. On the assumption that stitched 360 video data appear on a spherical surface, the projection processor may regard the 360 video data as a pyramid and project the 360 video data on a 2D image in the form of a pyramid. The 360 video data on the spherical surface may correspond to four surfaces (the front, the left top, the left bottom, the right top, and the right bottom) of the pyramid. As a result, the 360-degree video data may be projected on the 2D image, as shown at the left side or the right side of (e) of FIG. 9B. In this case, the bottom surface may be a region including data acquired by a camera that faces forward.

In FIG. 9B, (f) may show a panoramic projection format, If the panoramic projection format is used, the aforementioned projection processor may project only a side surface of 360 video data on a spherical surface on a 2D image, as shown in (f) of FIG. 9B. This may be the same as the case where the top and bottom surfaces do not exist in the cylindrical projection scheme.

Meanwhile, according to one embodiment, projection may be performed without a stitching process. In FIG. 9B, (g) may show the case where projection is performed without the stitching process. If projection is performed without the stitching process, the aforementioned projection processor may project 360 video data intact on a 2D image, as shown in (g) of FIG. 9B. In this case, a stitching process may be not performed, and intact images acquired by a camera may be projected on the 2D image.

Referring to (g) of FIG. 9B, two images may be projected on a 2D image without a stitching process. Each of the images may be a fish-eye image acquired by a spherical camera (or a fish-eye camera) through each sensor. As described above, at the reception side, image data acquired from camera sensors may be stitched, and the stitched image data may be mapped to a spherical surface to render spherical video, that is, 360 video.

Figure 10A:
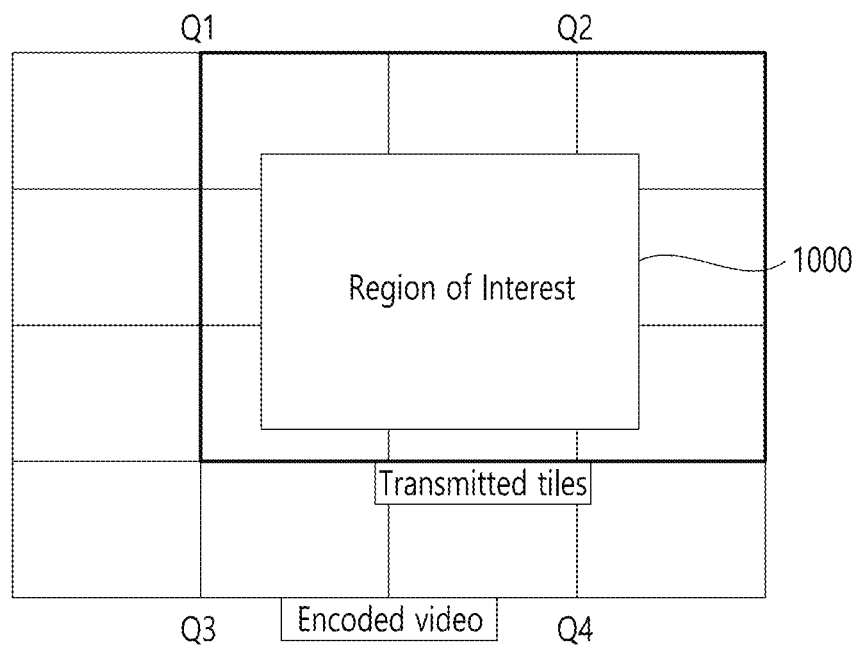
FIGS. 10A and 10B are diagrams showing tiles according to some embodiments of the present invention.
Figure 10B:
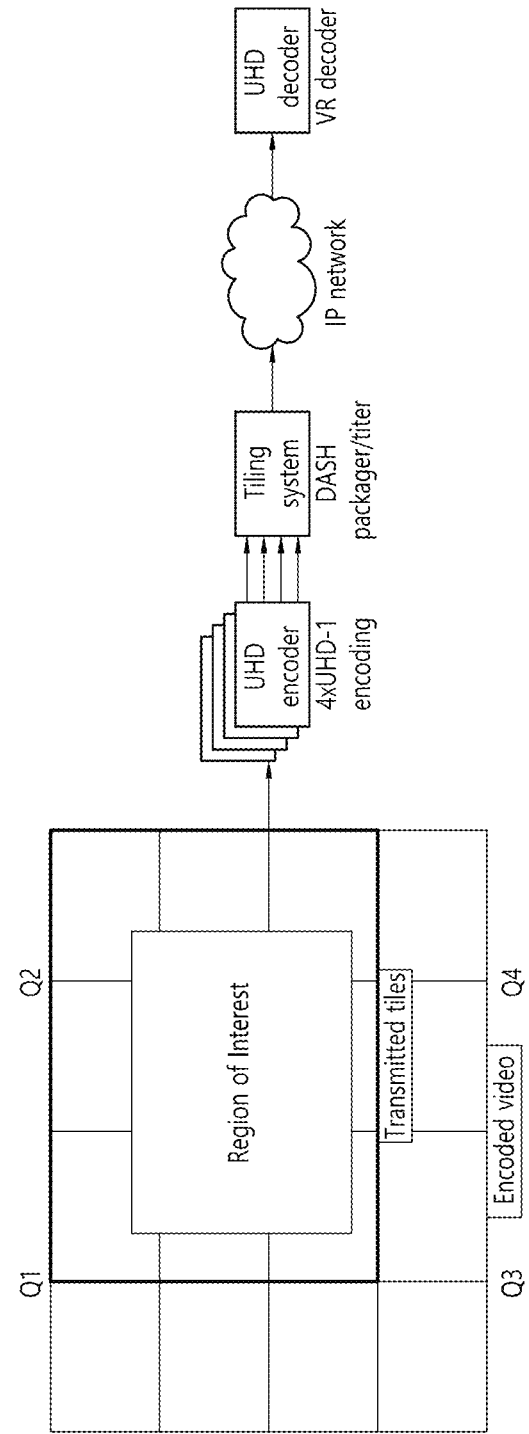

FIGS. 10A and 10B are diagrams showing tiles according to some embodiments of the present invention.

360 video data projected on a 2D image or 360 video data having undergone a region-wise packing process may be partitioned into one or more tiles. FIG. 10A shows the case where one 2D image is partitioned into 16 tiles. Here, a 2D image may be the aforementioned projected frame or packed frame. According to another embodiment of a 360 video transmission apparatus of the present invention, the data encoder is able to encode the respective tiles independently.

Region-wise packing and tiling may be different from each other. Region-wise packing may be processing each region of the 360 video data projected on the 2D image in order to improve coding efficiency or to adjust resolution. Tiling may be dividing, the data encoder, the projected frame or the packed frame into tiles and independently encoding the tiles. When the 360 video data are provided, the user does not simultaneously enjoy all parts of the 360 video data. Tiling may enable the reception side to enjoy or receive only tiles corresponding to an important part or a predetermined part, such as the viewport that is being viewed by the user, to the reception side within a limited bandwidth. The limited bandwidth may be more efficiently utilized through tiling, and calculation load for the reception side may be reduced compared to the case of processing the entire 360 video data all at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case where the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360 content provider. The 360 content provider may produce a 360 video in consideration of the area of the 360 video in which users are expected to be interested. In some embodiments, the ROI may correspond to an area of the 360 video in which an important portion of the 360-degree video is shown.

In another embodiment of the 360 video transmission/reception apparatus according to the present invention, the reception-side feedback-processing unit may extract and collect viewport information, and may deliver the same to the transmission-side feedback-processing unit. At this process, the viewport information may be delivered using the network interfaces of both sides. FIG. 10A shows a viewport t6010 displayed on the 2D image. Here, the viewport may be located over 9 tiles on the 2D image.

In this case, the 360 video transmission apparatus may further include a tiling system. In some embodiments, the tiling system may be disposed after the data encoder (see FIG. 10B), may be included in the data encoder or the transmission-processing unit, or may be included in the 360 video transmission apparatus as a separate internal/external element.

The tiling system may receive the viewport information from the transmission-side feedback-processing unit. The tiling system may select and transmit only tiles including the viewport area. In the FIG. 10A, 9 tiles including the viewport area 1000, among a total of 16 tiles of the 2D image, may be transmitted. Here, the tiling system may transmit the tiles in a unicast manner over a broadband connection. It is because the viewport area varies depending on a user.

Also, in this case, the transmission-side feedback-processing unit may deliver the viewport information to the data encoder. The data encoder may encode the tiles including the viewport area at higher quality than other tiles.

Also, in this case, the transmission-side feedback-processing unit may deliver the viewport information to the metadata-processing unit. The metadata-processing unit may deliver metadata for the viewport area to the internal elements of the 360 video transmission apparatus, or may include the same in the 360-video related metadata.

By using this tiling method, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360 video through the VR display (initial viewport).

According to another embodiment of the 360 video transmission apparatus, the transmission-processing unit may perform transmission processing differently for respective tiles. The transmission-processing unit may apply different transport parameters (modulation order, code rate, etc.) to the tiles such that robustness of data delivered for each region is changed.

At this point, the transmission-side feedback-processing unit may deliver the feedback information, received from the 360 video reception apparatus, to the transmission-processing unit, which may perform transmission processing differently for respective tiles. For example, the transmission-side feedback-processing unit may deliver the viewport information, received from the reception side, to the transmission-processing unit. The transmission-processing unit may perform transmission processing on tiles including the viewport area so as to have higher robustness than for the other tiles.

FIG. 11 is a view showing 360-degree-video related metadata according to an embodiment of the present invention.

The 360-degree-video related metadata may include various metadata for the 360-degree video. Depending on the context, the 360-degree-video related metadata may be called 360-degree-video-related signaling information. The 360-degree-video related metadata may be transmitted while being included in a separate signaling table, or may be transmitted while being included in DASH MPD, or may be transmitted while being included in the form of a box in a file format of ISOBMFF. In the case where the 360-degree-video related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

According to an embodiment of the 360-degree-video related metadata, the 360-degree-video related metadata may include basic metadata about projection schemes, stereoscopy related metadata, initial-view/initial-viewport related metadata, ROI related metadata, field-of-view (FOV) related metadata, and/or cropped-region related metadata. In some embodiments, the 360-degree-video related metadata may further include metadata other than the above metadata.

Embodiments of the 360-degree-video related metadata according to the present invention may include at least one of the basic metadata, the stereoscopy related metadata, the initial-view related metadata, the ROI related metadata, the FOV related metadata, the cropped-region related metadata, and/or additional possible metadata. Embodiments of the 360-degree-video related metadata according to the present invention may be variously configured depending on possible number of metadata included therein. In some embodiments, the 360-degree-video related metadata may further include additional information.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case where the field has additional values, the values may be reserved for future use.

The initial-view related metadata may include information about the time at which a user views the 360-degree video when the 360-degree video is reproduced first (an initial viewport). The initial-view related metadata may include an initial_view_yaw_degree field, an initial_view_pitch_degree field, and/or an initial_view_roll_degree field. In some embodiments, the initial-view related metadata may further include additional information.

The initial_view_yaw_degree field, the initial_view_pitch_degree field, and the initial_view_roll_degree field may indicate an initial viewport when the 360-degree video is reproduced. That is, the very center point of the viewport that is viewed first at the time of reproduction may be indicated by these three fields. Specifically, the initial_view_yaw_degree field may indicate a yaw value at the initial viewpoint. That is, the initial_view_yaw_degree field may indicate the rotational direction (symbol) and the extent of rotation direction (angle) in which the position of the very center point is rotated about the yaw axis. In addition, the initial_view_pitch_degree field may indicate a pitch value at the initial viewpoint. That is, the initial_view_pitch_degree field may indicate the rotational direction (symbol) and the extent of rotation (angle) in which the position of the very center point is rotated about the pitch axis. In addition, the initial_view_roll_degree field may indicate a roll value at the initial viewpoint. That is, the initial_view_roll_degree field may indicate the rotational direction (symbol) and the extent of rotation (angle) in which the position of the very center point is rotated about the roll axis. The initial viewpoint at the time of reproduction of the corresponding 360-degree video, that is, the very center point of the view point that is viewed first at the time of reproduction may be indicated based on the initial_view_yaw_degree field, the initial_view_pitch_degree field, and the initial_view_roll_degree field. In doing so, a specific area of the 360-degree video may be displayed at the initial viewpoint for a user. In addition, the horizontal length and the vertical length (width and height) of an initial viewport based on the indicated initial viewport through the FOV may be determined. That is, the 360-degree video reception apparatus may provide a user with a predetermined area of the 360-degree video as an initial viewport using these three fields and the FOV information.

In some embodiments, the initial viewport indicated by the initial-view related metadata may be changed for each scene. That is, the scenes of the 360-degree video may be changed over time of 360 content. An initial viewport or an initial viewport at which the user views the video first may be changed for every scene of the 360-degree video. In this case, the initial-view related metadata may indicate the initial viewport for each scene. To this end, the initial-view related metadata may further include a scene identifier identifying the scene to which the initial viewport is applied. In addition, the FOV may be changed for each scene. The initial-view related metadata may further include scene-wise FOV information indicating the FOV corresponding to the scene.

The ROI related metadata may include information related to the ROI. The ROI related metadata may a 2d_roi_range_flag field and/or a 3d_roi_range_flag field. Each of the two fields may indicate whether the ROI related metadata includes fields expressing the ROI based on the 2D image or whether the ROI related metadata includes fields expressing the ROI based on the 3D space. In some embodiments, the ROI related metadata may further include additional information, such as differential encoding information based on the ROI and differential transmission processing information based on the ROI.

In the case where the ROI related metadata includes fields expressing the ROI based on the 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. That is, these fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. That is, these fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. That is, these fields may indicate the minimum x coordinate, the maximum x coordinate, the minimum y coordinate, and the maximum y coordinate of the coordinates in the ROI, respectively. These fields may be omitted.

In the case where the ROI related metadata includes fields expressing the ROI based on the coordinates in the 3D rendering space, the ROI related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV related metadata, a description of which will follow.

The FOV related metadata may include the above information related to the FOV. The FOV related metadata may include a content_fov_flag field and/or a content_fov field. In some embodiments, the FOV related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360 video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case where the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region related metadata may include an is_cropped_region field, a cr_region_left_top_x field, a cr_region_left_top_y field, a cr_region_width field, and/or a cr_region_height field. In some embodiments, the cropped-region related metadata may further include additional information.

The is_cropped_region field may be a flag indicating whether the entire area of the image frame is used by the 360-degree video reception apparatus or the VR display. Here, an area to which 360-video data is mapped or an area seen on the VR display may be called an active video area. This field may indicate whether the entire image frame is the active video area. In the case where only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

The 360-video-based VR system may provide a user with visual/audible experience in a different viewing orientation from a position of the user with respect to 360 video based on the above-described 360 video processing. The VR system, which provides a user with visual/audible experience in different viewing orientation from a fixed position of the user with respect to 360 video, may be called a three degree of freedom (3DoF)-based VR system. Meanwhile, the VR system capable of providing visual/audible experience in different viewing orientations from different viewing positions at different viewpoints may be called a 3DoF+ or 3DoF plus-based VR system.

Figure 12:
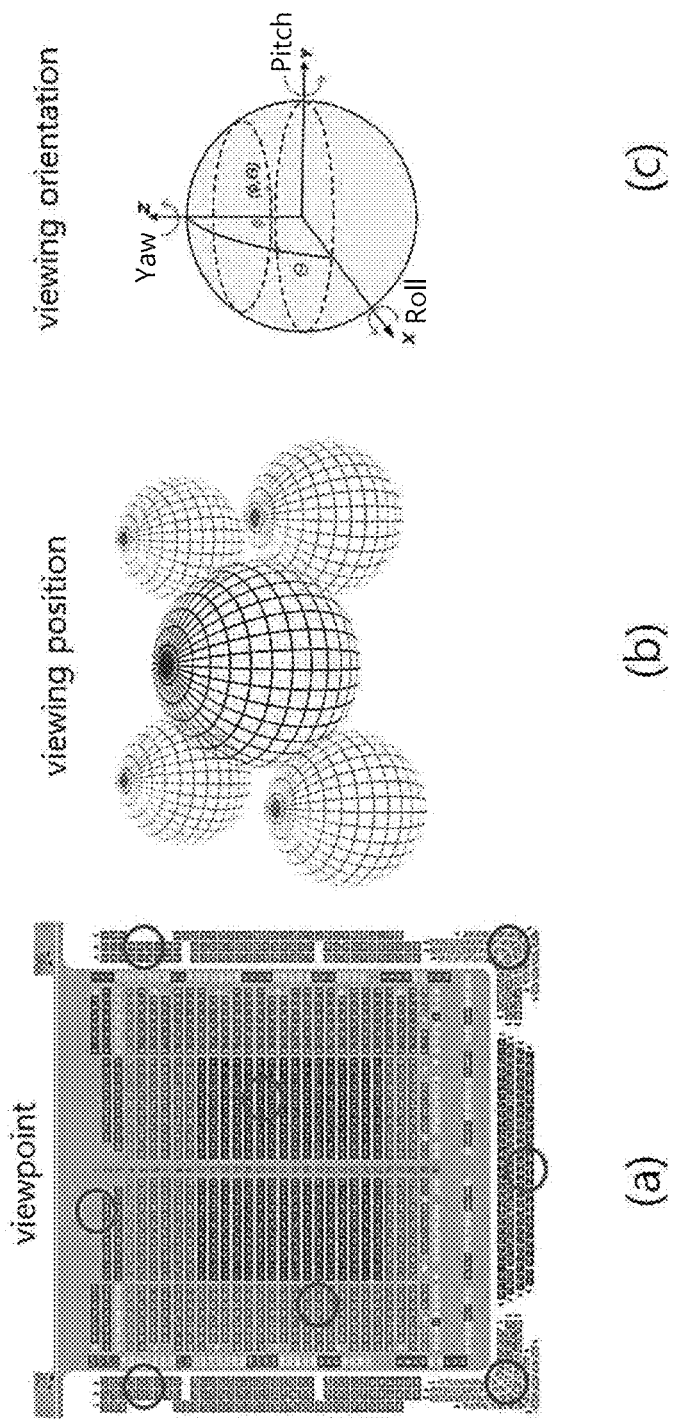
FIG. 12 schematically shows concepts of a view point, a viewing position, and a viewing orientation.

FIG. 12 schematically shows concepts of a view point, a viewing position, and a viewing orientation.

Referring to FIG. 12, on the assumption of a space (e.g., a theater) as in (a), each marked circle may indicate a different view point. An image/voice provided at each view point in the same space may be associated with each other in the same time zone. In this case, different visual/audible experience may be provided to a user depending on a change in a gaze direction or head movement (e.g., head motion) of the user at a specific viewpoint. That is, a sphere of various viewing positions at a specific viewpoint may be assumed, as shown in (b), and image/voice/text information which has taken into consideration of a relative location of each viewing position may be provided.

Meanwhile, as shown in (c), visual/audible information from various directions as in legacy 3DoF may be delivered from a specific viewing position at a specific viewpoint. At this point, not just a main source (e.g., an image/voice/text) but also other various sources combined with the main source may be provided, and, in this case, information associated with or independent of a user's viewing orientation may be delivered.

Figure 13:
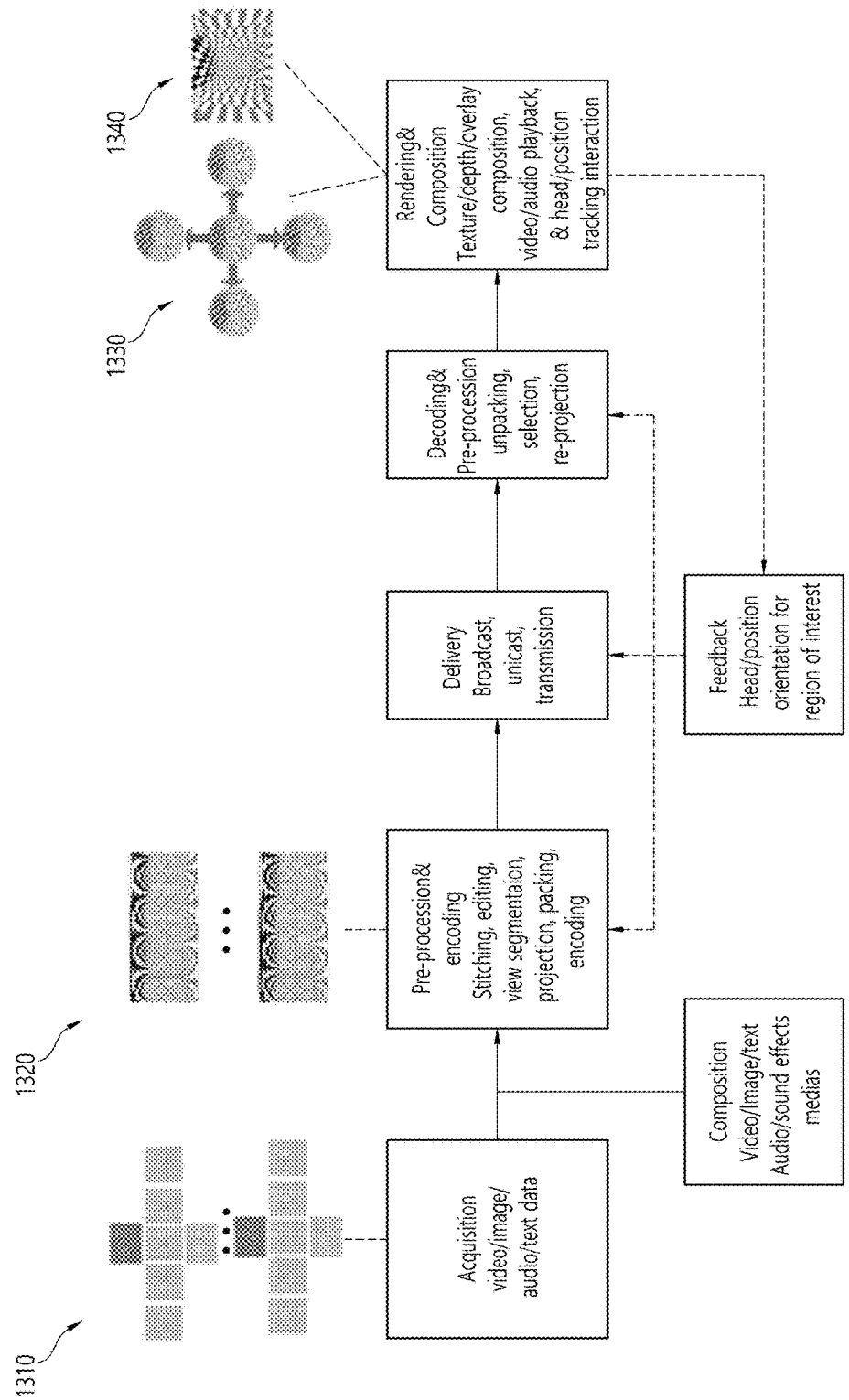
FIG. 13 is a diagram schematically showing an example of architecture for providing 3DoF+ video according to an embodiment of the present invention.

FIG. 13 is a diagram schematically showing an example of architecture for providing 3DoF+ video according to an embodiment of the present invention.

FIG. 13 may show a flowchart of a 3DoF+ end-to-end system including an acquisition process, a pre-processing process, a transmission process, a (post-)processing process, a rendering process, and a feedback process of 3DoF+.

Referring to FIG. 13, the acquisition process may refer to a process of acquiring 360 video through capturing, composition, or generating the 360 video. Through the acquisition process, a plurality of image/voice information items may be acquired according to change of a viewing direction (e.g., a head motion) for a plurality of positions. In this case, the image may include not just visual information (e.g., texture) but also depth information. In this case, as shown in an example of image information indicated by reference numeral 1310, a plurality of information items for different viewing positions with different viewpoints may be acquired.

The composition process may a procedure and a method for performing composition in order to include, user experience, not just information acquired by an image/voice input device, but also an image (video/image, etc.), a voice (audio/sound effect, etc.), a text (subtitle, etc.) from an external media.

The pre-processing process is a process of preparing (pre-processing) transmission/delivery of acquired 360 video, and may include the above-described stitching, projection, region-wise packing, and/or encoding processes. That is, the pre-processing process may include a pre-processing process and an encoding process to change/make up for data of image/voice/text information according to intention of a person who made the information. For example, the process of pre-processing an image may include: a step of mapping (stitching) acquired visual information on a 360 sphere; a step of performing calibration (editing) to remove a region boundary, reduce difference in color/brightness, or apply visual effects to an image; a (view segmentation) step of segmenting an image by viewpoints; a (projection) step of mapping an image on a 360 sphere into a 2D image; a (region-wise packing) step of performing region-wise packing of an image; and a step of encoding image information. As shown in an example of a video side indicated by reference numeral 1320, a plurality of projection images from different viewing positions according to different viewpoints may be generated.

The transmission process may refer to a process of processing and transmitting image/voice data and metadata having undergone a preparation process (a pre-processing process). In order to deliver a plurality of items of image/voice data from different viewing positions according to different viewpoints and metadata related thereto, a communication network may be used or a unidirectional transmission may be utilized, as described above.

The post-processing and composition processes may refer to a post-processing process for decoding received/stored video/audio/text data and reproduce the same. For example, the post-processing process may include an unpacking process of unpacking packed images, and a re-projection process of restoring a 2D projected image into a 3D spherical image.

The rendering process may refer to a process of rendering image/video data re-projected in a 3D space and display the rendered data. In this course, an image/voice signal may be reconfigured into a form suitable to be output. It is possible to track a viewing orientation in which a region of interest for a user is present, a viewing position/head position of the ROI, and a view point of the ROI, and necessary image/voice/text information only may be selectively used based on the information. In this case, an image signal may be selected with a different viewing position according to a user's ROI, and, as a result, an image of a specific direction from a specific viewing position at a specific viewpoint may be output.

Figure 14A:
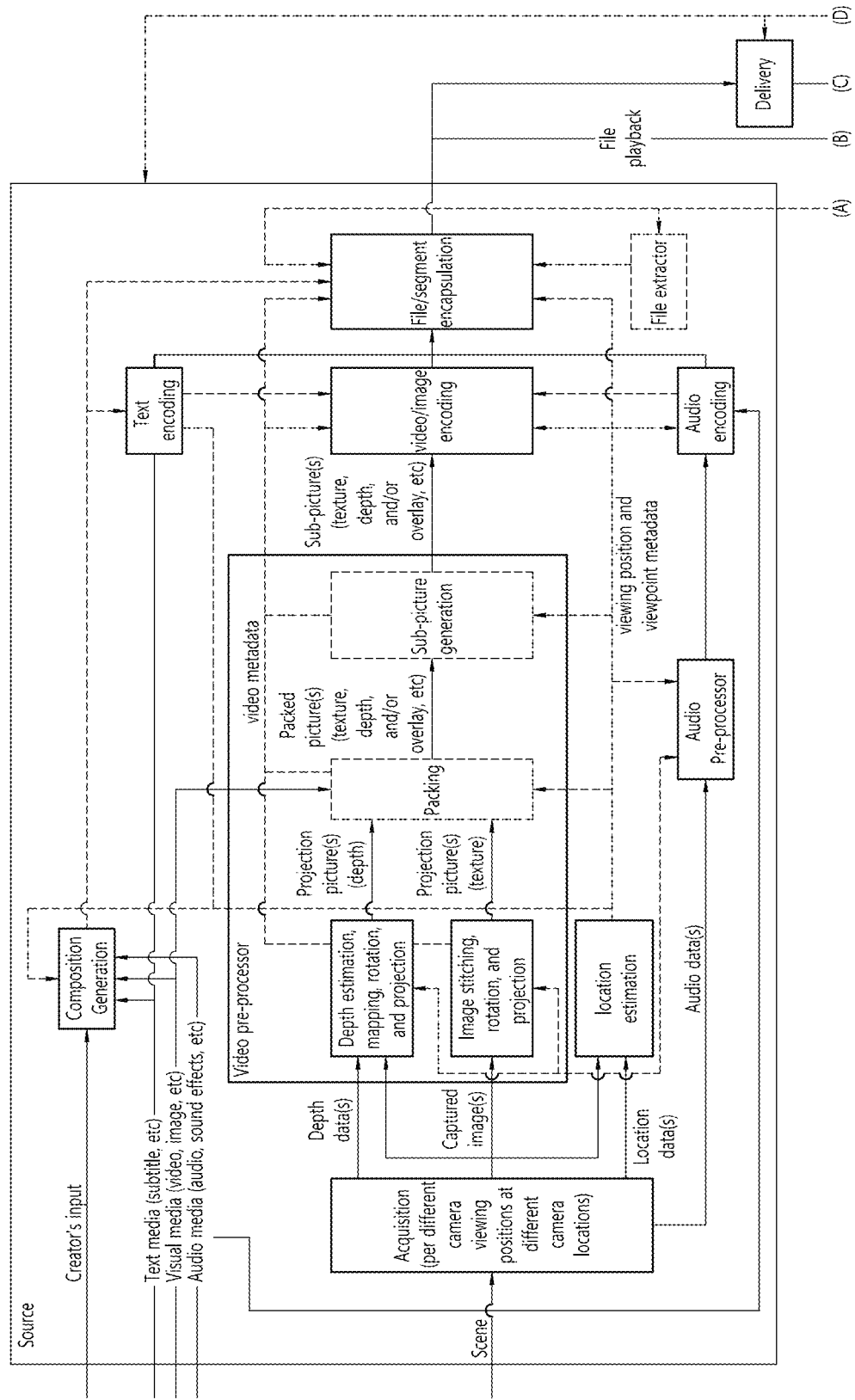
FIGS. 14A and 14B are diagrams showing an example of architecture of a three Degrees of Freedom Plus (3DoF+) end-to-end system.
Figure 14B:
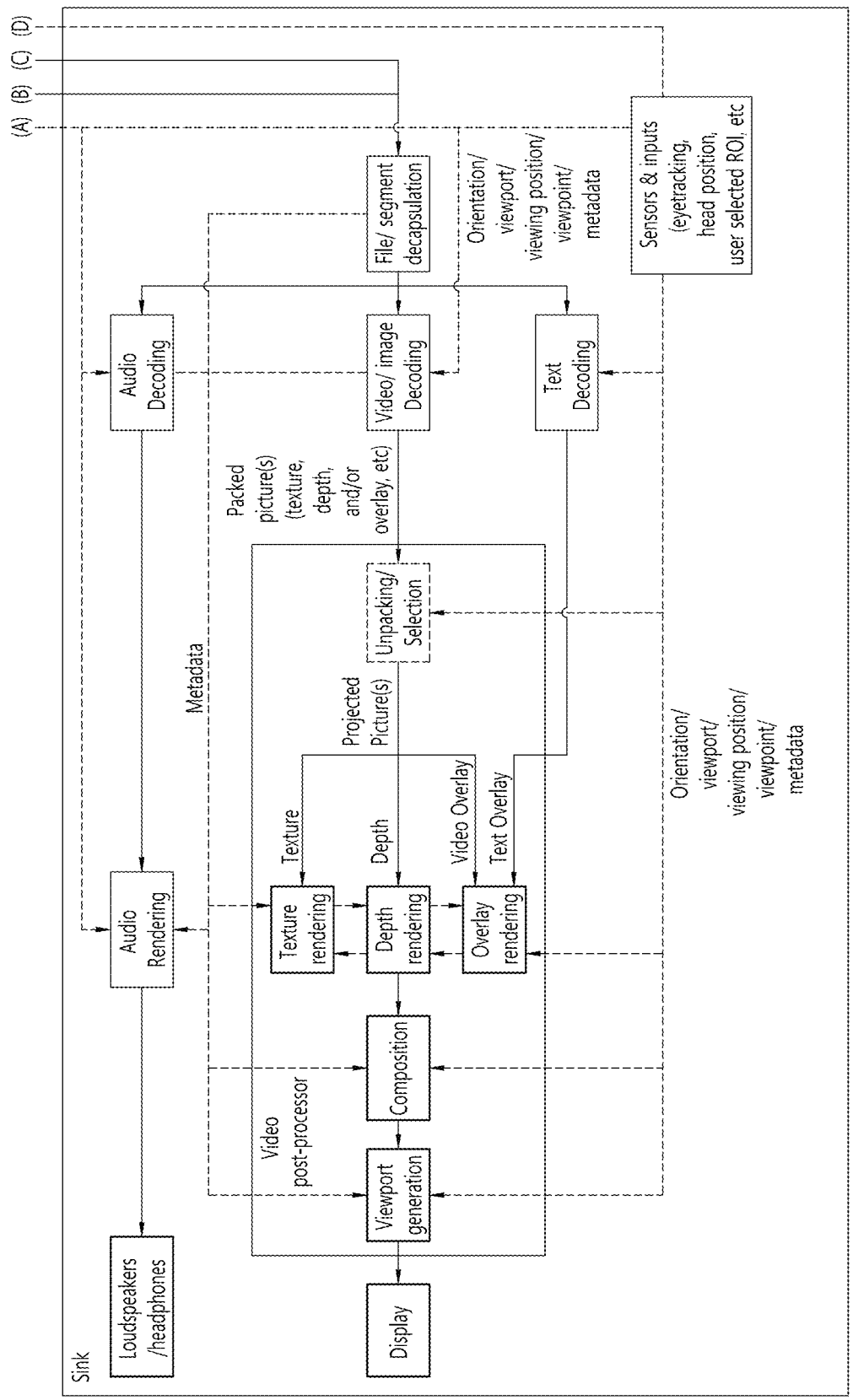

FIGS. 14A and 14B are an example of architecture of a 3DoF+ end-to-end system.

According to the architecture shown in FIGS. 14A and 14B, the above-described 3DoF+360 content may be provided.

Referring to FIG. 14A, a 360 video transmission apparatus (transmission point) may be composed largely of: a part (an acquisition unit) for acquiring 360 video (image)/audio data; a part (a video/audio pre-processor) for processing the acquired data; a part (a composition generation unit) for compositing additional information; a part (an encoding unit) for encoding text, audio, and projected 360 video; and a part (an encapsulation unit) for encapsulating the encoded data. As described above, the encoded data may be output in a bitstream form, and the encoded data may be encapsulated into a file format such as ISOBMFF and CFF or may be processed into the form of other DASH segment or the like. The encoded data may be delivered to a 360 video reception apparatus through a digital storage medium, or, although explicitly illustrated, the encoded data may undergo a process necessary for transmission by a transmission processor, as described above, and then transmitted through a broadcast network or a broadband.

In the data acquisition part, different information items may be acquired simultaneously or continuously according to a sensor orientation (a viewing orientation in an image), a sensor position (or a viewing position in an image), and a location at which a sensor acquires information (or a viewpoint in an image), and, in this case, video, image, audio, viewpoint information, etc. may be acquired.

In the case of image data, texture information and depth information may be acquired, and different video pre-processing may be performed according to characteristics of each component. For example, in the case of texture information, a 360 omnidirectional image may be constructed using images of different viewing orientations from the same viewing position at the same viewpoint based on image sensor viewpoint information, and, to this end, a stitching process may be performed. In addition, projection and/or region-wise packing may be performed to change an image to a format to be encoded. For example, a depth image may be acquired usually by a depth camera, and, in this case, the depth image may be made in the form of texture. Alternatively, depth data may be generated based on additionally measured data. After each component image is generated, additional conversion (packing) is performed on a corresponding component into a video format for efficient compression or sub-picture generation is performed to reconfigure a corresponding component into actually necessary portions by partitioning the same. Information on image configuration used in a video pre-processing step is delivered through video metadata.

In the case where image/voice/text information given in addition to acquired data (or data to be primarily serviced) is provided, it is necessary to provide information to composite the information and the data at a final reproduction time. The composition generation unit generates information, which is used to composite externally generated media data (video/image for an image, audio/effect sound for a voice, subtitle for a text, etc.) at a final reproduction step, according to intention of a producer, and the generated information is delivered through composition metadata.

Image/voice/text information having underwent respective corresponding processes is compressed using corresponding respective encoders, and encapsulated by an application on the basis of a file/or segment unit. In this case, according to a file or segment configuration method, it is possible to extract only necessary information (by a file extractor).

In addition, information necessary to reconfigure each data in a receiver is delivered on a codec level or a file format/system level, and, in this case, the data includes video/audio metadata for reconfiguring video/audio, composition metadata for overlay, viewing position and viewpoint metadata on video/audio reproduction-allowed viewpoints and a viewing position dependent on each viewpoint, etc. Such information may be processed by an additional metadata processor.

Referring to FIG. 14B, a 360 video reception apparatus (a reception point) may be composed largely of: a part (a file/segment decapsulation unit) for decapsulating a received file or segment; a part (a decoding unit) for generating image/voice/text information based on a bit stream; a part (a post-processor) for reconfiguring image/voice text; a part (a tracking unit) for tracking a user's ROI; and a display which is a display device.

Bit streams generated through decapsulation may be partitioned into image/voice/text according to a type of data and then individually decoded into a reproducible format.

In the tracking part, information on a viewpoint of a user's ROI, a viewing position at the corresponding viewpoint, and a viewing orientation from the corresponding viewing position may be generated based on information of a sensor and information of a user input, and the generated information may be used to select or extract the ROI in each module of the 360 video reception apparatus or to perform post-processing to highlight the ROI. In addition, if the generated information is delivered to a 360 video transmission apparatus, the generated information may be used in various image reconfiguration methods (viewport/viewing position/viewpoint dependent processing) for efficient bandwidth use.

A method for processing a decoded image signal may vary according to any of various processing methods depending on an image configuration method. When image packing is performed in the 360 video transmission apparatus, a process of reconfiguring an image based on information delivered through metadata is necessary. In this case, video metadata generated by the 360 video transmission apparatus may be used. In addition, in the case where the decoded image includes images of multiple-viewpoints, multiple viewing positions, or multiple viewing orientations, information matching with a viewpoint, a viewing position, or viewing orientation of a user's ROI generated through tracking may be selected and processed. In this case, viewing position and viewpoint related metadata generated by the transmission point may be used. In addition, in the case where multiple components are delivered with respect to a specific viewpoint, viewing position, or viewing orientation or video information for overlay is delivered additionally, a rendering process for respective corresponding information may be included. Video data (texture, depth, overlay) having gone through the additional rendering process goes through a composition process, and, in this case, composition metadata generated by the transmission point may be used. As a result, information necessary to reproduce a viewport according to the user's ROI may be generated.

A decoded voice signal is used to generate a voice signal through an audio renderer and/or post-processing. In this case, information matching with the user's demand may be generated based on information on a user's ROI and metadata delivered to the 360 video reception apparatus.

A decoded text signal may be delivered to an overlay renderer to be processed into text-based overlay information such as subtitle. If necessary, an additional text post-processing process may be included.

Figure 15:
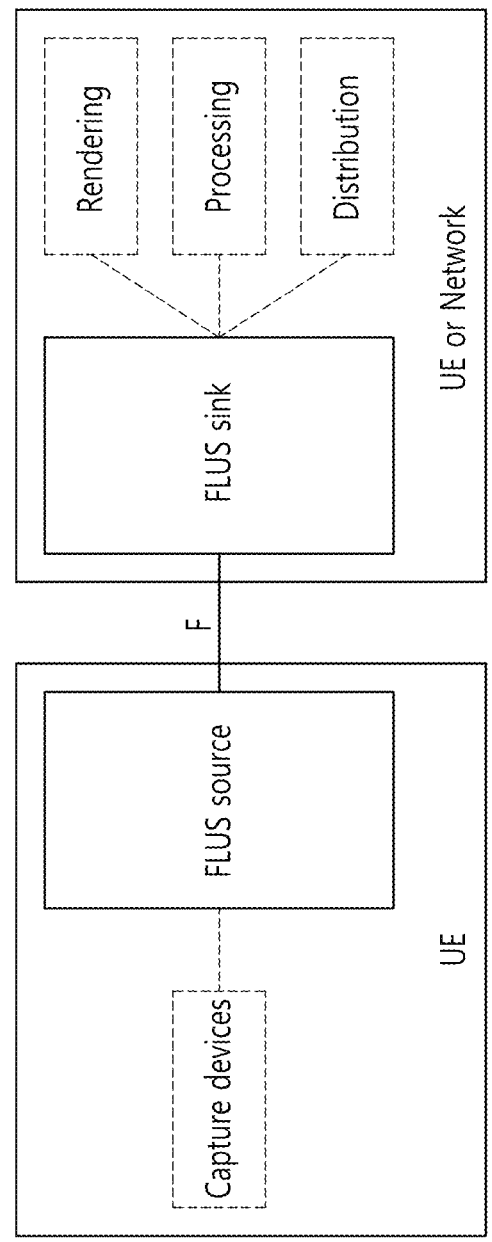
FIG. 15 is a diagram schematically showing an example of Framework for Live Uplink Streaming (FLUS) architecture.

FIG. 15 is a diagram schematically showing examples of FLUS architecture.

FIG. 15 shows an example in which a User Equipment (UE) or another UE or a network perform communication a wireless communication system based on Framework for Live Uplink Streaming (FLUS). An FLUS source and an FLUS sink may transmit and receive data to and from each other using an F reference point.

In the present specification, an "FLUS source" may indicate an apparatus that transmits data to a FLUS sink through the F reference point based on FLUS. However, the FLUS source does not always transmit data to a FLUS sink, and, in some cases, the FLUS source may receive data from the FLUS sink through the F reference point. The FLUS source may be construed to be identical/similar to an image transmission apparatus or 360 video transmission apparatus disclosed throughout the present specification, to include the image transmission apparatus or 360 video transmission apparatus, or to be included in the image transmission apparatus or 360 video transmission apparatus. The FLUS source may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sources. Examples of the FLUS source are not limited thereto.

In the present specification, an "FLUS sink" may indicate an apparatus that receives data from an FLUS sink through a F reference point based on FLUS. However, the FLUS source does not always receive data from the FLUS sink, and, in some cases, the FLUS sink may transmit data to the FLUS sink through the F reference point. The FLUS sink may be construed to be identical/similar to an image reception apparatus or 360 video reception apparatus disclosed throughout the present specification, to include the image reception apparatus or 360 video reception apparatus, or to be included in the image reception apparatus or 360 video reception apparatus. The FLUS sink may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sinks. Examples of the FLUS sink are not limited thereto.

Referring to FIG. 15, it is illustrated that an FLUS source and capture devices compose one UE, but exemplary embodiments of the present invention are not limited thereto. The FLUS source may include capture devices, and the FLUS source itself including the capture devices may be a UE. Alternatively, the capture devices may be not included in the UE and may transmit media information to a UE. The number of capture devices may be one or more.

Referring to FIG. 15, it is illustrated that an FLUS sink, a rendering module (or unit), a processing module (or unit), and a distribution module (or unit) compose one UE or network, but exemplary embodiments of the present invention are not limited thereto. The FLUS sink may include at least one of the rendering module, the processing module, or the distribution module, and the FLUS sink itself including the rendering module, the processing module, and the distribution module may be a UE or network. Alternatively, at least one of the rendering module, the processing module, or the distribution module may be not included in a UE or network, and the FLUS sink may transmit media information to at least one of the rendering module, the processing module, or the distribution module. The number of rendering modules, the number of processing modules, and the number of distribution modules may be at least one, and, in some cases, some of them may not exist.

In one example, the FLUS sink may operate as a Media Gateway Function (MGW) and/or an Application Function (AF).

In FIG. 15, the F reference point connecting the FLUS source and the FLUS sink may allow the FLUS source to establish and control a single FLUS session. In addition, the F reference point may enable the FLUS sink to authenticate and authorize the FLUS source. In addition, the F reference point may support a function of protecting security of the FLUS control plane (F-C) and the FLUS user plane (F-U).

In one embodiment, each of the FLUS source and the FLUS sink may include an FLUS ctrl module, and the respective FLUS ctrl modules of the FLUS source and the FLUs sink may be connected through the F-C. The FLUS ctrl module and the F-C may provide a function of performing downstream distribution on a media in which the FLUs sink is uploaded, provide media instantiation selection, and support configuration of static metadata for a session. In one example, when the FLUS sink is only capable of rendering, the F-C may not exist.

In one embodiment, the F-C may be used to establish and control an FLUS session. The F-C may be used to allow the FLUS source to select a FLUS media instantiation such as MTSI, provide static metadata associated with a media session, and select and configure the processing and distribution functions.

The FLUS media instance may be defined as part of the FLUS session. The F-U may, in some cases, contain media stream establishment procedures, and a plurality of media streams may be generated for one FLUS session.

A media stream may include media components of a single content type such as audio, video, and text, and may include media components of different content types such as audio and video. The FLUS session may be composed of a plurality of identical content types. For example, the FLUS session may be composed of a plurality of media streams for video.

In addition, in one embodiment, each of the FLUS source and the FLUS sink may include an FLUS media module, and the respective FLUS media modules of the FLUS source and the FLUs sink may be connected through the F-U. The FLUS media module and the F-U may provide a function of generating one or more media sessions and a function of transmitting media data through a media stream. In some cases, a media session establishment protocol (e.g., IMS session set-up for MTSI-based FLUS).

Figure 16:
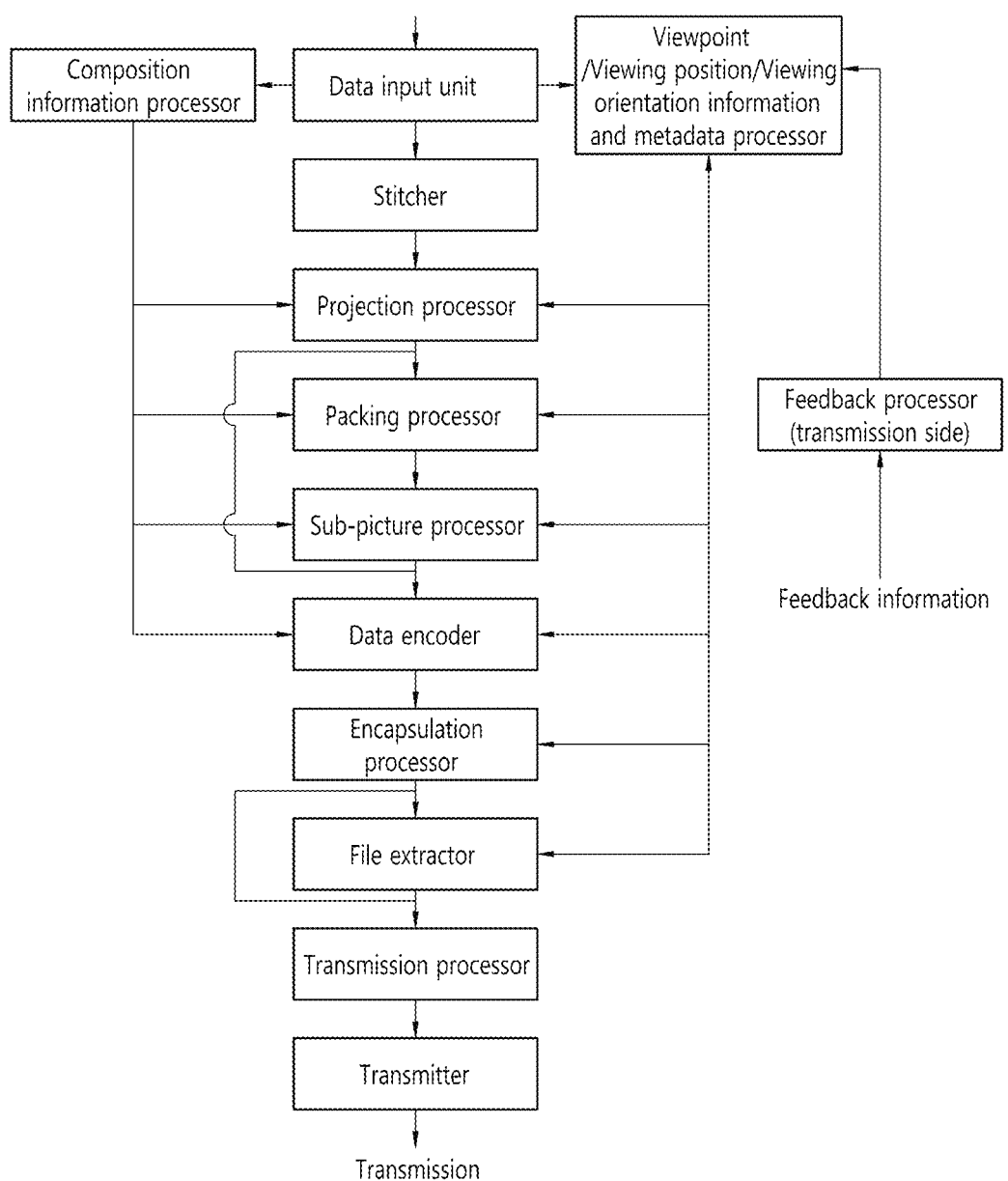
FIG. 16 is a diagram schematically showing an example of configuration of a 3DoF+ transmission point.

FIG. 16 is a diagram schematically showing an example of configuration of a 3DoF+ transmission point.

Referring to FIG. 16, if input data is an image output from a camera, a transmission point (a 360 video transmission apparatus) may perform a stitching process for each viewpoint/viewing position/component to reconfigure a sphere image. When a sphere image for each viewpoint/viewing position/component is configured, the image may be projected into a 2D image for coding. According to an application, a packing process may be performed to pack multiple images into an integrated image or an image may be partitioned into sub-pictures of detailed regions. As described above, region-wise packing may be an optional process and thus may not be performed, and, in this case, a packing processor may be omitted. If the input data is image/voice/text additional information, a method for adding the information to a central image to be displayed may be informed, and additional data may be transmitted together. An encoding process of generating a compressed image and added data into a bit stream, and an encapsulation process of transforming the bit stream into a file format for transmission or storage may be performed. In this case, depending on a demand from an application or system, a process of extracting a file necessary for a receiver may be performed. The generated bit stream may be transformed into a transmission format by a transmission processor and then transmitted. In this case, a transmission-side feedback processor may process viewpoint/viewing position/viewing orientation information and necessary metadata based on information received from the reception point so that the transmitter can process the information and the metadata.

Figure 17:
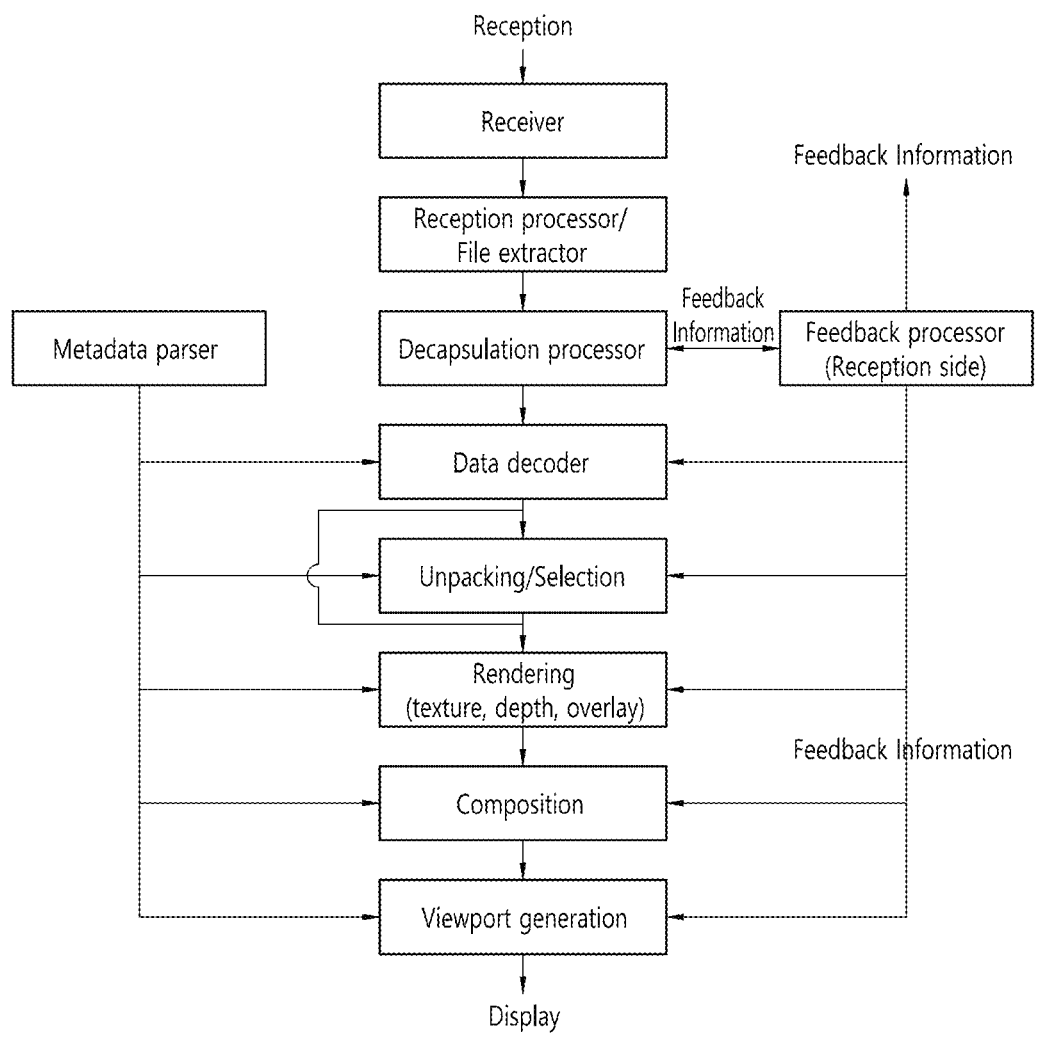
FIG. 17 is a diagram schematically showing an example of configuration of a 3DoF+ reception point.

FIG. 17 is a diagram schematically showing an example of configuration of a 3DoF+ receiver.

Referring to FIG. 17, a reception point (a 360 video reception apparatus) may receive a bit stream transmitted from a transmission point, and extract a necessary file from the bit stream. It is possible to select an image stream in a generated file format using viewpoint/viewing position/viewing orientation information and video metadata delivered from a feedback processor, and to reconfigure the selected bit stream into image information using a decoder. Packed images may be unpacked based on packing information transmitted through metadata. If the packing process is omitted in the transmission point, unpacking in the reception point may be omitted as well. In addition, as necessary, it is possible to perform a process of selecting an image suitable for a viewpoint/viewing position/viewing orientation delivered from the feedback processor and a necessary component. It is possible to perform a rendering process of reconfiguring an image into a format suitable to reproduce texture, depth, overlay information of the image. Before generating a final image, a composition process may be performed to integrate information of different layers, and an image suitable for a display viewport may be generated and reproduced.

FIG. 18 is a diagram showing an example of an overlay of 360-degree video data

An embodiment of the present invention relates to an overlay method for a VR media service and a signaling method therefor, and an editor for authoring 360 video can place overlays on 360 video.

In one embodiment, metadata may be generated based on the information of the placed overlays. The content is transferred to the data input unit of the 3DoF+ transmission point and is transmitted to a data encoder or an encapsulation processing unit through the metadata processing unit, to thereby be transmitted to 3DoF+ reception unit. In the 3DoF+ reception unit, a necessary file is extracted from the received bitstream, metadata related to the overlay is extracted through the decapsulation processing unit and metadata parser to be delivered to the rendering, and then the overlay is rendered in the rendering, which is then outputted on the screen after the composition process.

The author's input may be transmitted to the input unit together with overlaid media (text, visual and audio) on the entire architecture, and metadata related to overlay location/size/rendering attributes may be generated through the composition generation. The media may be file/segment encapsulated after being packed and going through the video/image encoding process to thereby be transmitted to the reception unit, the text may be text-encoded, the audio may be audio-encoded and may be file/segment encapsulated after going through the video/image encoding process to thereby be transmitted to the reception unit. Necessary files are extracted from the bitstream received from the reception unit, metadata related to the overlay is extracted through the decapsulation processing unit and the metadata parser, and video/image, text, and media to be overlaid through the audio decoder may be decoded. Metadata and media data, which are extracted with respect to the overlay, are transmitted to the overlay rendering, to render the overlay, and a viewport rendering is performed after going through the composition process, to thereby be outputted on the screen.

According to one embodiment, in order to provide the overlay in the VR media service, the following cases may be considered for extension due to the difference with existing general video service. Here, the overlay may include at least one of a graphic, image, scalable vector graphic (SVG), timed text (Tagged Text Markup Language), Web Video Text Tracks (WebVTT), Internet Media Subtitles and Captions 1.0.1 (IMCS1) and European Broadcasting Union Timed Text part D (EBU-TT-D), and bitmap subtitle data, but the present invention is not limited to these examples.

Therefore, according to one embodiment, overlay media track configuration about where and how overlay media and related data information is stored, overlay media packing information on how the overlay media is packed, overlay media projection information about whether the projection is applied to the overlay media, overlay media projection and packing information signaling, a method of linking overlay media tracks with VR media tracks, overlay rendering location/size information about when and where the overlay is to be located and how large the overlay should appear when VR media is played, overlay rendering attribute information about whether the overlay should be made to look transparent and how to blend the overlay, overlay Miscellaneous information about what other rendering functions of the overlay can be provided, overlay interaction information about whether interaction with the overlay is possible and if possible, in what range the interaction is possible, dynamic overlay metadata signaling, a method of linking overlay metadata track with overlay media track, and a method of signaling overlay metadata on the overlay media track may be proposed.

Figure 19:
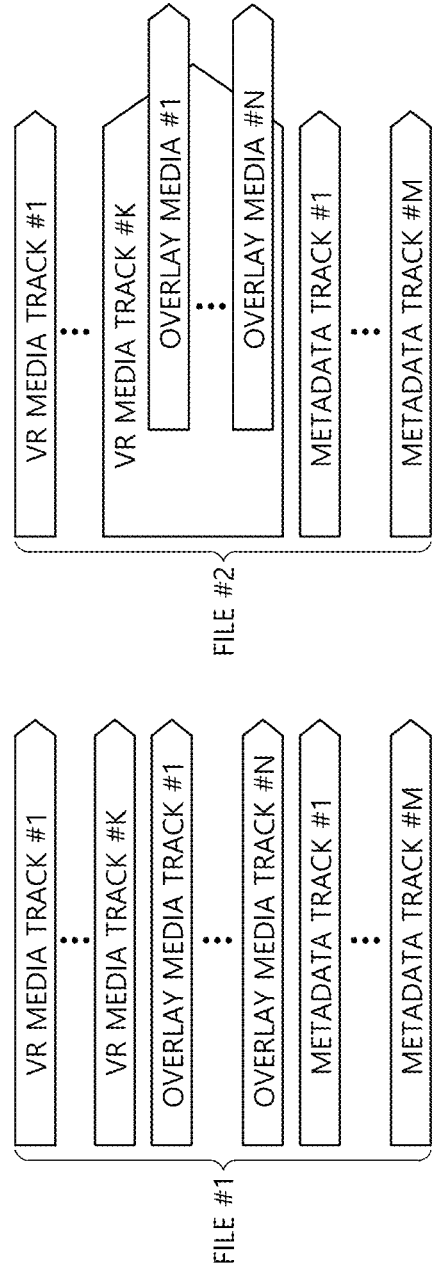
FIG. 19 is a diagram showing an example of overlay metadata signaling on an overlay media track.

FIG. 19 is a diagram showing an example of overlay metadata signaling on an overlay media track.

The scheme of configuring an overlay track within a VR media file can support both of the following: Referring to FIG. 19, one or more overlay media tracks, such as file #1, and metadata associated with the overlay media may be included. As with file #2, the overlay media can be included in the VR media track and packed in a single track.

Figure 20:
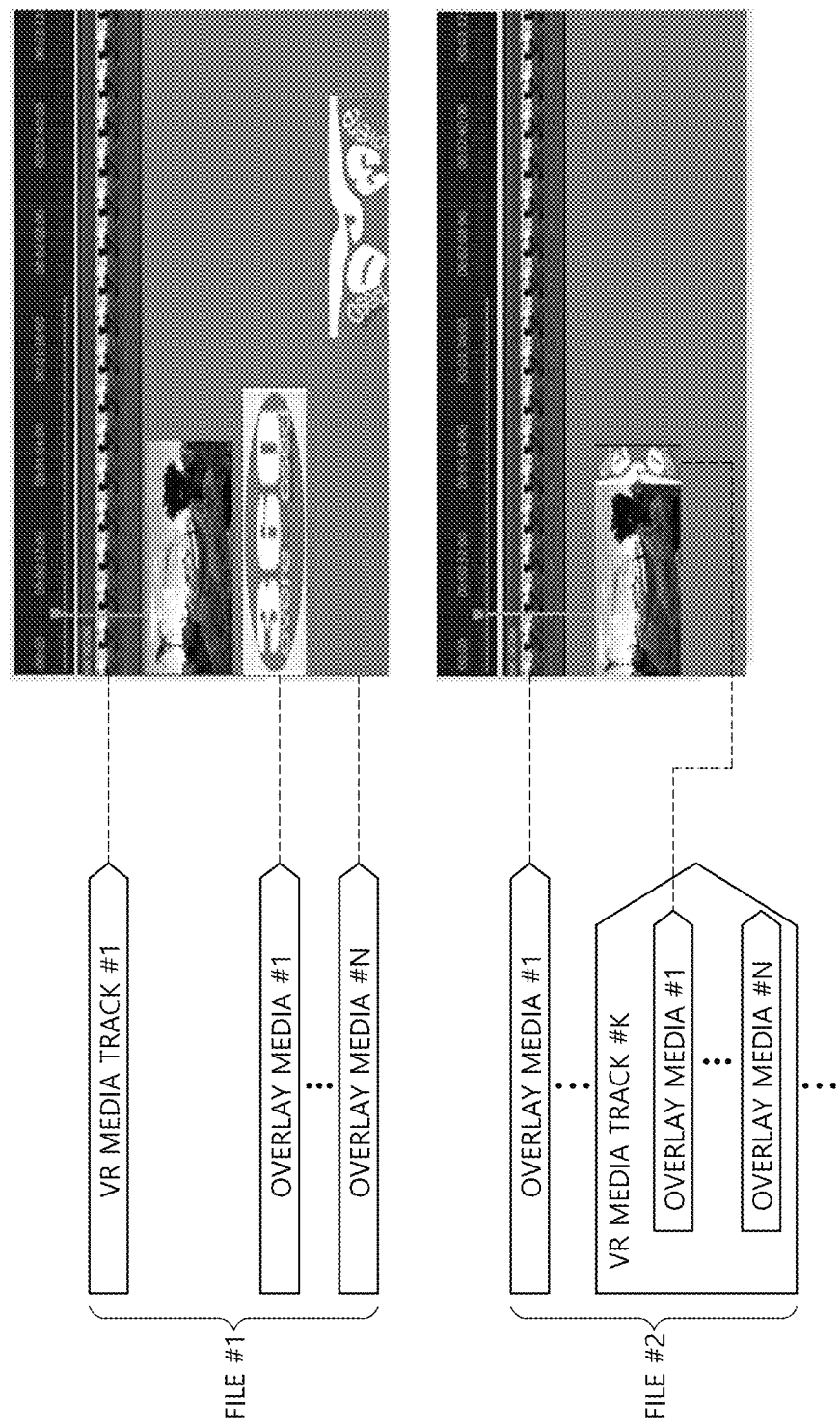
FIG. 20 shows an example of the structure of an overlay track in a VR media file.

FIG. 20 shows an example of the structure of an overlay track in a VR media file.

Referring to FIG. 20, the file #1 may be a form in which the VR media and the overlay media are separated into respective tracks. That is, the image corresponding to the overlay media may be separated from the VR media. File #2 may be a form in which the VR media and the overlay media are packed together in the VR media track. That is, the image corresponding to the overlay media may be included in the VR media.

Figure 21:
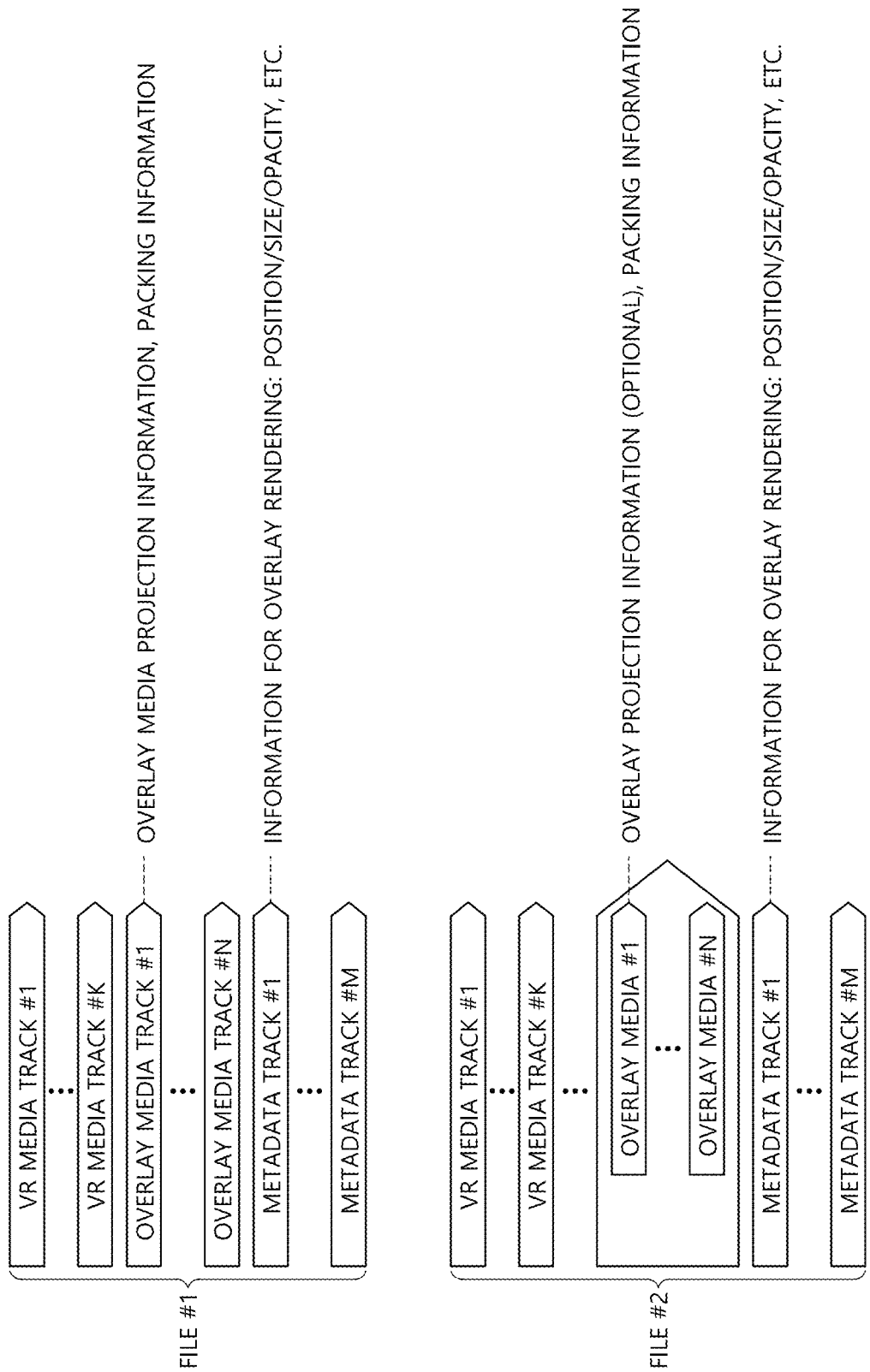
FIG. 21 is a diagram showing another example of overlay metadata signaling on an overlay media track.

FIG. 21 is a diagram showing another example of overlay metadata signaling on an overlay media track.

Referring to FIG. 21, in the case of file #1, the overlay media track may include projection information and packing information of the overlay media. In the case of file #2, overlay media may be included in the VR media track. Here, information on how the overlay media is packed may be equally required as in file #1. However, the overlay projection information may support the following two things differently from the file #1.

First, the overlay media may share projection information of the VR media track. That is, it may be necessary to assume that all the overlay media included in the VR media track is stored in a state that the projection applied to the VR media track has been applied. Secondly, projection information for each packed overlay, such as file #1, may be included separately. In this case, the overlays included in the VR media track may each have a different projection type and need not match the projection of the VR media track.

FIG. 22 shows an example of four possible overlay media packing configurations in the case of file #1.

In case of file #1, the overlay media can be packed in one overlay media track in four cases as follows. In FIG. 22, the image may refer to an overlay media. Referring to FIG. 22, the first case (Case 1) may be a case where one overlay is packed with one overlay medium. That is, one overlay may be included in one image. The second case (Case 2) may be the case where N overlays are packed with N overlay media. That is, one overlay may be included in one image, and a plurality of images may be used. Such a case can be referred to as a sub-sample case. The third case (Case 3) may be the case where N overlays are packed with one overlay medium. That is, a plurality of overlays may be included in one image, and this case may be referred to as an integrated packing case. The fourth case (Case 4) may be the case where N overlays are packed with M overlay media. That is, a plurality of overlays may be included in one image, and a plurality of images may be used. Such a case can be referred to as an integrated packing+sub-sample case. Here, N and M may be natural numbers greater than 1 and may be different from each other.

Here, since the third case and the fourth case may include at least one overlay in one image, location information of each overlay in the image may be required. Thus, location information for the overlay may be signaled.

Figure 23:
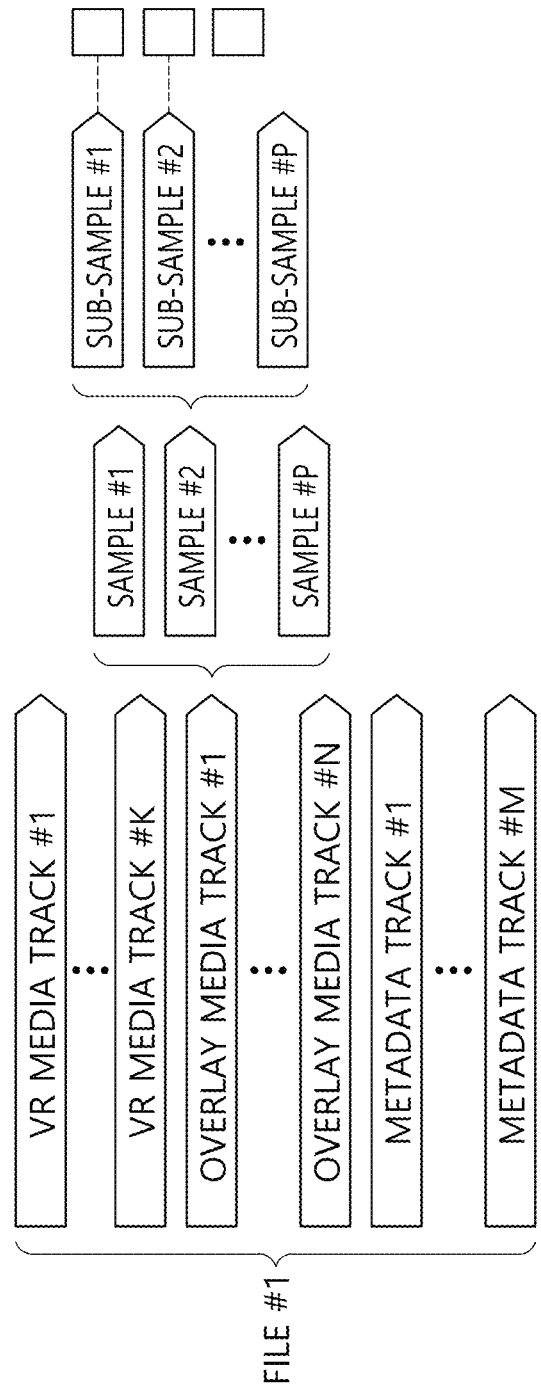
FIG. 23 shows an example of a structure in a track in the case of file #1.

FIG. 23 shows an example of a structure in a track in the case of file #1.

Referring to FIG. 23, in one embodiment, a track may include a sample. If the media is video, the sample may be data for one frame at a particular time, and if the media is images, the sample may be image data at a particular time. Here, the sample may be composed of sub-samples. A sub-sample can be constructed if there is more than one data for a particular time.

Here, the integrated packing may mean a method of packing a plurality of overlay media into one integrated form to constitute one track as one sample or sub-sample, and may mean the third case described above.

In one embodiment, a method for unified packing of multiple overlay media in one overlay media track may use the following two methods.

The first may be a method of packing overlay media into a single texture, regardless of the projection, regardless of where it is rendered by the texture atlas method. The second method is a region-wise packing method and may be a method of rendering the overlay to a predetermined, specific location in the transmitter and packing based on the projected picture of the overlay projected according to the projection type.

In one embodiment, each overlay media track may be a media track containing one overlay media, a track having multiple overlay media through sub-samples, or a media track in which multiple overlay media are integrated into a single sample. These various types of overlay media tracks can coexist in one file.

In one embodiment, a texture atlas method may be applied for overlay media packing. In real-time computer graphics, texture atlas can mean packing small textures together and packing them together into a single large texture, which can be referred to as texture atlas. The texture atlas can consist of sub-textures of the same size, and can also consist of textures of various sizes. Alternatively, the resolution of the overlay media can be configured to be maintained. Each sub-texture can extract content with a packed location information value.

Figure 24:
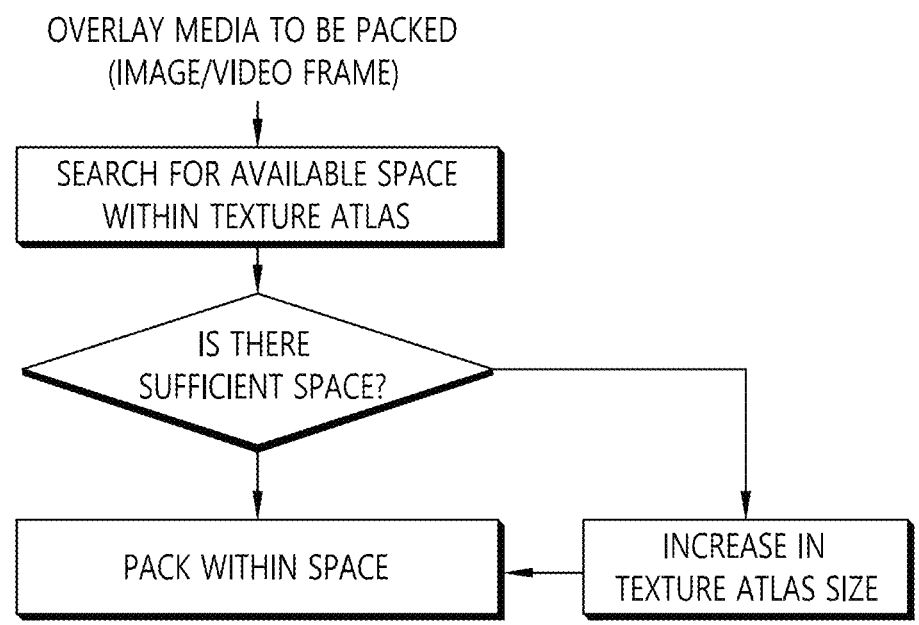
FIG. 24 shows an example of a flowchart of a method of generating a texture atlas.

FIG. 24 shows an example of a flowchart of a method of generating a texture atlas.

Referring to FIG. 24, a method of generating a texture atlas can include searching for available space in a texture atlas if there is an overlay media (image/video frame) to be packed first. Here, it is possible to judge whether there is enough space based on the overlay media and the usable space, and if it is sufficient, it can be packed in the space, and if it is not enough, the size of the texture atlas can be increased and then packed in the space.

Figure 25:
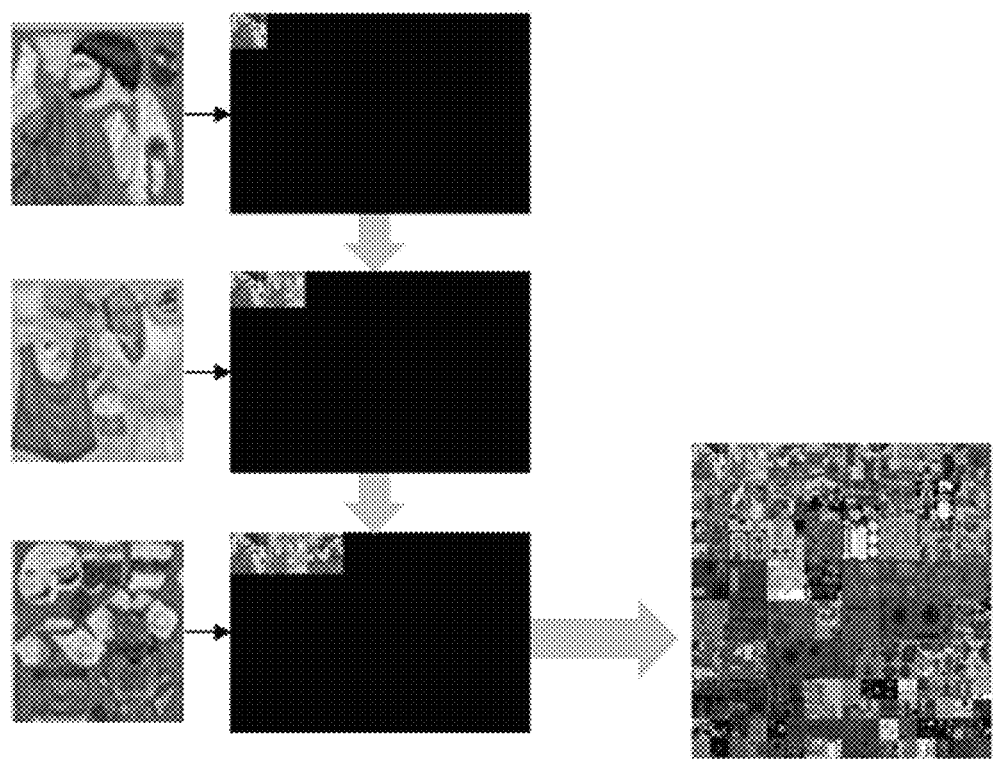
FIG. 25 shows an example of a process of generating a texture atlas.

FIG. 25 shows an example of a process of generating a texture atlas.

The above process can be illustrated as shown in FIG. 25. That is, one image can be generated by including overlay media in a usable space, and a plurality of overlay media can be included in one image through repetition. Here, usable space may refer to a space in which an overlay medium is not included in one image.

When packing is performed as described above, the number of decoders of the receiver can be reduced, and the proximity of memory references at the time of rendering can have an advantage in performance. It may also be configured to adjust the size of the sub-textures that the texture atlas may include, depending on the capabilities of the receiver. In addition, a guard band may be formed between sub-textures in order to prevent negative factors that may occur during mapping and texture compression. Here, the guard band may empty some surrounding pixels and specify the number of surrounding empty pixels when packing each overlay media.

Figure 26:
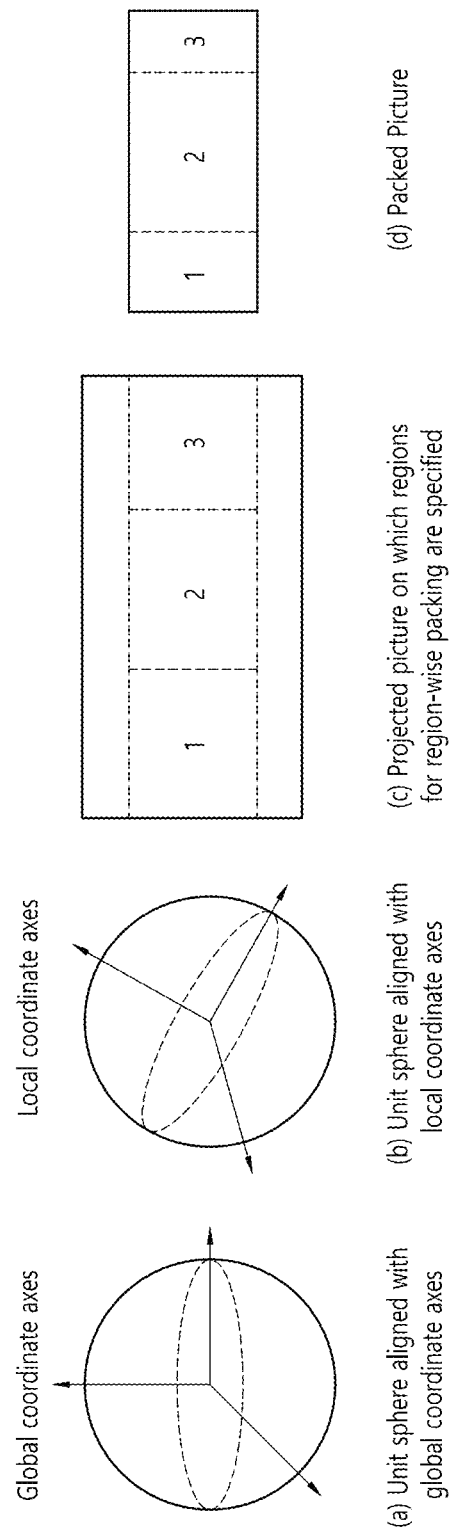
FIG. 26 is a diagram for explaining a region-wise packing of VR media.

FIG. 26 is a diagram for explaining a region-wise packing of VR media.

In one embodiment, a region-wise packing method may be applied for overlay media packing. In the region-wise packing method, the entire region of the projected picture, in which the projection is applied to the VR media (or 360 media), can be divided into sections, and the sections can be packed in different resolutions according to importance. Here, the importance may be determined, for example, according to the user viewport section. That is, referring to FIG. 32, 1, 2, and 3 sections of the sections in the projected picture of c may be packed to generate a packed picture of d.

The region-specific packing for the overlay may be the scheme in which the overlay media is constructed in accordance with the pre-rendered or projected result at the transmitter. In other words, the overlay media can be reconstructed in the form in which the location, size and projection to be rendered are applied. This approach can be referred to as burn-in. This burn-in method has the disadvantage that the flexibility may be lowered, but it has an advantage that the renderer of the receiver can be simplified.

In one embodiment, 360 overlay media of the same type as the 360 media projected for 360 degrees may be created and region-wise packing may be performed on the overlay media results according to the importance of the region or the presence of the media.

Here, the shape of the projected overlay media is not always rectangular, and the packed position value can be specified in consideration of the shape of the projected overlay. In this regard, in one embodiment, the following two methods may be supported.

First, the smallest two-dimensional rectangular bounding box surrounding the projected overlay media can be set to the overlay media region and can be repositioned within the Projected Picture (location and size being rendered). That is, the position in the projected picture can be readjusted in consideration of the position and size to be rendered. Second, it can represent a polygonal form. In this case, the region can be divided horizontally/vertically, and the information of each position point can be specified.

Figure 27:
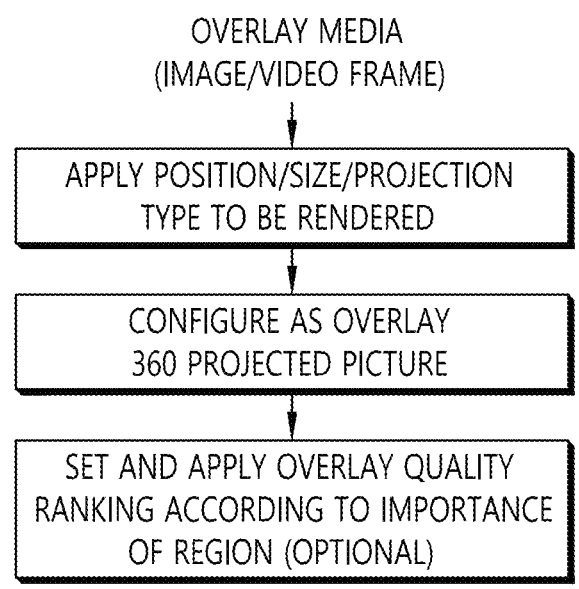
FIG. 27 shows an example of a flowchart of a region-wise packing method of overlay media.

FIG. 27 shows an example of a flowchart of a region-wise packing method of overlay media.

Referring to FIG. 27, in a region-wise packing method of overlay media, first, if there are overlay media (image/video frame), the location/size/projection type to be rendered may be applied to the overlay media, and the overlay 360 projected pictures may be configured. Thereafter, overlay quality ranking can be set and applied according to the importance of the region, but this can be selectively performed.

Figure 28:
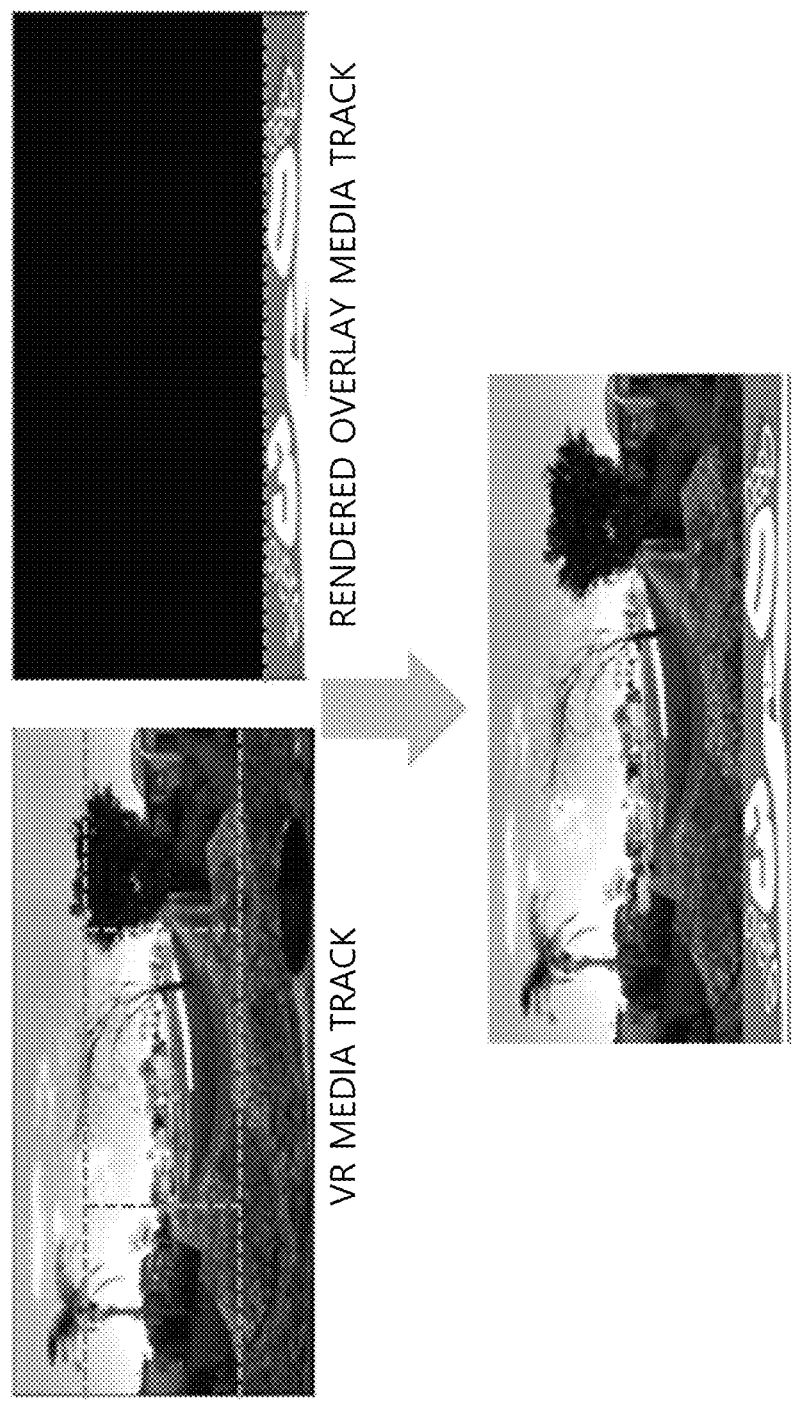
FIG. 28 shows an example showing a region-wise packing process of overlay media.

FIG. 28 shows an example showing a region-wise packing process of overlay media.

The above process can be illustrated as shown in FIG. 28. That is, it is possible to generate a rendered overlay media track, which is an overlay 360 projected picture, by applying the location/size/projection type to be rendered on the overlay media, and the rendered overlay media track can be packed together with the VR media track.

Figure 29:
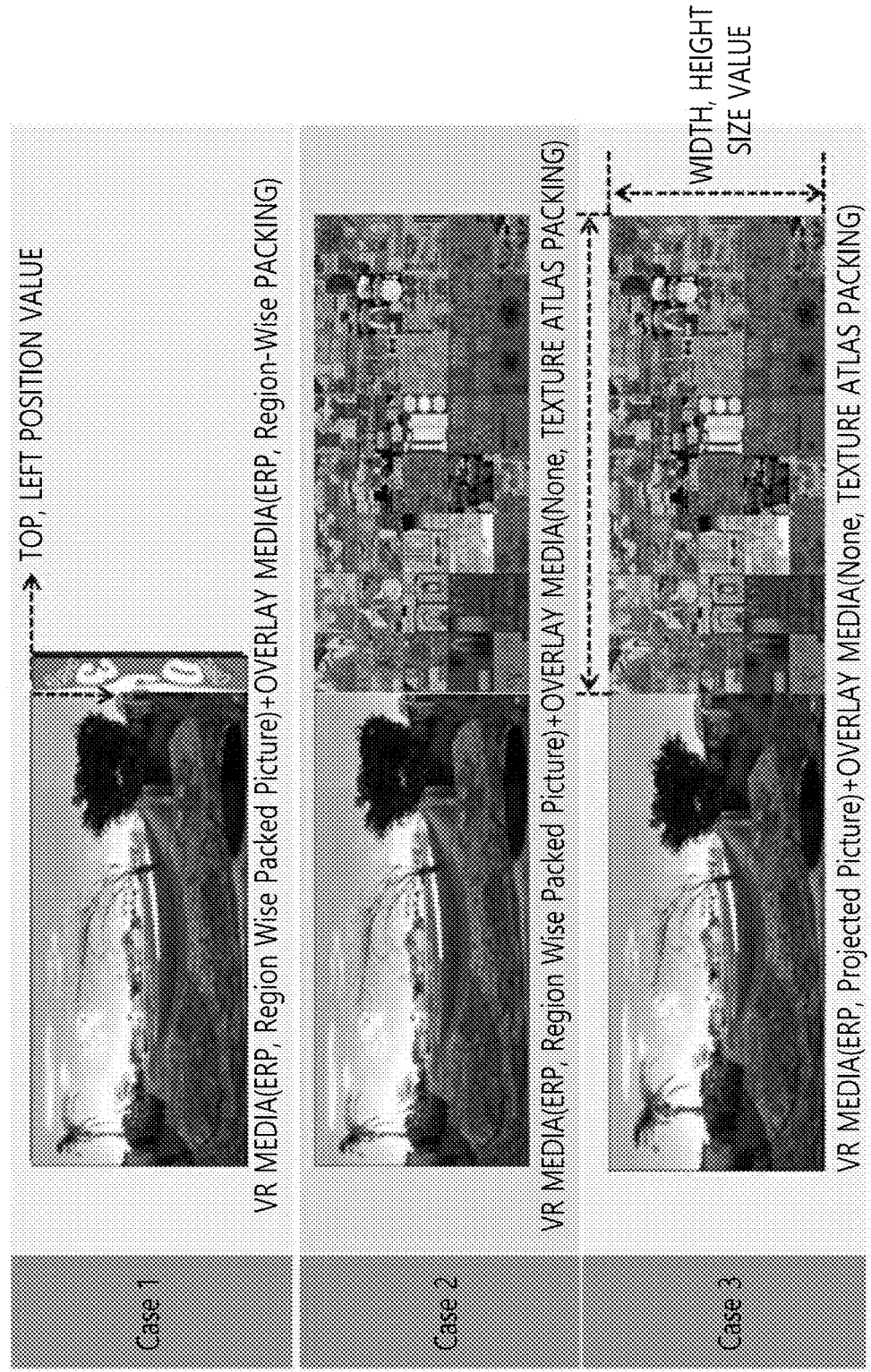
FIG. 29 shows an example of the configuration of overlay media packing in the case of file #2.

FIG. 29 shows an example of the configuration of overlay media packing in the case of file #2.

In the case of file #2, the overlay media in the VR media track can be packed into three cases as shown in FIG. 29. The first case (Case 1) may be the case where the VR media has a projection scheme of ERP and is a Region Wise Packed Picture through a region-wise packing process, and the overlay media has a projection scheme of ERP and is region-wise packed. The second case (Case 1) may be the case where the VR media has a projection scheme of ERP and is a Region Wise Packed Picture through a region-wise packing process, and the overlay media is not projected (none) and texture-atlas packed. The third case (Case 1) may be the case where the VR media has a projection scheme of ERP and is a projected picture, and the overlay media is not projected (none) and texture-atlas packed.

That is, the VR media and the overlay media may be simultaneously present in a packed picture or a projected picture of the VR media track. In this case, information on an region containing overlay media in all pictures can be specified. The information on the region may include at least one of a left point position value, a top point position value, a width value, and a height value.

Figure 30:
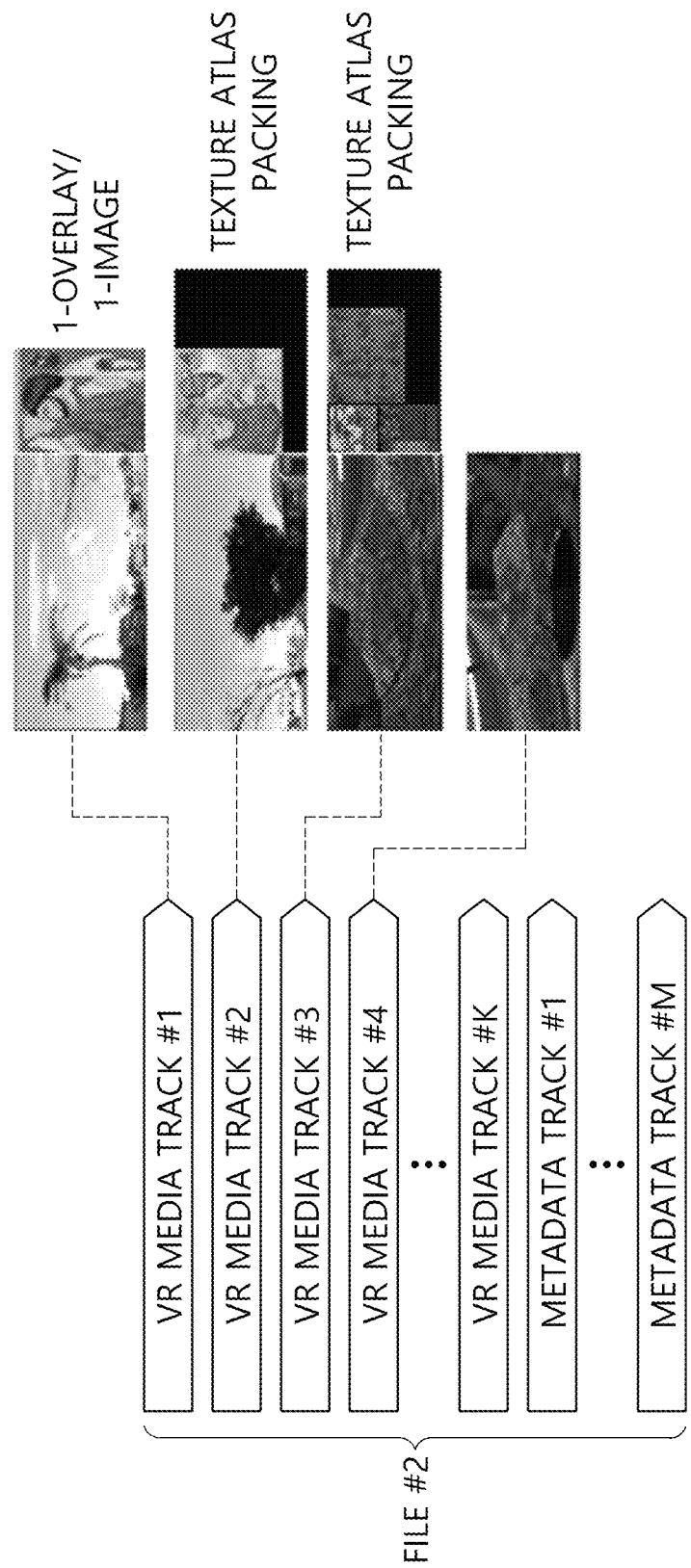
FIG. 30 shows an example of a case where a VR media track is packed with a part of VR media as overlay media in case of file #2.

FIG. 30 shows an example of a case where a VR media track is packed with a part of VR media as overlay media in case of file #2.

In one embodiment, the VR media may be divided and stored in a track, and when overlay media is stored on each VR media track, each overlay media may be packed together with each VR media track, depending on where the overlay is displayed. That is, it may correspond to a case where the VR media track to be displayed to which the overlay belongs is packed together. Alternatively, it may correspond to a case where the overlays are packed together in the VR media track to be displayed.

Referring to FIG. 30, a VR media track may include a portion of VR media and overlay media. Alternatively, each overlay media may be packed with a portion to be displayed among the entire VR media. Here, different packing methods may be applied to each track. For example, in the case of VR media track #1, packing may be performed by including one overlay in one image. In the case of VR media tracks #2 and #3, at least one overlay may be packed through the texture atlas packing method.

Here, when one picture is packed in sub-picture units, the overlay may be divided and packed. That is, when the VR media track is divided and packed into parts, such as sub-pictures, the overlay media may also be divided and packed. Alternatively, the overlay to be displayed in a part may be packed together.

Figure 31:
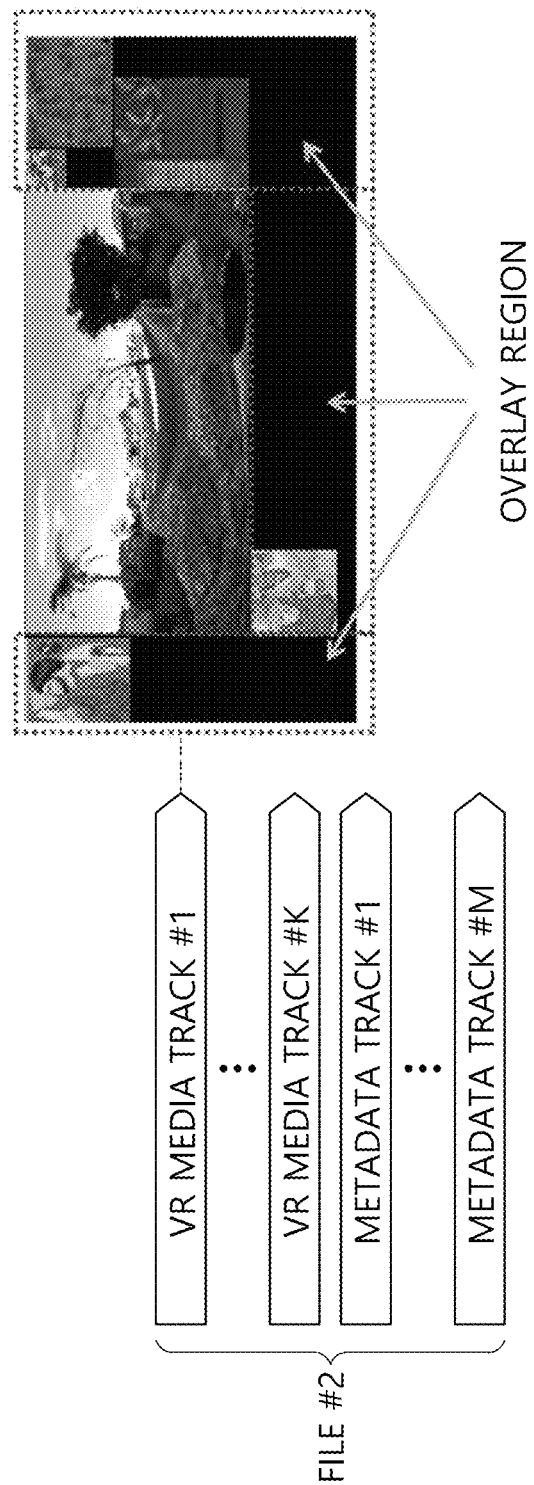
FIG. 31 shows an example in which a VR media track is packed with VR media as overlay media in the case of file #2.

FIG. 31 shows an example in which a VR media track is packed with VR media as overlay media in the case of file #2.

In one embodiment, when an overlay is packed together on a VR media track, it can be configured as shown in FIG. 37. Here, the position of the region in which the overlay media is stored is not always present on the right side of the VR media at all times, and may be located at various positions as shown in FIG. 37. For example, it may also exist on the right, left, and lower sides of the VR media. However, these parts may be specified.

In other words, when overlays are packed together in the VR media track, the projected and decoded pictures of the VR media track may not be the same, so that information about the VR media region can be specified through the RegionWisePackingBox, and the specified overlay packing location information and the VR media region may not overlap. Alternatively, they may not overlap with each other. Here, the overlay packing position information may refer to information on the position of the region where the overlay media is stored.

Figure 32:
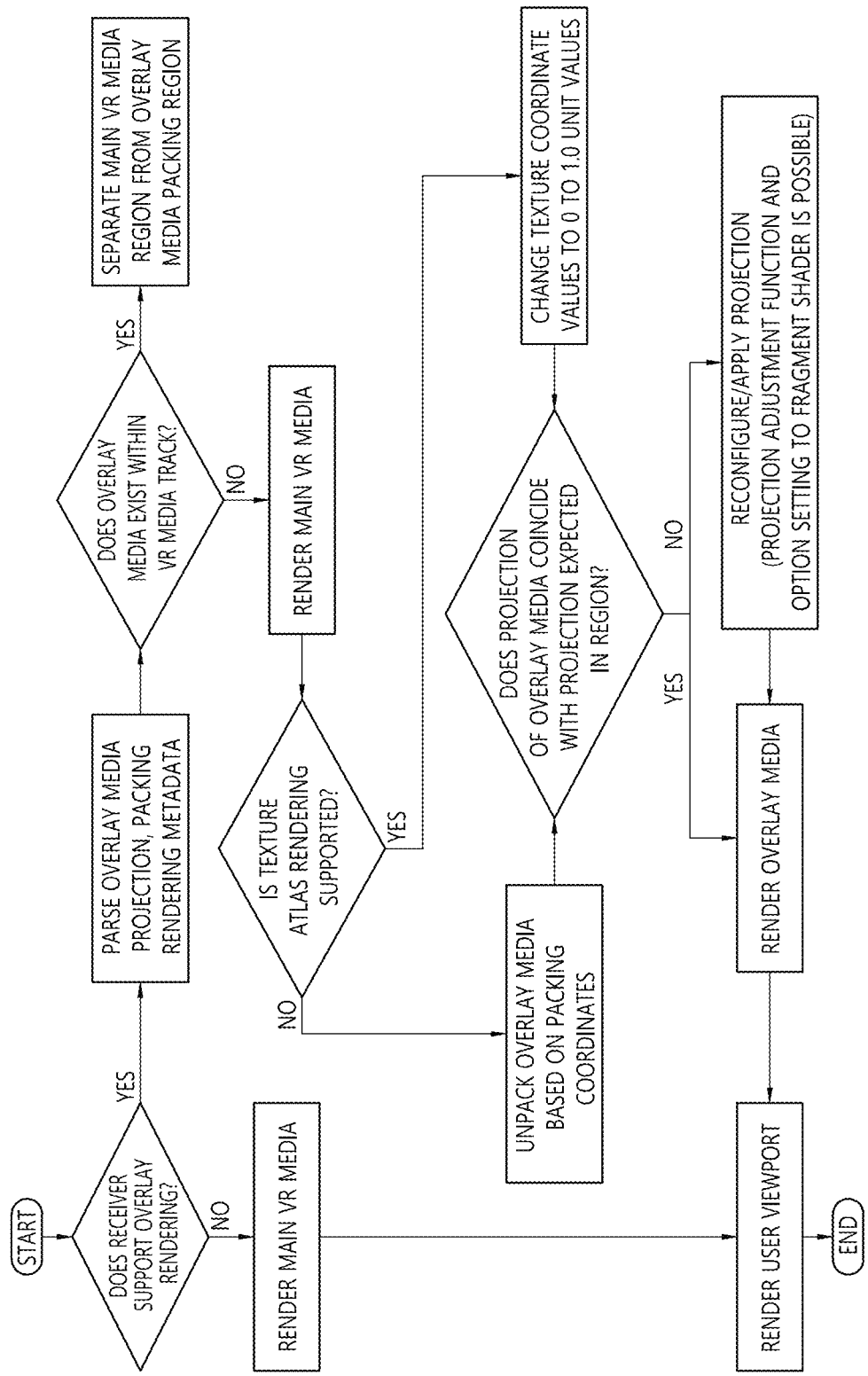
FIG. 32 shows an example of a flowchart illustrating a method of supporting overlay projection.

FIG. 32 shows an example of a flowchart illustrating a method of supporting overlay projection.

In one embodiment, the overlay media track may include projection information applied to each overlay. Also, if multiple overlays are packed in an overlay media track, projection information for each overlay can be specified. Here, the projections that can be applied to the overlay may be None, EquiRectangular Projection (ERP), or CubeMap Projection (CMP). However, CMP can be supported only when region-specific packing is applied. In addition, the projection CMP applied to the overlay may be equal to None.

In addition, the overlay media projection information and region information specified in the metadata may not be matched. For example, if the overlay media is projected to an ERP but the rendering position is set to render the overlay media on the viewport, the receiver may un-project and render the overlay media projected to the ERP.

Referring to FIG. 32, in an embodiment, it may be determined whether the receiver supports overlay rendering, and if the overlay rendering is not supported, the main VR media may be rendered and may render the user viewport.

However, if the receiver supports overlay rendering, it can parse the projection, packing, and rendering-related metadata of the overlay media and determine whether the overlay media is in the VR media track. Here, when the overlay media exists in the VR media track, the main VR media region and the overlay media's packing region can be separated and the main VR media can be rendered. However, if the overlay media does not exist in the VR media track, the main VR media may be rendered without the separation process.

Then, in one embodiment, it may be determined whether it supports texture atlas rendering. Here, if texture atlas rendering is supported, the texture coordinate value can be changed to a value in the range of 0 to 1.0 units, and if the texture atlas rendering is not supported, the overlay media content can be unpacked based on the packing coordinates.

In one embodiment, it may be determined whether the projections of the overlay media match the projections expected in the region upon rendering. Here, overlay media can be rendered if they are matched, and if not matched, projection reconstruction and application can be performed, and the overlay media can then be rendered. Here, the projection adjustment function and the option setting may be possible in the fragment shader when the projection reconstruction and application is performed. The user viewport can then be rendered.

In one embodiment, the overlay media packing and projection information may be referred to as overlay media packing and projection related information, may be signaled as metadata, and thus may be referred to as metadata. Or it may be included in the OverlayMediaPackingStruct in the metadata. Here, the structure of the overlay media packing and projection information may be referred to as a metadata structure. The OverlayMediaPackingStruct may include, for example, the following as shown in Table 1:

TABLE 1

```
aligned(8) class OverlayMediaPackingStruct( ) {
    unsigned int(16) num_overlays;
    unsigned int(5) num_regions;
    for(i = 0; i < num_regions; i++) {
        unsigne int(8) overlay_region_id[i];
        unsigned int(16) overlay_region_width[i];
        unsigned int(16) overlay_region_height[i];
        unsigned int(16) overlay_region_top[i];
        unsigned int(16) overlay_region_left[i];
    }
    for (i = 0; i < num_overlays; i++) {
        unsigned int(16) overlay_source_id[i];
        unsigned int(5) projection_type[i];
        unsigned int(3) packing_type;
        unsigned int(8) overlay_region_id[i];
        if(packing_type != 0) {
            unsigned int(1) guard_band_flag[i];
            if (packing_type == 1)
                TextureAtlasPacking(i);
            else if (packing_type == 2)
                RectRegionPacking(i);
            else if (packing_type == 3)
                PolygonRegionPacking(i);
            if (guard_band_flag[i])
                GaurdBand(i);
        }
    }
}
```

In Table 1, the num_overlays field may indicate the number of overlays contained or packed in the overlay media, and the packing_type field may indicate the overlay media packing type. In this case, if the packing_type field value is 0, it indicates that the integrated packing is not applied (none). If the packing_type field value is 1, it indicates that texture atlas packing is applied. If the packing_type field value is 2, a rectangular region-wise packing is applied. If the packing_type field value is 3, it indicates that a polygon region-wise packing is applied.

In addition, the num_regions field may indicate the number of the regions where the overlays are packed, and the overlay_region_id field may indicate the identifiers of the packing regions. The overlay_region_width field, the overlay_region_height field, the overlay_region_left field, and the overlay_region_top field may indicate the size and position information of the packing region. That is, each can indicate the width value, the height value, the left position value, and the upper position value of the packing region.

In addition, the overlay_source_id field may indicate an identifier of each overlay media, and the projection_type field may indicate a projection type applied to each overlay media. Here, if the projection_type field value is 0, it indicates that the projection is not applied (none), 1 indicates that the ERP (Equirectangular projection) is applied, and 2 indicates that the Cubemap projection is applied.

The overlay_region_id field in the second "for" sentence in Table 1 may indicate an identifier of the packing region as described above, but it may be specified to specify in which overlay packing region the overlay media is stored.

In addition, the guard_band_flag field may indicate a flag indicating whether or not the sub-texture guard band exists when packing is applied.

In Table 1, TextureAtlasPacking may contain information or metadata about texture atlas packing, and may be included in the case of a packing_type field value of 1 (packing_type=1). TextureAtlasPacking can include the following, as shown in Table 2.

TABLE 2

```
aligned(8) class TextureAtlasPacking(i) {
    unsigned int(16) width[i];
    unsigned int(16) height[i];
    unsigned int(16) top[i];
    unsigned int(16) left[i];
    unsigned int(3) transform_type[i];
    bit(5) reserved = 0;
}
```

In Table 2, the width field, the height field, the top field, and the left field may indicate position and size information within the texture atlas. Or it may indicate position and size information of the overlay media within the texture atlas. That is, each can indicate the width value of the overlay media, the height value, the position value of the upper point and the position value of the left point in the atlas.

The transform_type field may also indicate a rotation value within the texture atlas. Or it may indicate the rotation value of the overlay media in the atlas. In this case, when the transform_type field value is 0, it indicates no rotation, when the value is 1, it indicates horizontal mirroring, when the value is 2, it indicates 180-degree rotation, when the value is 3, it indicates 180-degree rotation and horizontal mirroring, when the value is 4, it indicates 90-degree rotation and horizontal mirroring, when the value is 5, it indicates 90-degree rotation, when the value is 6, it indicates 270-degree rotation and horizontal mirroring, and when the value is 7, it indicates 270-degree rotation. Here, the rotation may be clockwise or counterclockwise.

In the above Table 1, RectRegionPacking may include information on region-wise rectangular packing or metadata, and may be included in the case that the packing_type field value is 2 (packing_type=2). RectRegionPacking may include the following as shown in Table 3.

TABLE 3

```
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

In Table 3, the proj_reg_width field, the proj_reg_height field, the proj_reg_top field, and the proj_reg_left field may indicate position and size information in the projected picture. That is, each can indicate the width value of the overlay media, the height value, the position value of the upper point and the position value of the left point in the projected picture. The transform_type field may indicate a rotation value in the projected picture, and the indication according to the value of the transform_type field may be the same as in Table 2 or may be different.

In addition, the packed_reg_width field, the packed_reg_height field, the packed_reg_top field, and the packed_reg_left field may indicate position and size information in a packed picture. That is, each can indicate the width value of the overlay media, the height value, the position value of the upper point and the position value of the left point in the packed picture.

In the above Table 1, PolygonRegionPacking may include information on region-wise polygon-shaped packing or metadata, and may be included in the case that the packing_type field value is 3 (packing_type=3). In one embodiment, the packing region may be specified as a polygon if the projected overlay shape is not the shooting type. PolygonRegionPacking can contain the following as shown in Table 4.

TABLE 4

```
aligned(8) class PolygonRegionPacking(i) {
    unsigned int(8) num_rings;
    unsigned int(8) num_sectors;
    for (i = 0; i < num_rings; i++) {
        for (j =0; j < num_sectors; j++) {
            unsigned int(16) proj_points_x[i][j];
            unsigned int(16) proj_points_y[i][j];
        }
    }
    unsigned int(3) transform_type[i];
    bit(5) reserved = 0;
    for (i = 0; i < num_rings; i++) {
        for (j =0; j < num_sectors; j++) {
            unsigned int(16) packed_points_x[i][j];
            unsigned int(16) packed_points_y[i][j];
        }
    }
}
```

In Table 4, the num_rings field can indicate the number of horizontally divided regions in the projected picture, and the num_sectors field can indicate the number of vertically divided regions in the projected picture. The proj_points_x field and the proj_points_y field can indicate the position value in the projected picture of each division point. That is, it can indicate the position value of the x axis point (or x axis coordinate value) of division points in each projected picture and the position value of the y axis point (or y axis coordinate value). The transform_type field may indicate a rotation value in the projected picture, and the indication according to the value of the transform_type field may be the same as in Table 2 or may be different.

The packed_points_x field and the packed_points_y field may indicate the position value at each divided point in the packed picture. That is, it can indicate the position value of the x axis point (or x axis coordinate value) of division points in each packed picture and the position value of the y axis point (or y axis coordinate value).

In one embodiment, an overlay plane may be generated on a sphere, in which case a surface mesh may be created with reference to the number of horizontal region divisions and the number of vertical region divisions.

In Table 1, the GuardBand may include information on guard bands or metadata, and may be included when the value of the guard_band_flag field is 1 (guard_band_flag=1). The GuardBand may include the following as shown in Table 5:

TABLE 5

```
aligned(8) class GuardBand(i) {
    unsigned int(8) left_gb_width[i];
    unsigned int(8) right_gb_width[i];
    unsigned int(8) top_gb_height[i];
    unsigned int(8) bottom_gb_height[i];
}
```

In Table 5, the left_gb_width field, the right_gb_width field, the top_gb_height field, and the bottom_gb_height field may indicate information about left, right, up and down gaps for setting the guard band region around one overlay texture. That is, each may indicate a width value of the left gap of the overlay texture, a width value of the right gap of the overlay texture, a height value of the upper gap of the overlay texture, and a height value of the lower gap of the overlay texture.

Figure 33:
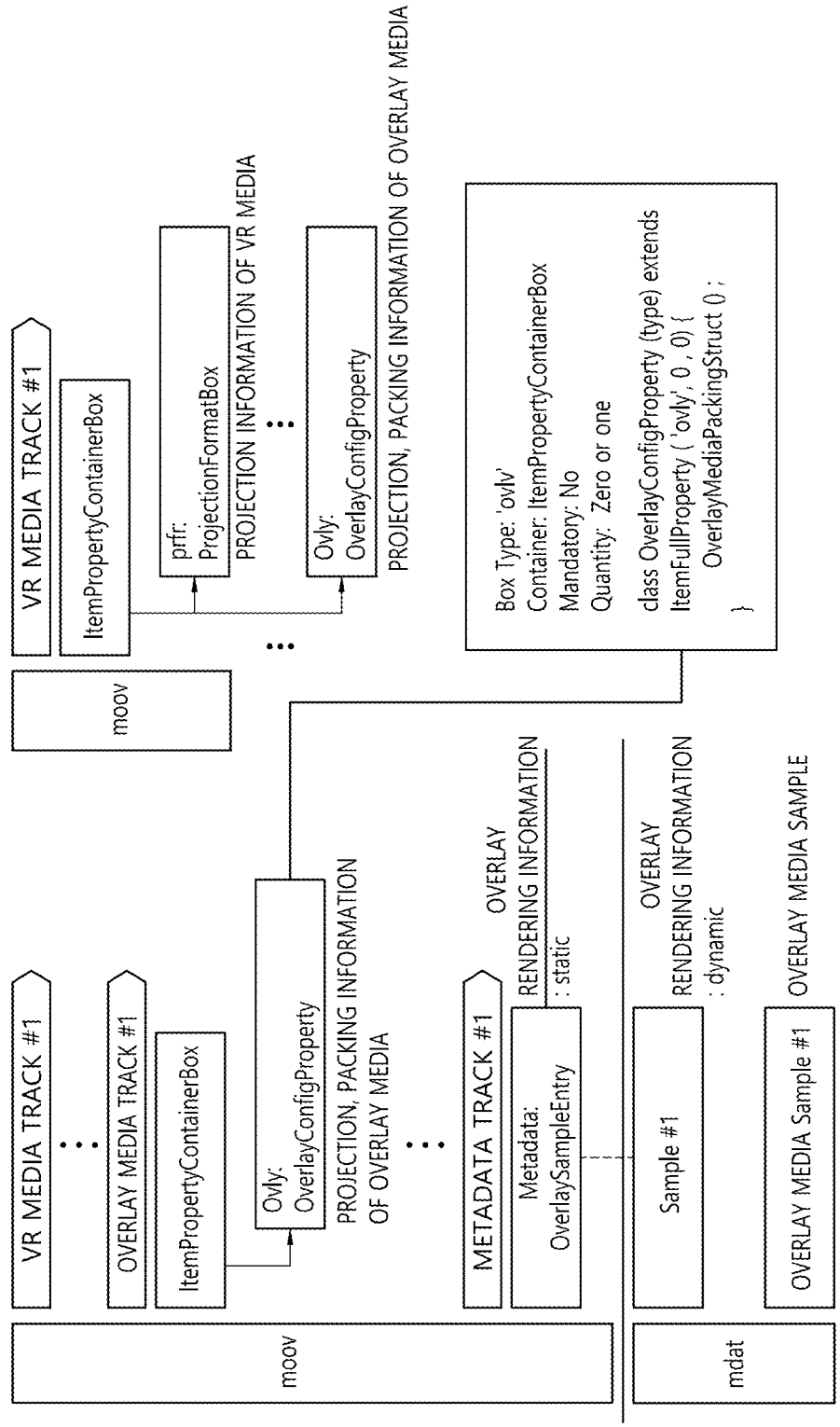
FIG. 33 shows an example of metadata signaling for overlay media packing and projection.

FIG. 33 shows an example of metadata signaling for overlay media packing and projection.

FIG. 33 shows a case where the overlay media track is an image. Referring to FIG. 33, in the case of file #1 and the overlay media track is an image in one embodiment, the overlay media track in the move box may include an ItemPropertyContainerBox, and the ItemPropertyContainerBox may include an OverlayConfigProperty. Here, the OverlayConfigProperty may include the projection and packing information of the overlay media. Or OverlayMediaPackingStruct( ) including the projection and packing information of the overlay media may be included. Here, OverlayMediaPackingStruct( ) may be as shown in Table 3.

In the case of file #2 and in the case that the VR media track is an image, the VR media track may include ItemPropertyContainerBox, and the ItemPropertyContainerBox may include OverlayConfigProperty. Here, the ItemPropertyContainerBox can also include ProjectionFormatBox. The OverlayConfigProperty may include the projection and packing information of the overlay media. Or OverlayMediaPackingStruct( ) including the projection and packing information of the overlay media may be included. Here, OverlayMediaPackingStruct( ) may be as shown in Table 1.

The above-described OverlayConfigProperty may have an attribute shown in FIG. 33, and may include the following as shown in Table 6 below.

TABLE 6 class OverlayConfigProperty (type) extends ItemFullProperty ( 'ovly', 0, 0) {
    OverlayMediaPackingStruct( );
}

That is, the OverlayConfigProperty may be a box type ovly, the container may be ItempropertycontainerBox, it may not be mandatory (No), and the quantity may be 0 or 1. Also, the OverlayMediaPackingStruct( ) may include the projection and packing information of the overlay media, and may be as shown in Table 1.

In other words, when an overlay media track is included, the ItemPropertyContainerBox may include OverlayConfigProperty to store static information or default information, and the overlay related metadata may include ItemPropertyContainerBox. In this case, the media may include an image.

Figure 34:
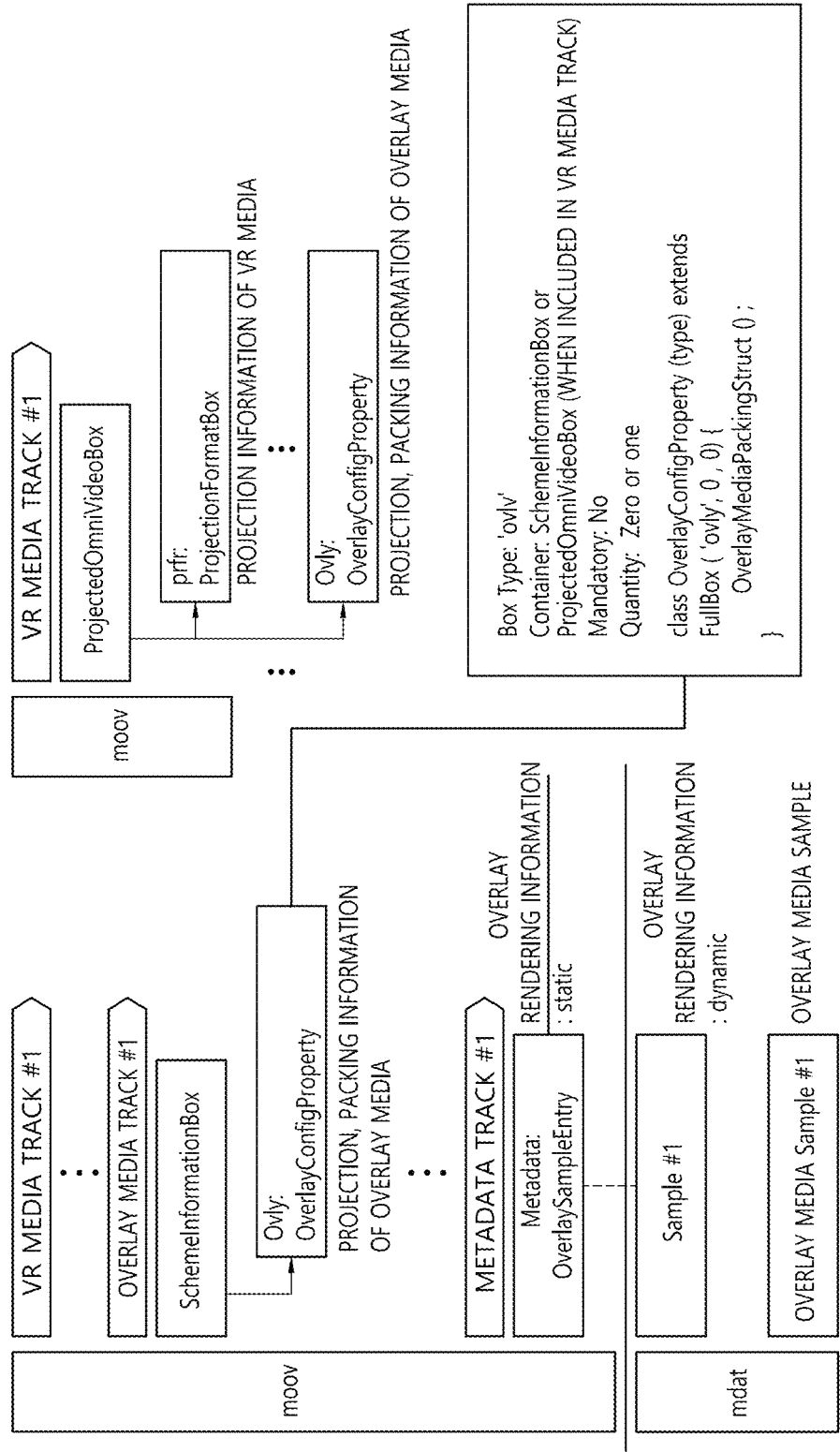
FIG. 34 shows another example of metadata signaling for overlay media packing and projection.

FIG. 34 shows another example of metadata signaling for overlay media packing and projection.

FIG. 34 shows another example of metadata signaling for overlay media packing and projection.

FIG. 34 shows a case where the overlay media track is a video. Referring to FIG. 34, in the case of file #1 in one embodiment, and in the case that the overlay media track is a video (not projected), the overlay media track may include SchemeInformationBox, and the SchemeInformationBox may include OverlayConfigBox. Here, the OverlayConfigBox may include the projection and packing information of the overlay media. Or OverlayMediaPackingStruct( ) including the projection and packing information of the overlay media may be included.

In one embodiment, the next overlay video scheme 'resv' may be generated to include the unprojected overlay video in the SchemeInformationBox. The overlay video scheme for the limited video sample type 'resv' may specify that the decoded picture is an overlay video picture.

In one embodiment, the scheme type field value of the SchemeTypeBox in the RestrictedSchemeInfoBox may be set to 'oldv'. If the SchemeType of the SchemeTypeBox in the RestrictedSchemeInfoBox is 'oldv', OverlayConfigBox can be called out. Here, the 'oldv' scheme type may be defined as an open-ended scheme type for overlay video. In this case, since the 'oldv' scheme type is an extensible scheme, the version value specified for the OverlayConfigBox may be used, and other values may be added. If the OverlayCofigBox is present in the SchemeInformationBox, the StereoVideoBox may not be present in the SchemeInformationBox, and the SchemeInformationBox may contain other boxes, either directly or indirectly. That is, if the overlay is non-projected video (if the scheme type field value is 'oldv'), the SchemeInformationBox may contain OverlayConfigBox.

In the case of file #2 and when the VR media track is video (if projected), the VR media track may include ProjectedOmniVideoBox and the ProjectedOmniVideoBox may include OverlayConfigBox. Here, the OverlayConfigBox may include the projection and packing information of the overlay media. Or OverlayMediaPackingStruct( ) including the projection and packing information of the overlay media may be included. That is, if the overlay is a projected video (if the scheme type field value is 'podv') then the ProjectedOmniVideoBox may contain OverlayConfigBox.

The above-described OverlayConfigbox may have attributes shown in FIG. 40, and may include following as shown in Table 7 below.

TABLE 7 class OverlayConfigBox (type) extends FullBox ( 'ovly', 0, 0) {
    OverlayMediaPackingStruct( );
}

That is, in the case of the OverlayConfigBox, the box type may be ovly, and if SchemeInformationBox or VR media track is included in the container, it may be ProjectedOmniVideoBox, it may not be mandatory (No), and the quantity may be 0 or 1. Also, the OverlayMediaPackingStruct( ) may include the projection and packing information of the overlay media, and may be as shown in Table 3.

Hereinafter, according to an embodiment of the present invention, a method of grouping and/or linking main VR media tracks and overlay media tracks may be proposed.

Figure 35A:
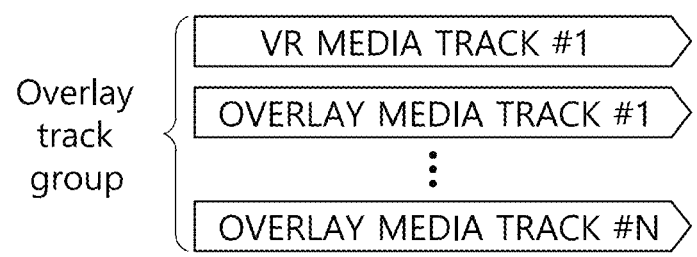
FIGS. 35A and 35B show examples of grouping and linking of VR media tracks and overlay media tracks.
Figure 35B:
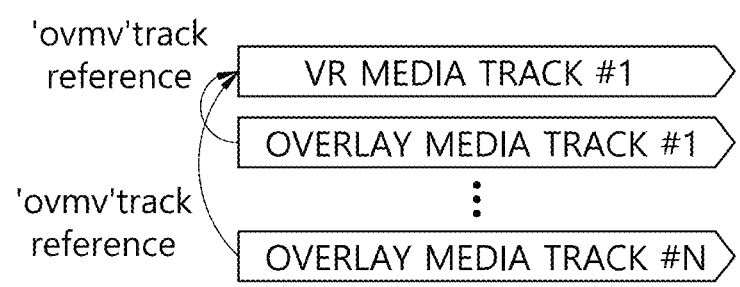

FIGS. 35A and 35B show examples of grouping and linking of VR media tracks and overlay media tracks.

Referring to FIG. 35A, when the main VR media and the overlay media are included in the file as separate tracks as in the file #1 in one embodiment, the TrackGroupTypeBox having the track_group_type field value 'ovgr' may indicate a track group including main VR media and overlay media. This may refer to a group of tracks that can be rendered with an overlay or the like in a 360 scene. That is, it may be indicated that tracks having the same track_group_id field value can be rendered together with the overlay, etc. in the 360 scene. This allows the player to conveniently retrieve the main media and overlay media.

Referring to FIG. 35A, the VR media track #1 and the overlay media tracks #1 to #N may be an overlay track group, and they may have the same track_group_id field value and may be rendered together.

Here, the TrackGroupTypeBox having the track_group_type field value 'ovgr' described above may include OverlayVideoGroupBox, and the OverlayVideoGroupBox may include the following as shown in Table 8 below.

TABLE 8 aligned(8) class OverlayVideoGroupBox extends TrackGroupTypeBox( 'ovgr ') {
    unsigned int(5) media_type;
    unsigned int(1) main_media_flag;
    unsigned int(1) overlay_media_flag;
    if ((media_type == 1 )|| (overlay_media_flag)){
        unsigned int(1) overlay_essential_flag;
    }
    bit(1) reserved = 0;
}

In Table 8, the media_type field can indicate the type of media in the track group. For example, if the value of the media_type field is 0, it indicates that the media is the main media. If the value is 1, it indicates that the media is the overlay media. In addition, the main_media_flag field may indicate a flag indicating whether the media is main media, and the overlay_media_flag field may indicate a flag indicating whether the media is overlay media. The overlay_essential_flag field may indicate a flag indicating whether the overlay media should be necessarily overlaid. Here, in the case of an overlay media that should be necessarily overlaid, a flare that does not support overlay may not play the main media in the same group.

Referring to FIG. 35B, in one embodiment, when the main VR media and the overlay media are included on a file as separate tracks, the overlay media may indicate the main VR media to be overlaid using TrackReferenceTypeBox of the overlay media track. To this end, the overlay media may indicate the main media to be overlaid by adding a new reference type, i.e., with the reference_type field value of 'ovmv' and indicating one or more main VR media track identifiers or track group identifiers (when transmitted through one or more tracks by the main VR media). In other words, the tracks referred to by the 'ovmv' and track_IDs fields may be tracks of the main media overlaid with the current overlay media.

Referring to FIG. 35B, overlay media tracks #1 to #N may indicate VR media track #1 to be overlaid based on 'ovmv' track reference.

TrackReferenceBox and TrackReferenceTypeBox may include the following as shown in Table 9 below.

TABLE 9

```
aligned(8) class TrackReferenceBox extends Box( 'tref' ) {
}
aligned(8) class TrackReferenceTypeBox (unsigned int(32)
reference_type)
    extends Box {
        unsigned int(32) track_IDs[ ];
}
```

In Table 9, the track_ID field may be an integer that provides a reference from the containing track to another track within the presentation, and the track_IDs field cannot be reused and cannot have a value equal to 0. Also, the reference_type field may be referred to or indicated as described above, and may be set to one of the following values.

In one embodiment, if the main VR media and the overlay media are included in the same track, as in file #2, the track may include SampleToGroupBox whose grouping type field value is 'ovmv'. The SampleToGroupBox can refer to samples that should be rendered (including overlays) among the samples included in the track. If there is SampleToGroupBox whose grouping_type field value is 'ovmv' in the track, SampleGroupDescriptionBox whose grouping_type field value is 'ovmv' may exist. This may include information that is commonly applied to samples that are rendered (overlaid) together. Or an OverlayEntry may be included. OverlayEntry may refer to a sample group entry whose grouping_type field value is 'ovmv', and the OverlayEntry may include the following as shown in Table 10 below.

TABLE 10

```
class OverlayEntry( ) extends SampleGroupDescriptionEntry(' ovmv' ) {
    unsigned int(32) overlay_essential_flag;
}
```

In Table 10, the overlay_essential_flag field may indicate a flag indicating whether the overlay media should be necessarily overlaid. Here, in the case of an overlay media that should be necessarily overlaid, a flare that does not support overlay may not play the main media in the same group.

In one embodiment, VR media and overlay media may be included in one sample. In this case, it may be divided into sub-samples within one sample, and each sub-sample may include VR media or overlay media. Further, the indicator about whether the sub-sample includes the overlay media or includes the main VR media, and a flag about whether the overlay media should necessarily be overlaid, etc. may be included in a box including the sub-sample related information.

In an embodiment, an alternative media grouping method for switching between overlay media may be proposed between main VR media. The grouping_type field in the EntityToGroupBox (the grouping_type field with the field value 'altr') can be used to specify the replaceable main VR media and specify the replaceable overlay media. This may be a concept similar to a switch node in a scene graph. That is, it has several nodes on a node, and only one of the nodes can be in an active/visible state. The switch node has an index of the currently active node, and can change the active node by changing the index. In one embodiment, the media grouped by the grouping_type field with the field value 'altr' may be used to switch the main VR media to a substitute VR media or substitute main media at the time of interaction with the overlay, or to switch overlay media to the substitute overlay media.

That is, in one embodiment, switching between the main VR media can be performed through the grouping of replaceable media, and switching between the overlay media can be performed, which may be performed through the associated overlay and the interaction. Grouped media can also be specified through the grouping_type field in the EntityToGroupBox.

Figure 36:
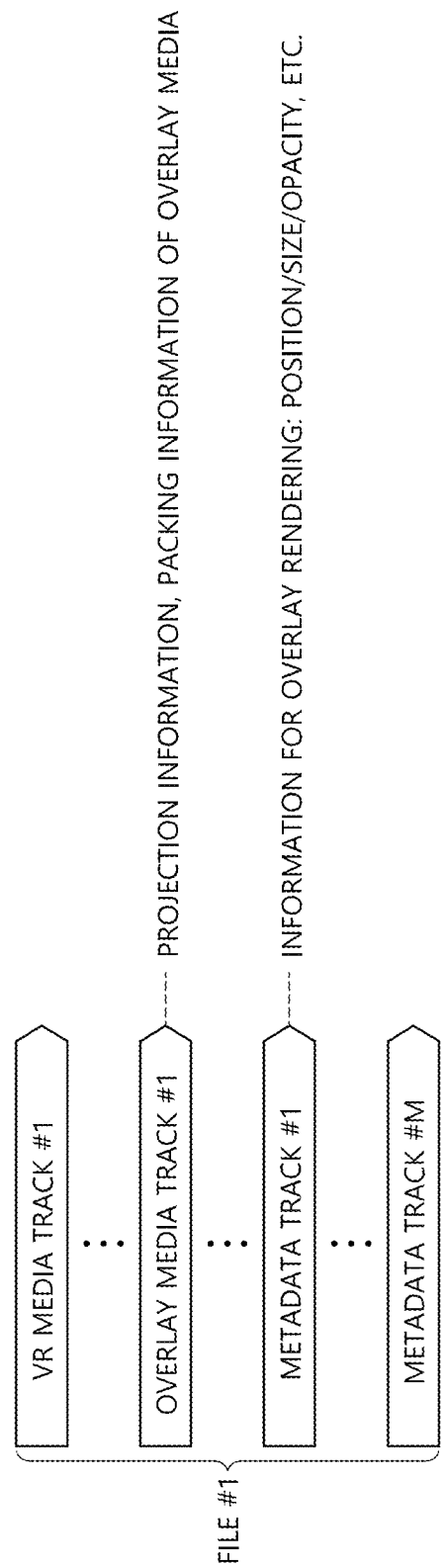
FIG. 36 shows an example of an overlay metadata track in the case of file #1.

FIG. 36 shows an example of an overlay metadata track in the case of file #1.

In one embodiment, the overlay metadata track may include information (such as opacity and interaction) about the overlay location, size, and properties for overlay rendering. The rendering metadata of the overlay can change over time. Thus, it can be stored as timed metadata. That is, the size or position of the overlay may change with time, and the metadata that may change over time may be referred to as rendering metadata of the overlay and may be stored as timed metadata. That is, metadata that varies over time can be stored in the sample, but static metadata that does not change over time can be stored in the sample entry.

Figure 37A:
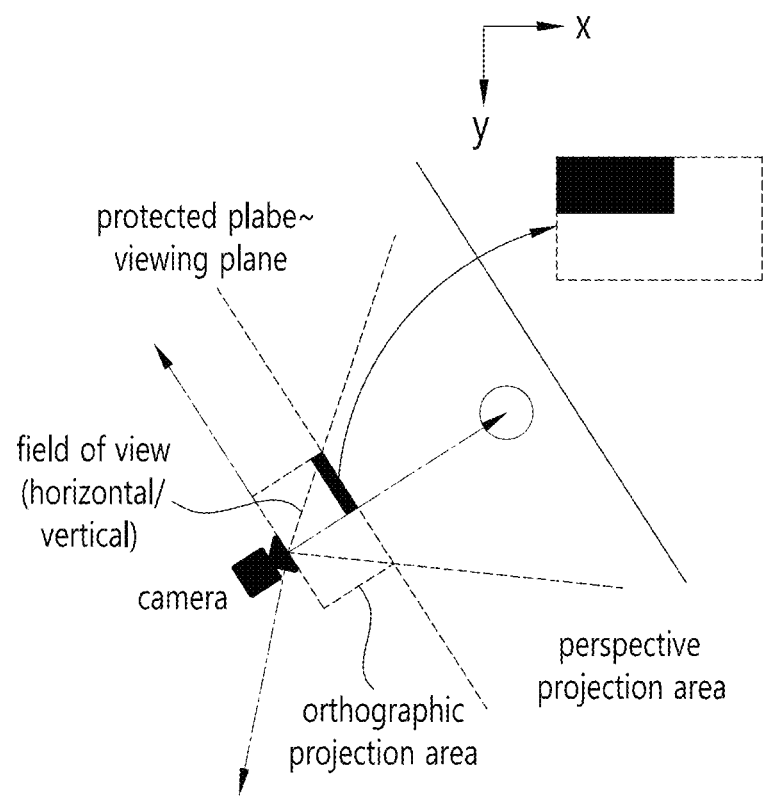
FIGS. 37A to 37C are views showing positions where the overlays are to be arranged.
Figure 37B:
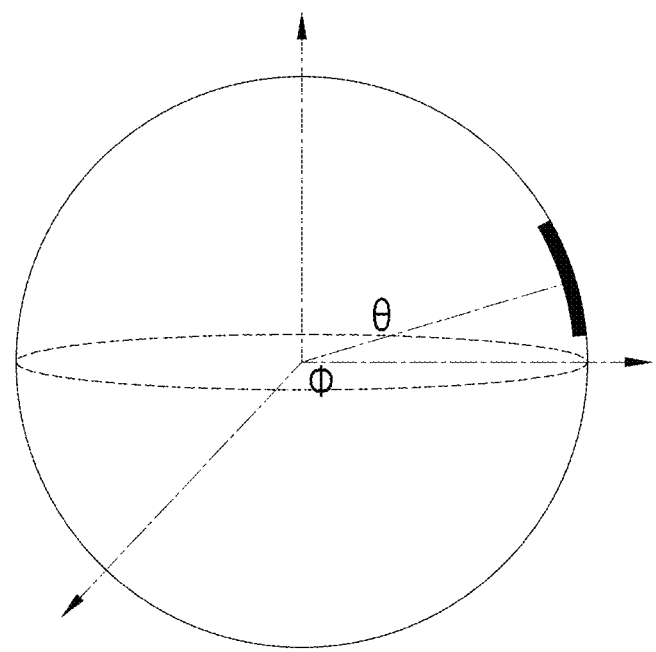
Figure 37C:
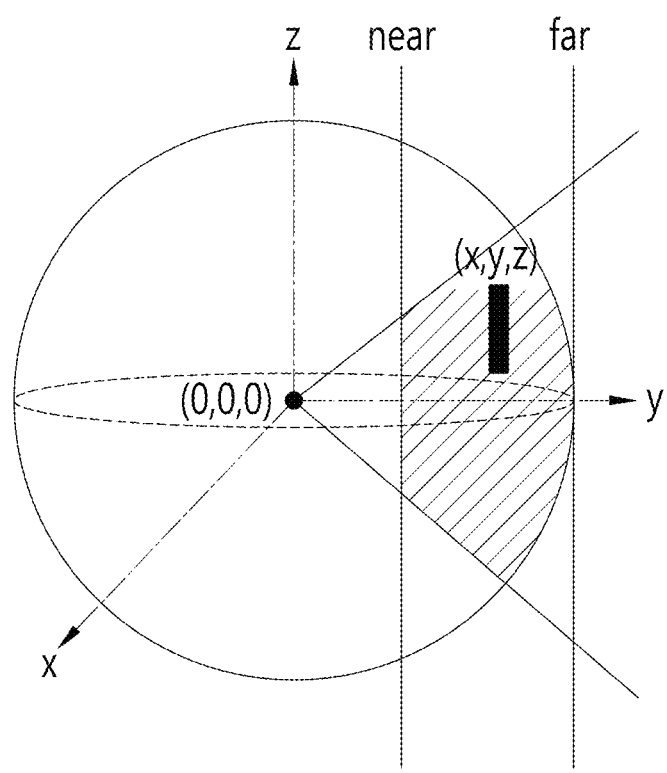

FIGS. 37A to 37C are views showing positions where the overlays are to be arranged.

In one embodiment, the overlay rendering position may be divided into three cases, depending on where the overlay is to be placed.

Referring to FIG. 37A, the first case (Case 1) may be the case where the overlay is located in the current viewport of the user. In this case, the position and size information to be drawn on the viewport may be specified by the percentage of display size comparison. In addition, the order in which the overlays are drawn may be specified to consider the case of overlapping of overlays The position and size information may include x-axis point position information (or position information of a left point), y-axis point position information (or position information of an upper point), width information, and height information.

Referring to FIG. 37B, the second case (Case 2) may be the case where the overlay is located on a sphere. In this case, the center position can be specified with elevation information, and the size of the overlay can be specified by designating the azimuth and elevation angle range. However, only rotations around the vector from the center of the overlay to the origin of the sphere can be supported. Or it can be defined as positional information or positional representation within the projection of the region-wise packing in consideration of projection. Here, the overlay is placed on the sphere, but on the player side, the overlay can be processed as a curved surface or processed as a shooting plane in the player side.

Referring to FIG. 37C, the third case (Case 3) may be the case where the overlay exists inside the spear. In this case, it may exist in the near plane or inside the sphere, but may be assumed to be a rectangle, and the size may be specified through the width information and the height information with the plane based on the y axis and the z axis as a point. Also, after the size of the plane is determined, it can be moved on the basis of the x-axis reference position information, the y-axis reference position information, and the z-axis reference position information on the sphere coordinate system. Or it can be moved to (x, y, z) coordinates on the sphere coordinate system. Here, rotation about each axis with the overlay coordinate system around the center point of the overlay and parallel to each axis of the sphere, as the point, can be supported.

In one embodiment, the location-related information overlaying the overlay media may be included in the overlay-related metadata and may be included in OverlayPosStruct( ) OverlayPosStruct( ) may include the following as shown in Table 11 below.

TABLE 11

```
aligned(8) class OverlayPosStruct( ) {
    unsigned int(8) region_type;
    if(region_type == 0) {
        ViewportOverlayRegion( );
    } else if (region_type == 1) {
        SphereOverlayRegion( );
    } else if (region_type == 2) {
        3DOverlayRegion( );
    }
}
```

In Table 11, the region_type field may indicate information about the location where the overlay is placed. Here, if the value of the region_type field is 0, it can indicate that the overlay is located in the user viewport. This may refer to the same case as the first case described above, and a ViewportOverlayRegion( ) may be called. If the value of the region_type field is 1, it may indicate that the overlay is located on the sphere. This may refer to the same case as the second case described above, and SphereOverlayRegion( ) may be called. If the region_type field value is 2, it can indicate that the overlay is located on the three-dimensional space. This may mean the same case as the third case described above, and 3DOverlayRegion( ) may be called.

Figure 38:
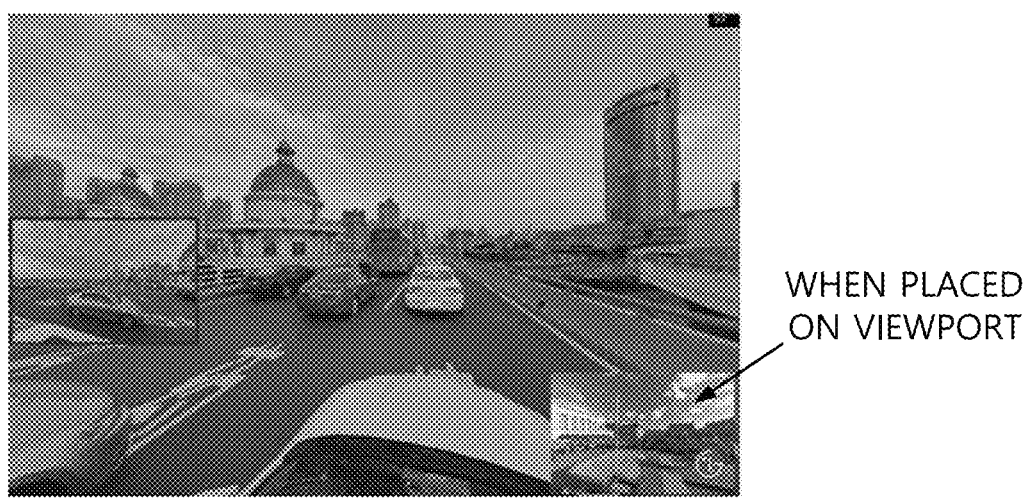
FIG. 38 shows an example of when the overlay is placed on the viewport.

FIG. 38 shows an example of when the overlay is placed on the viewport.

Referring to FIG. 38, the overlay may be located on the user's viewport. To this end, the location related information of the overlay placed in the user viewport can be signaled, which can be included in the above-mentioned ViewportOverlayRegion( ) ViewportOverlayRegion( ) may include the following as shown in Table 12 below.

TABLE 12

```
aligned(8) class ViewportOverlayRegion( ) {
    unsigned int(16) rect_left_percent;
    unsigned int(16) rect_top_percent;
    unsigned int(16) rect_width_percent;
    unsigned int(16) rect_height_precent;
    unsigned int(16) order;
```

TABLE 12-continued

```
    unsigned int(1) stereoscopic_flag;
    bit(7) reserved=0;
    if (stereoscopic_flag == 1) {
        unsigned int(1) relative_disparity_flag;
        if (relative_disparity_flag == 1) {
            signed int(16) disparity_in_percent;
        } else {
            signed int(16) disparity _in_pixels;
        }
    }
}
```

In Table 12, the rect_left_percent field, the rect_top_percent field, the rect_width_percent field, and the rect_height_percent field may indicate position and size information of the overlay that is a square plane. That is, each can indicate the position information of the left point of the overlay, the position information of the upper point, the width information, and the height information, and can be indicated as a percentage because it may vary depending on the display size.

The order field can also indicate the order of drawing if overlapped with other overlays. Or an overlay order can be indicated. This allows the receiver to adjust the order or adjust the placement values when rendering.

Also, the stereoscopic_flag field may refer to a flag as to whether or not the overlay supports stereo, the relative_disparity_flag field may denote a flag as to whether or not the stereo has a relative disparity value, and the disparity_in_percent field and the disparity_in_pixels field may indicate a relative disparity value and a disparity value in pixel units, respectively.

Figure 39:
FIG. 39 shows an example of when the overlay is placed on the sphere.

FIG. 39 shows an example of when the overlay is placed on the sphere.

Referring to FIG. 39, the overlay may be located on the sphere. To this end, positional information of the overlay placed on the spear may be signaled, which may be included in the above SphereOverlayRegion( ) SphereOverlayRegion( ) may include the following as shown in Table 13 below.

TABLE 13

```
aligned(8) class SphereOverlayRegion( ) {
    unsigned int(1) proj_shape=0;
    if (poj_shape == 1) {
        unsigned int(32) proj_reg_width_percent;
        unsigned int(32) proj_reg_height_percent;
        unsigned int(32) proj_reg_top_percent;
        unsigned int(32) proj_reg_left_percent;
    } else if (proj_shape == 2) {
        unsigned int(8) num_rings;
        unsigned int(8) num_sectors;
        for (i = 0; i < num_rings; i++) {
            for (j =0; j < num_sectors; j++) {
                unsigned int(16) proj_points_x[i][j];
                unsigned int(16) proj_points_y[i][j];
            }
        }
        unsigned int(3) transform_type[i];
        bit(5) reserved = 0;
        for (i = 0; i < num_rings; i++) {
            for (j =0; j < num_sectors; j++) {
                unsigned int(16) proj_points_x[i][j];
                unsigned int(16) proj_points_y[i][j];
            }
        }
    } else if (proj_shape ==0) {
        unsigned int(8) shape_type;
        signed int(32) centre_azimuth;
        signed int(32) centre_elevation;
```

TABLE 13-continued

```
        unsigned int(32) azimuth_range;
        unsigned int(32) elevation_range;
        signed int(32) centre_tilt;
    }
    unsigned int(1) interpolate;
    unsigned int(16) depth;
}
```

In Table 13, the proj_shape field can indicate the projected shape, indicate that the projection is not projected (none) if the value of the proj_shape field is 0, and indicate that it is projected in the form of a rectangle if it is 1, and indicate that it is projected in a polygon shape if it is 2.

If the projected shape is a rectangle (proj_shape==1), the proj_reg_top_percent field, the proj_reg_left_percent field, the proj_reg_width_percent field, and the proj_reg_height_percent field may indicate position information of the overlay in the projected picture. That is, each of the projected pictures can indicate the upper point position information, the left point position information, the width information, and the height information of the overlay as a percentage.

If the projected shape is a polygon (proj_shape==2), the num_rings field and the num_sectors field may indicate position information of the overlay in the projected picture. That is, each can indicate the number of horizontally divided regions and the number of vertically divided regions in the projected picture. In addition, the proj_points_x field and the proj_points_y field may indicate position information in the projected picture of each division point. That is, each of them can indicate the x-axis-based position value and the y-axis-based position value in the projected picture. The packed_points_x field and the packed_points_y field may indicate the position information at each divided point in the packed picture. That is, each of them can indicate the x-axis-based position value and the y-axis-based position value in the packed picture.

If not projected (proj_shape==0), the shape_type field can indicate the position representation type on the sphere. Here, if the shape_type field value is 0, it may be composed of four great circles, and if it is 1, it may be composed of two azimuth circles and two elevation circles. Here, the center_azimuth field and the center_elevation field may indicate position information of the overlay center position. That is, each may indicate an azimuth value and elevation value of the overlay center position. In addition, the azimuth_range field and the elevation_range field can indicate the size information of the overlay. That is, each may indicate the azimuthal range and elevation range of the overlay. The centre_tilt field can also indicate a rotation value about the vector from the center of the overlay to the origin of the sphere.

In addition, the interpolate field may mean a flag for smoothly changing the value between the changed values, and the depth field may indicate the distance from the origin to the center of the overlay for the order of the overlay to be preferentially displayed when overlays are overlapped.

Figure 40:
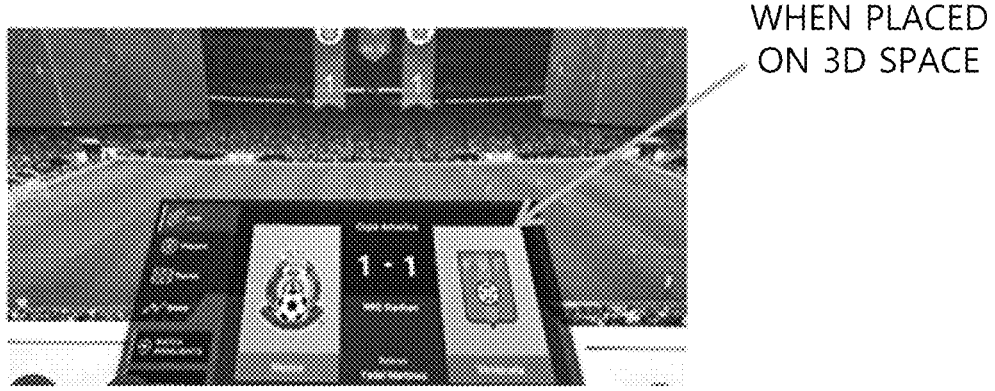
FIG. 40 shows an example of the case where the overlay is placed on a three-dimensional space inside a sphere.

FIG. 40 shows an example of the case where the overlay is placed on a three-dimensional space inside a sphere.

Referring to FIG. 40, the overlay may be located on a three-dimensional space inside the sphere. To this end, the position-related information of the overlay placed on the three-dimensional space inside the sphere can be signaled, which can be included in the 3DOverlayRegion( ) described above. The 3DOverlayRegion( ) may include the following as shown in Table 14 below.

TABLE 14

```
    aligned(8) class Overlay3DPositionStruct( ) {
        signed int(32) overlay_pos_x;
        signed int(32) overlay_pos_y;
        signed int(32) overlay_pos_z;
    }
    aligned(8) class OverlayRotationStruct( ) {
        signed int(32) overlay_rot_yaw;
        signed int(32) overlay_rot_pitch;
        signed int(32) overlay_rot_roll;
    }
    aligned(8) class 3DOverlayRegion( ) {
        unsigned int(32) width;
        unsigned int(32) height;
        bit(7) reserved=0;
        unsigned int(1) interpolate;
        Overlay3DPositionStruct( );
        OverlayRotationStruct( );
    }
```

In Table 14, the width and height fields may indicate width information and height information based on the y-axis and z-axis based planes, assuming the overlay media is a rectangle. Here, the rectangular overlay media or overlay plane can be indicated or determined in size. In addition, the interpolate field may be a flag for smoothly changing values filled in between the changed values, and 3DOverlayRegion( ) may include Overlay3DPositionStruct( ) and OverlayRotationStruct( )

Overlay3DPositionStruct( ) can contain the location information of the overlay media on the sphere coordinate system. Here, the overlay_pos_x field, the overlay_pos_y field, and the overlay_pos_z field respectively indicate a position value relative to the x-axis, a position value relative to the y axis, and a position value relative to the z axis of the overlay media on the sphere coordinate system, and the overlay media can be moved to the x-axis reference position value, the y-axis reference position value, and the z-axis reference position value on the sphere coordinate system. Or it can be moved to (x, y, z) coordinates on the sphere coordinate system.

OverlayRotationStruct( ) can point to the rotation information about each axis centered on the overlay center point and based on the overlay coordinate system parallel to each axis of the sphere. Here, the overlay_rot_yaw field, the overlay_rot_pitch field, and the overlay_rot_roll field may respectively indicate rotation information about a yaw axis, rotation information about a pitch axis, and rotation information about a roll axis. That is, in one embodiment, rotation about each axis may be supported based on an overlay coordinate system that is parallel to each axis of the sphere about the overlay center point.

Figure 41:
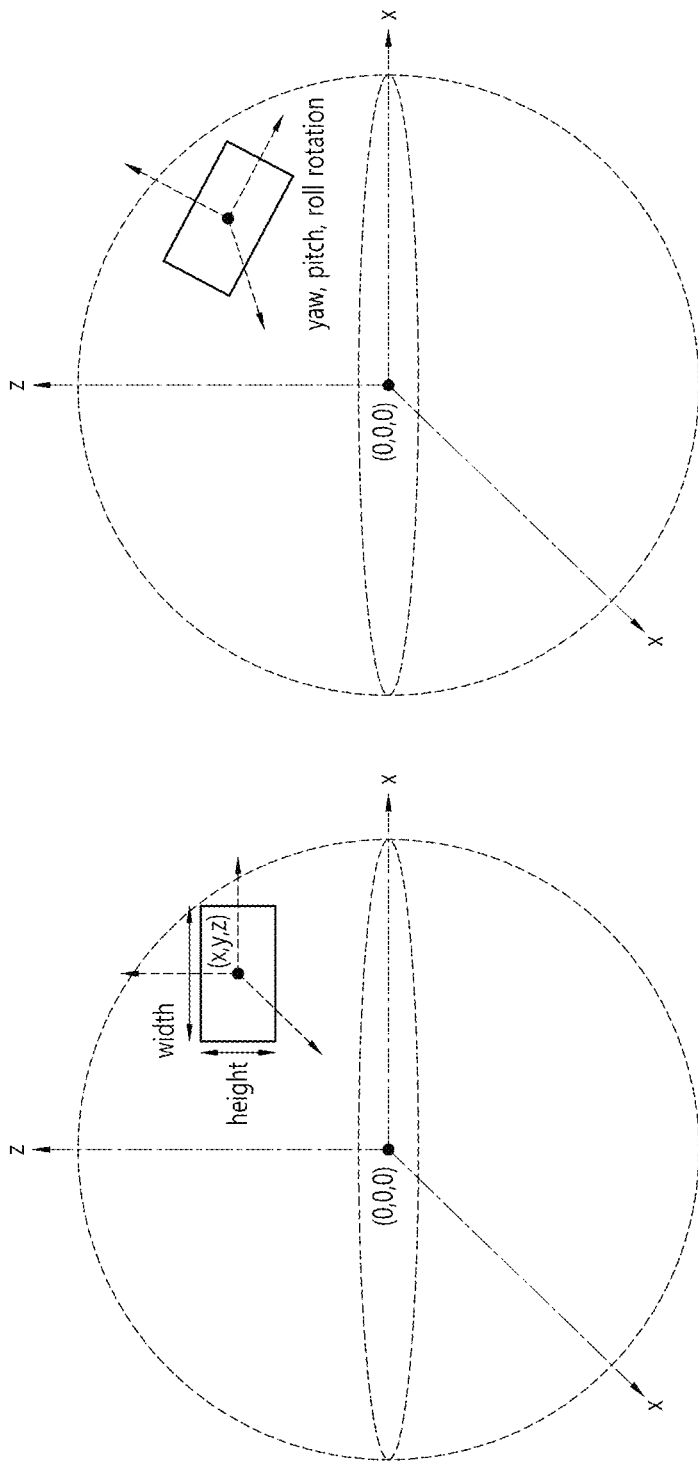
FIG. 41 shows the position/size/rotation of the overlay when the overlay is on a three-dimensional space inside the sphere.

FIG. 41 shows the position/size/rotation of the overlay when the overlay is on a three-dimensional space inside the sphere.

Referring to FIG. 41, the information on the width, height, and (x, y, z) coordinates in the left sphere may be indicated by the width field, the height field, the overlay_pos_x field, the overlay_pos_y field, and the overlay_pos_z field of Table 14.

Information about yaw axis rotation, pitch axis rotation, and roll axis rotation in the right sphere can also be indicated by the overlay_rot_yaw field, the overlay_rot_pitch field, and the overlay_rot_roll field in Table 14.

Figure 42:
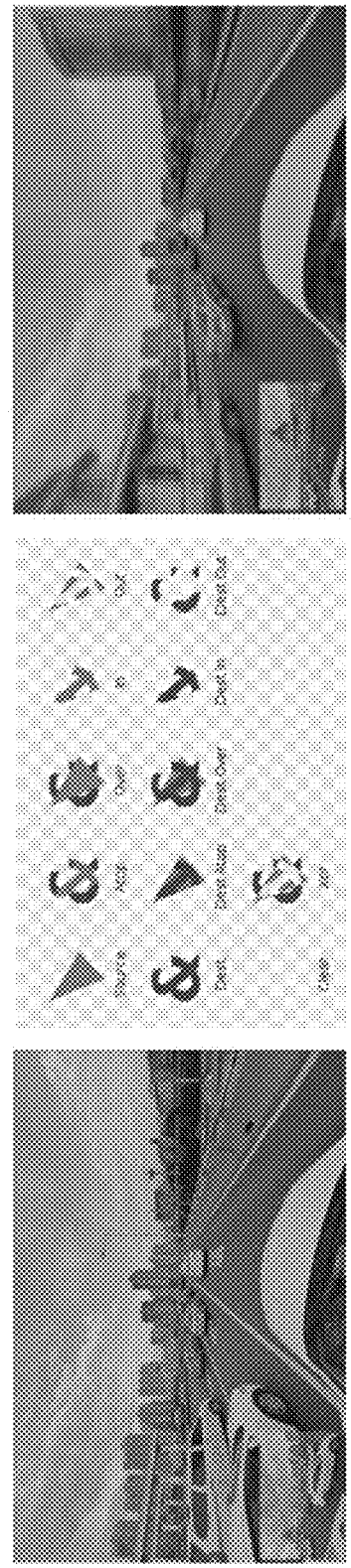
FIG. 42 shows an example of an overlay rendering attribute.

FIG. 42 shows an example of an overlay rendering attribute.

In one embodiment, the overlay metadata may include overlay rendering attribute information. This can include information about the transparency of the overlay surface that is applied when rendering the overlay, the rendering options to be performed when blending the overlay on the VR media and the focus effects, which may be included in metadata and signaled. Here, the metadata may be referred to as overlay metadata, overlay-related metadata, or overlay-rendering-related metadata. The overlay rendering attribute information may be referred to as rendering attribute information that overlay media may be applied at the time of display/rendering and may be included in OverlayRenderStruct( ) and OverlayRenderStruct( ) may include the following as shown in Table 15:

TABLE 15

```
aligned(8) class OverlayRenderStruct( ) {
    unsigned int(1) opacity_info_flag;
    unsigned int(1) alpha_composition_flag;
    unsigned int(1) blending_flag;
    unsigned int(1) focus_flag;
    unsigned int(4) reserve =0;
    if(opacity_info_flag == 1) {
        unsigned int(8) opacity;
    }
    if(alpha_compositino_flag == 1) {
        unsigned int(8) composition_type=1;
    }
    if (blending_flag = 1) {
        unsigned int(8) blending_mode;
    }
    if (focus_flag == 1) {
        unsigned int(8) focus;
    }
}
```

In Table 15, the opacity_info_flag field may indicate a flag indicating whether or not the entire transparency of the overlay plane is specified, and the opacity field may indicate information about transparency degree or transparency degree value.

In addition, the alpha_composition_flag field may indicate a flag indicating whether the overlay media has an alpha channel and the alpha composition is to be applied when composing the alpha value, and composition_type field may indicate an alpha composition type. In this case, when the composition_type field value is 1, it may indicate source_over, when the field value is 2, it may indicate source_atop, when the field value is 3, it may indicate source_in, when the field value is 4, it may indicate source_out, when the field value is 5, it may indicate dest_atop, when the field value is 6, it may indicate dest_over, when the field value is 7, it may indicate dest_in, when the field value is 8, it may indicate dest_out, when the field value is 9, it may indicate clear, and when the field value is 10, it may indicate xor. Herein, the default setting is the source_over when the composition_type field value is 1, and the formula applied for each type may be the following as shown in Table 16.

TABLE 16

| Composition Type | Formula |
|---|---|
| source_over | $\alpha_s \cdot (1 - \alpha_d) \cdot s + \alpha_d \cdot (1 - \alpha_s) \cdot d + \alpha_s \cdot \alpha_d \cdot s$ |
| source_atop | $\alpha_d \cdot (1 - \alpha_s) \cdot d + \alpha_s \cdot \alpha_d \cdot s$ |
| source_in | $\alpha_s \cdot \alpha_d \cdot s$ |
| source_out | $\alpha_s \cdot (1 - \alpha_d) \cdot s$ |
| dest_atop | $\alpha_s \cdot (1 - \alpha_s) \cdot s + \alpha_s \cdot \alpha_d \cdot d$ |
| dest_over | $\alpha_s \cdot (1 - \alpha_d) \cdot s + \alpha_d \cdot (1 - \alpha_s) \cdot d + \alpha_s \cdot \alpha_d \cdot d$ |
| dest_in | $\alpha_s \cdot \alpha_d \cdot d$ |

TABLE 16-continued

| Composition Type | Formula |
|---|---|
| dest_out | $\alpha_d \cdot (1 - \alpha_s) \cdot d$ |
| clear | 0 |
| xor | $\alpha_s \cdot (1 - \alpha_d) \cdot s + \alpha_d \cdot (1 - \alpha_s) \cdot d$ |

In Table 16, as can mean the alpha value of the source pixel and αd can mean the alpha value of the destination pixel. 's' can mean the color (RGBA) value of the source pixel, and d can mean the color (RGBA) value of the target pixel.

Also, the blending_flag field may mean a flag indicating whether blending is to be applied at the time of overlay composition, in which the blending_mode field may indicate a blending mode. Blending can include blending the color of a pixel as an operation which is more complex than the alpha composition.

Herein, if the blending_mode field value is 1, it indicates normal, when the field value is 2, it indicates multiply, when the field value is 3, it indicates screen, when the field value is 4, it indicates overlay, when the field value is 5, it indicates darken, when the field value is 6, it indicates lighten, when the field value is 7, it indicates color dodge, when the field value is 8, it indicates color-burn, when the field value is 9, it indicates hard-light, when the field value is 10, it indicates soft-light, when the field value is 11, it indicates difference, when the field value is 12, it indicates exclusion, when the field value is 13, it indicates dissolve, and when the field value is 14, it indicates plus. Further, the formula applied for each mode may be the following as shown in Table 17.

TABLE 17

| Blending Mode | Formula |
|---|---|
| normal | $B(s, d) = s$ |
| multiply | $B(s, d) = s \cdot d$ |
| screen | $B(s, d) = d + s - (d \cdot s)$ |
| overlay | $B(s, d) = \text{hard-light}(d, s)$ |
| darken | $B(s, d) = \min(s, d)$ |
| lighten | $B(s, d) = \max(s, d)$ |
| color dodge | $B(s, d) = 0$ (if $d = 0$), |
|  | 1 (if $s = 1$), |
|  | $\min(1, d/(1 - s))$ (otherwise) |
| color-burn | $B(s, d) = 1$ (if $d = 1$), |
|  | 0 (if $s = 0$), |
|  | $1 - \min(1, (1 - d)/s)$ (otherwise) |
| hard-light | $B(s, d) = \text{multiply}(2 \cdot s, d)$ (if $s \leq 0.5$), |
|  | $\text{screen}(2 \cdot s - 1, d)$ (otherwise) |
| soft-light | $B(s, d) = d - (1 - 2 \cdot s) \cdot d \cdot (1 - d)$ (if $s \leq 0.5$), |
|  | $((16 \cdot d - 12) \cdot d + 4) \cdot d$ (otherwise) |
| difference | $B(s, d) = |d - s|$ |
| exclusion | $B(s, d) = d + s - 2 \cdot d \cdot s$ |
| dissolve | $B(s, d) = \text{random}(s, d)$ |
| plus | $B(s, d) = d + s$ |

In Table 17, s may mean the RGBA value of the source pixel, and d may mean the RGBA value of the target pixel. In addition, random (s, d) may mean randomly setting a source or destination value.

The focus_flag field may indicate a flag indicating whether the focus is overlayed, and the focus field may indicate information on a focus degree or a focus degree value. Here, the focus degree value may range from 0 to 1.0. If focus is specified or indicated on the overlay, a blur may be applied to other overlays and VR media being rendered at the receiver.

Figure 43:
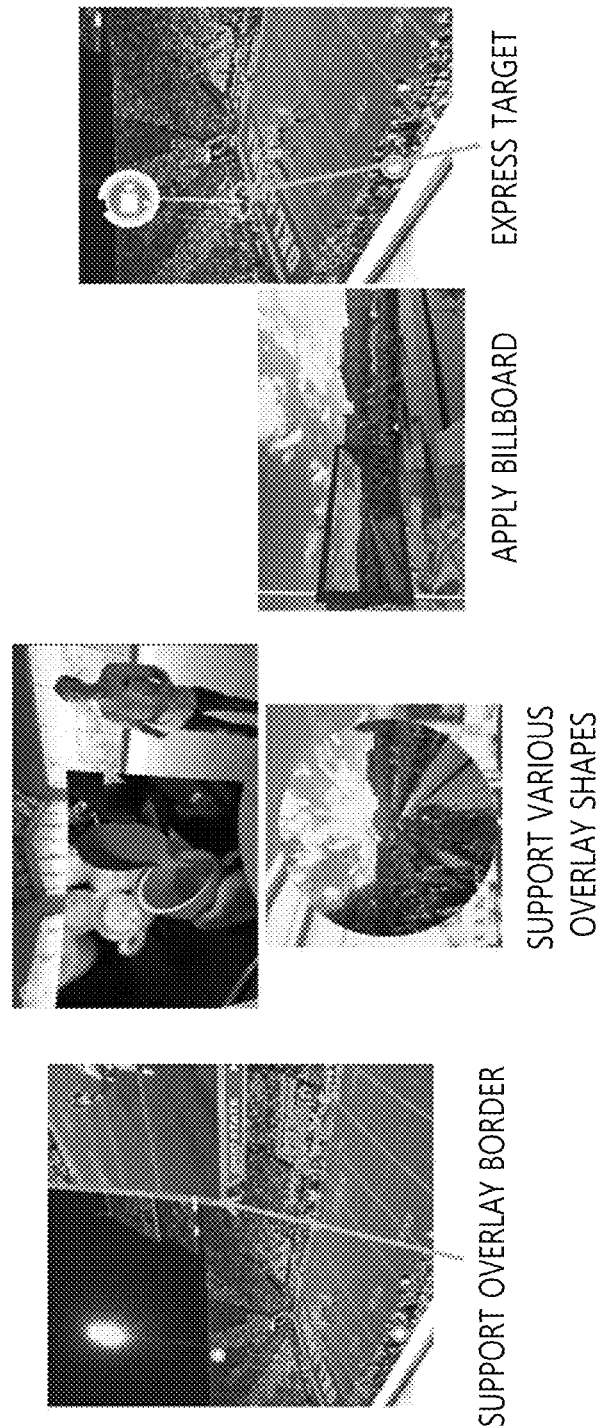
FIG. 43 shows an example of overlay miscellaneous.

FIG. 43 shows an example of overlay miscellaneous.

In one embodiment, the overlay metadata may include overlay miscellaneous information. Here, the overlay miscellaneous information may be referred to as overlay rendering other information. This may include information about overlay border support, information about various overlay shape support, information about whether a billboard is supported, and information indicating a particular point that the location of the overlay points to as the location of the overlay is different from the target. Here, the billboard may mean a method in which the rotation value of the overlay is changed in accordance with the viewing orientation of the user.

The overlay metadata described above may be signaled and the overlay metadata may be referred to as metadata, overlay related metadata, overlay rendering other metadata, overlay rendering related metadata, or overlay miscellaneous related metadata. The overlay miscellaneous information may be referred to as other rending information that may be additionally set with respect to the overlay, may be included in OverlayMiscStruct( ) and OverlayMiscStruct( ) may include the following as shown in Table 18.

TABLE 18

```
aligned(8) class OverlayMiscStruct( ) {
    unsigned int(1) frame_flag;
    unsigned int(1) shape_flag;
    unsigned int(1) billboard_flag;
    unsigned int(1) target_flag ;
    if (frame_flag == 1) {
        unsigned int(8) frame_border_width;
        unsigned int(32) frame_color[4] ;
    }
    if (shape_flag == 1) {
        unsigned int(8) shape_type;
        if (shape_type == 1) { // curve
            unsigned int(32) h_curvature;
            unsigned int(32) v_curvature;
        } else if (shape_type == 3) {
            unsigned int(8) num_vertices;
            unsigned int(32) scale;
            for (int i=0; i< num_vertices; i++) {
                unsigned int(32) xyz[3];
                unsigned int(32) st[2];
            }
        }
    }
    if (target_flag == 1) {
        signed int(32) target_azmuth;
        signed int(32) target_elevaton;
    }
}
```

In Table 18, the frame_flag field may denote a flag for whether to draw the border of the overlay plane, the frame_border_width field may indicate the border thickness size when drawing the border, and the frame_color field can indicate an RGBA color value that contains transparency for the border. The shape_flag field can be a flag indicating whether or not the shape of the overlay plane is to be designated as a shape other than a rectangle. Here, if the shape_flag field value is 1, it may indicate a curve type, when the field value is 2, it may indicate a circle type, when the field value is 3, it may indicate a type according to user definition and other values may be reserved and may be defined according to other settings.

Here, when the shape_flag field value is 1 (shape_flag==1), the h curvature field and the v_curvature field can indicate the degree of the curve. That is, each may indicate a horizontal curvature value and a vertical curvature value.

When the shape_flag field value is 3 (shape_flag==3), the num_vertices field, the scale field, the xyz field, and the st field respectively indicate the number of vertices, scale information, (x, y, z) coordinate information or position information and texture coordinate information of each vertex.

The billboard_flag field may indicate a flag indicating whether the billboard is applied to the overlay plane, and the target_flag field may indicate a flag indicating whether there is an overlay target. Here, when the target_flag field indicates that the target exists, the target_azimuth field and the target_elevation field may indicate the target position information. That is, each may indicate elevation information (or elevation value) and azimuth information (or azimuth value) of the target.

Figure 44:
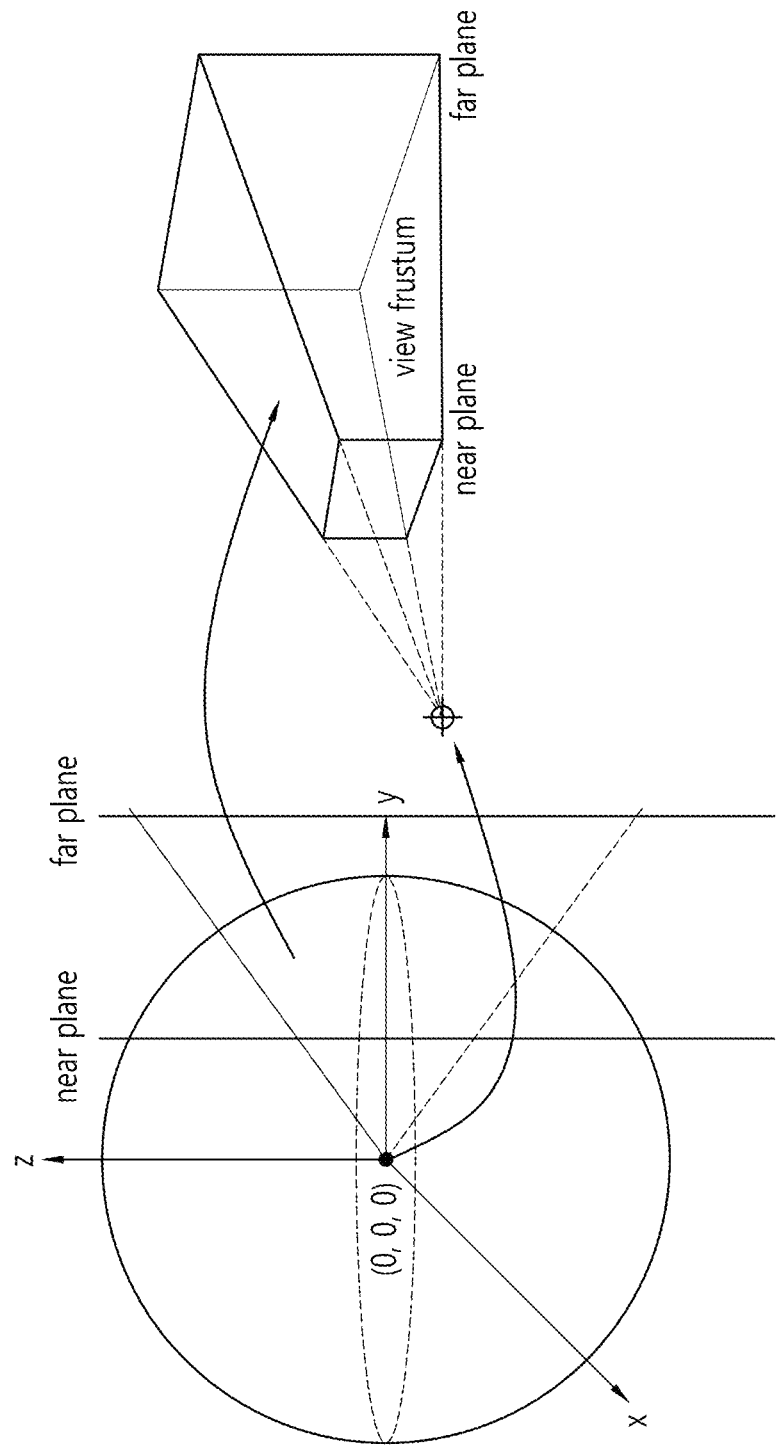
FIG. 44 shows an example of a movable space in the viewport.

FIG. 44 shows an example of a movable space in the viewport.

In one embodiment, the VR media may provide an interaction for immersion. Or overlay interaction of VR media may be provided. The basic interaction may be to wear a head mounted display (HMD) and to apply changes accordingly when the user's position and viewing direction are changed, to thereby configure a screen. To add more interactions, the interaction with the overlays on the VR media can be performed. In this case, it is possible to indicate whether it is an interactable overlay and indicate the possible range of the interaction.

Here, the range in which the interaction can be performed can be divided into a movable space in a viewport region and a space in which each overlay can move, and both spaces can be defined.

In addition, location/depth/rotation/scale information of each overlay for an interactable overlay can be additionally controlled. The overlay does not always have to be in the viewport region. However, the user can perform the interaction with the overlay existing on the viewport. Thus, the entire space for the overlay media interaction may be the user viewport region. If the user selects an overlay that can interact with the overlay visible in the current viewport, the user can change the location, orientation, and scale of the overlay. The bounding box surrounding the overlay can be updated to accommodate changes, and the updated bounding box can be in the user viewport region.

Referring to FIG. 44, a horizontal FOV, azimuth information, vertical FOV, elevation information, and a position value of a near plane can be used to indicate a movable space in the viewport region. Here, the horizontal FOV, the elevation information, the vertical FOV, and the azimuth information can be applied according to the HMD, and can be specified by the player. In addition, the position value of the near plane can be specified by the player.

In one embodiment, a viewing frustum with a horizontal FOV, a vertical FOV, a position value of the near plane, and a position value of the far plane may be generated. Here, the position value of the far plane can have a value of 1 since the sphere is a unit sphere.

Figure 45:
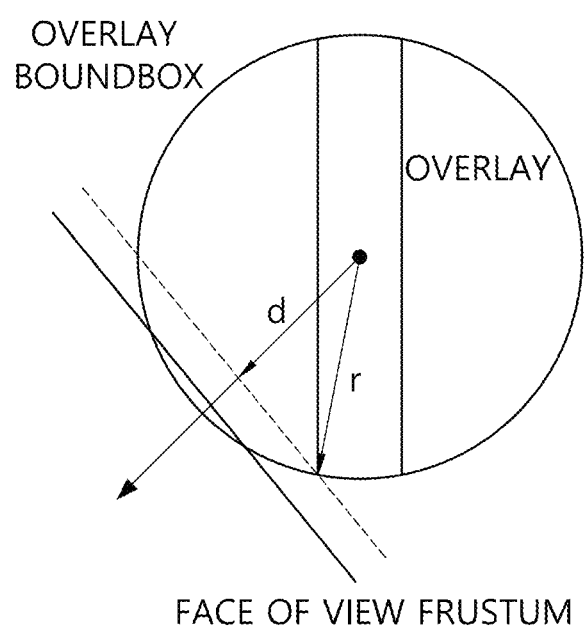
FIG. 45 shows an example for explaining the VFC algorithm.

FIG. 45 shows an example for explaining the VFC algorithm.

There may be a variety of viewing frustum culling (VFC) algorithms that check whether it exists within the view frustum, and it may be determined whether there is an region where the bounding box of the overlay is culled using the VFC algorithm.

Here, if there is a region to be culled, it can be controlled so as not to move in the corresponding direction, or if another region to be compensated can exist, it can be updated to the corresponding position. The above-described operation can be handled by a receiver.

Figure 51:
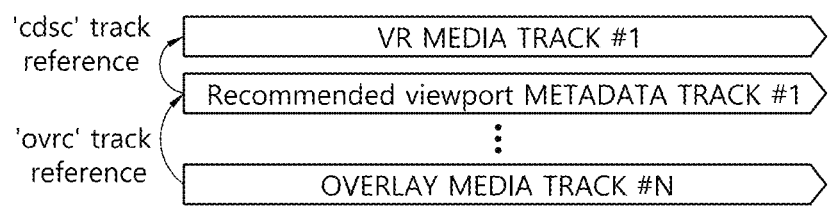
FIG. 51 shows an example of an 'ovrc' track reference.

Basic VFC can use AABBvsFrustum. However, the VFC can use various other methods, and thus the present invention is not limited thereto. Referring to FIG. 51, according to AABBvsFrustum, it is checked whether there is a surface interacted with the bounding box and it may be determined that it safely exists in the viewport region if it is not the outside or intersect. AABBvsFrustum may include the following as shown in Table 19 below.

TABLE 19

```
int AABBvsFrustum(AABB *b, FRUSTUM *f){
    float m, n;
    int i, result = INSIDE;
    for (i = 0; i < 6; i++){
        PLANE *p = f->plane + l;
        m = (b->mx * p->a) + (b->my * p->b) + (b->mz *
        p->c) + p->d;
        n = (b->dx * fabs(p->a)) + (b->dy * fabs(p->b)) +
        (b->dz * fabs(p->c));
        if (m + n < 0) return OUTSIDE;
        if (m - n < 0) result = INTERSECT;
    }
    return result;
}
```

In one embodiment, certain overlays can move freely through the interaction within the current viewport region, but a region that can be moved for each overlay can be additionally specified. For example, a particular overlay can fix its position and limit its movement so that it can only rotate in a certain direction.

In one embodiment, information about the azimuth range, the elevation range, and the depth range may be used to represent the space in which the movement of each overlay is possible. In this case, not only the case where the overlay moves in the viewport but also other spaces can be defined, and the method of processing whether it is processed in the region of the receiver may be the same as the method of processing whether it is processed in the region of the viewport.

In addition, in one embodiment, it may be additionally determined whether to limit the movement of each overlay. Or the movement of each overlay can be limited. For this purpose, information about the rotation range and the scale range for each axis can be used.

The above information may be overlay interaction related information or overlay interaction information and may be included in the overlay interaction metadata, and the overlay interaction metadata may be signaled. Or overlay interaction related information may be included in OverlayInteractionStruct( ) and OverlayInteractionStruct( ) may be included in overlay interaction metadata. OverlayInteractionStruct( ) may include the following as shown in Table 20 below.

TABLE 20

```
aligned(8) class OverlayInteractionStruct( ) {
    unsigned int(1) switch_on_off_flag;
    unsigned int(1) change_opacity_flag;
    unsigned int(1) position_flag;
    unsigned int(1) depth_flag;
    unsigned int(1) rotation_flag;
    unsigned int(1) resize_flag;
    unsigned int(1) limit_in_viewport_flag;
    unsigned int(1) limit_transform_flag;
    if (switch_on_off_flag == 1) {
        unsigned int(32) available_levels;
        for(i=0; i< available; i++) {
            unsigned int(32) ref_overlay_IDs[i];
            unsigned int(1) alt_track_flag;
            bit(7) reserved=0;
        }
    }
}
```

TABLE 20-continued

```
    if (change_opacity_flag == 1) {
        unsigned int(16) opacity_min;
        unsigned int(16) opacity_max;
    }
    if (limit_transform_flag) {
        if (position_flag == 1) {
            unsigned int(32) azimuth_min;
            unsigned int(32) azimuth_max;
            unsigned int(32) elevation_min;
            unsigned int(32) elevation_max;
        }
        if (depth_flag == 1) {
            unsigned int(32) depth_min;
            unsigned int(32) depth_max;
        }
        if (rotation_flag == 1) {
            unsigned int(1) rotation_x_axis_flag;
            unsigned int(1) rotation_y_axis_flag;
            unsigned int(1) rotation_z_axis_flag;
            bit(5) reserved=0;
            if (rotation_x_axis_flag) {
                unsigned int(32) x_rotation_min;
                unsigned int(32) x_rgtation_max;
            }
            if (rotation_y_axis_flag) {
                unsigned int(32) y_rotation_min;
                unsigned int(32) y_rotation_max;
            }
            if (rotation_z_axis_flag) {
                unsigned int(32) z_rotation_min;
                unsigned int(32) z_rotation_max;
            }
        }
        if (resize_flag == 1) {
            unsigned int(32) resize_min;
            unsigned int(32) resize_max;
        }
    }
}
```

In Table 20, the switch_on_off_flag field may mean a flag that allows an interaction to show or hide the overlay, and the change_opacity_flag field may mean a flag that allows global opacity of the overlay plane to be adjusted. The position_flag field, the depth_flag field, the rotation_flag field, and the resize_flag field may denote flags that allow the position, depth, rotation, and scale to be changed, respectively, and the limit in viewport flag field may denote flags that restrict movement to the viewport region. Also, the limit_transform_flag field may indicate a flag indicating whether the range over which each overlay moves is limited.

Here, when the value of the switch_on_off_flag field is 1, the available_levels field can indicate the number of changeable levels. If the available_levels field value is 0, it can indicate that visibility of the overlay can be turned on/off. Also, if the value of the available_levels field is greater than 0, the reference overlay ID can be specified through the ref_overlay_IDs field. That is, if there is at least one changeable level number, it may indicate an overlay to be referenced for this. In addition, the altr_track_flag field may indicate the related information as to whether the overlay media is included in another track or another image item. Here, when the altr_track_flag field is 1, the overlay media can be included in another track or another image item, and can be changed to a source of an entity grouped by EntityGroupToBox as 'altr'. That is, you can change to the source of the entity grouped through the EntityGroupToBox with the grouping_type field value altr.

When the change_opacity_flag field value is 1, the opacity_min field and the opacity_max field can indicate the minimum value and the maximum value of the opacity. When the position_flag field value is 1, the azimuth_min field, the azimuth_max field, the elevation_min field, and the elevation_max field indicating the position information can be changed. Here, the azimuth_min field, the azimuth_max field, the elevation_min field, and the elevation_max field may indicate the minimum azimuth value, the maximum azimuth value, the minimum elevation value, and the maximum elevation value, respectively. In addition, since the value of the limit_transform_flag field is 1, the overlay motion range can be specified.

When the depth_flag field value is 1, the depth_min field and the depth_max field indicating the minimum depth value and the maximum depth value, respectively, can be adjusted, and the range of the depth value change can be specified accordingly. In this case, the depth value can be changed while maintaining the size of the overlay.

In addition, the rotation_x_axis_flag field, the rotation_y_axis_flag field, and the rotation_z_axis_flag field may denote flags indicating whether or not the rotation about the x axis, the y axis, and the z axis is possible. Here, when the value indicating whether rotation around each axis is performed is 1, a range of rotation angles with respect to each axis can be specified. That is, if the rotation_x_axis_flag field value is 1, the x_rotation_min field and the x_rotation_max field indicating the rotation values for the minimum and maximum x axes can be adjusted. If the rotation_y_axis_flag field value is 1, the y_rotation_min field and y__rotation_max field indicating the rotation values for the minimum and maximum y axes, respectively, can be adjusted. If the rotation_z_axis_flag field value is 1, the z_rotation_min field and the z_rotation_max field indicating the rotation values for the minimum and maximum z axes, respectively, can be adjusted.

When the resize_flag field value is 1, the resize_min field and the resize_max field indicating the minimum overlay size and the maximum overlay size can be changed, respectively, and the range of the scale can be specified by adjusting the resize_min field and the resize_max field. Here, the scales can be applied at the same ratio in consideration of the aspect ratio of the overlay.

Figure 46:
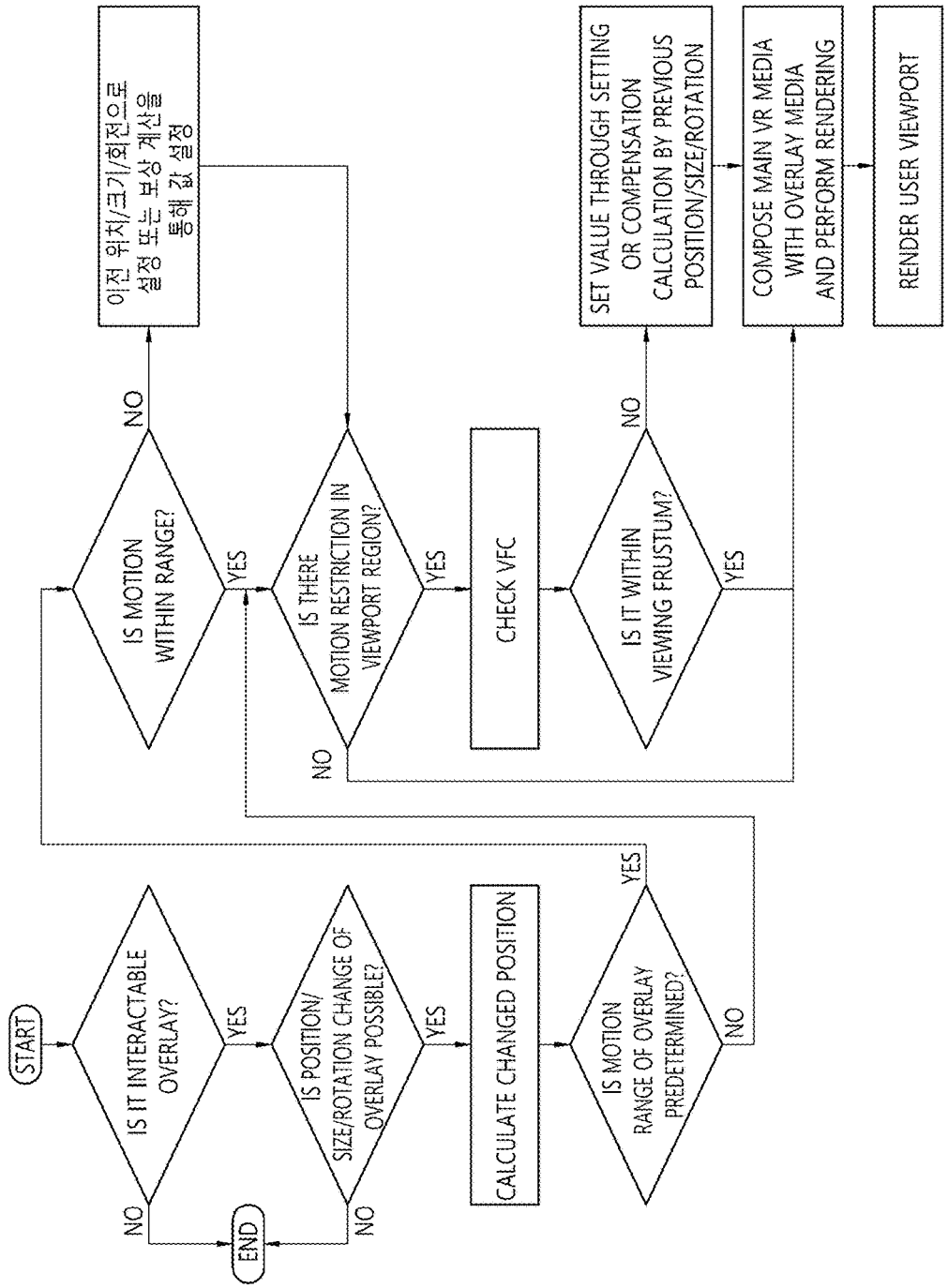
FIG. 46 shows an example of a flowchart illustrating the overlay interaction providing method.

FIG. 46 shows an example of a flowchart illustrating the overlay interaction providing method.

Referring to FIG. 46, when an overlay is selected and a user input such as a motion is acquired, the user can determine whether the overlay is interactable, and if the overlay is non-interactable, the associated process can be terminated. Also, in the case of the interactable overlay, it is possible to determine whether the position/size/rotation/change of the overlay is possible, and if not, the related process can be terminated. However, if possible, in one embodiment, the changed position can be calculated, and whether the overlay motion range is fixed can be determined.

In one embodiment, if the motion range of the overlay is predetermined, it can be determined whether the motion is within the range, and if it is within the range, it can be determined whether there is motion restriction in the viewport region. However, if it is not within the range, the value can be set through the setting of the previous position/size/rotation or compensation calculation, and then it can be judged whether there is movement restriction in the viewport region. Further, even if the movement range of the overlay is not fixed, it is possible to judge whether there is motion restriction in the viewport region.

In one embodiment, if there is motion restriction, a viewing frustum culling (VFC) check may be performed and it may be determined whether it is within a viewing frustum. Here, if it is in the viewing frustum, the main VR media and overlay media can be combined and rendered. However, if it is not within the viewing frustum, the value can be set by setting or compensating the moved position/size/rotation, and then the main VR media and overlay media can be composited and rendered. In addition, the main VR media and the overlay media can be combined and rendered even when there is no motion restriction.

In one embodiment, the composition and rendering of the main VR media and overlay media can be performed, and the user viewport can be rendered.

In one embodiment, the overlay metadata may include at least one of position information, size information, rendering attribute information, and interaction information of the overlay as described above. Or overlay metadata may include overlay location related information (location and size), overlay rendering attribute information, overlay rendering other information, and overlay interaction information, as described above. The overlay metadata may include OverlayInfoStruct( ) and OverlayInfoStruct( ) may include overlay location related information (location and size), overlay rendering property information, overlay rendering other information, and overlay interaction information. OverlayInfoStruct( ) may include the following as shown in Table 21 below.

TABLE 21

```
aligned(8) class OverlayInfoStruct( ) {
    unsigned int(32) overlay_id;
    unsigned int(16) overlay_source_id;
    unsigned int(1) overlay_essential_flag;
    unsigned int(1) overlay_priority;
    OverlayPosStruct( );
    OverlayRenderStruct( );
    OverlayMiscStruct( );
    OverlayInteractionStruct( );
}
```

In Table 21, the overlay_id field may indicate the overlay metadata identifier, and the overlay_source_id field may indicate the identifier of the overlay media source data. The overlay_essential_flag field may indicate whether the overlay is essentially an overlay that should be overlaid, and the overlay_priority field may indicate the overlay priority of the overlay media. Here, the priority may affect the decoding.

In addition, the OverlayPosStruct( ) may include overlay position related information, and may include the following as shown in Table 11. OverlayRenderStruct( ) may include overlay rendering property information or overlay rendering property related information, and may be like the following as shown in Table 15. OverlayMiscStruct( ) may contain overlay other information, for example, as shown in Table 18. OverlayInteractionStruct( ) may contain overlay interaction information, for example, as shown in Table 20.

Figure 47:
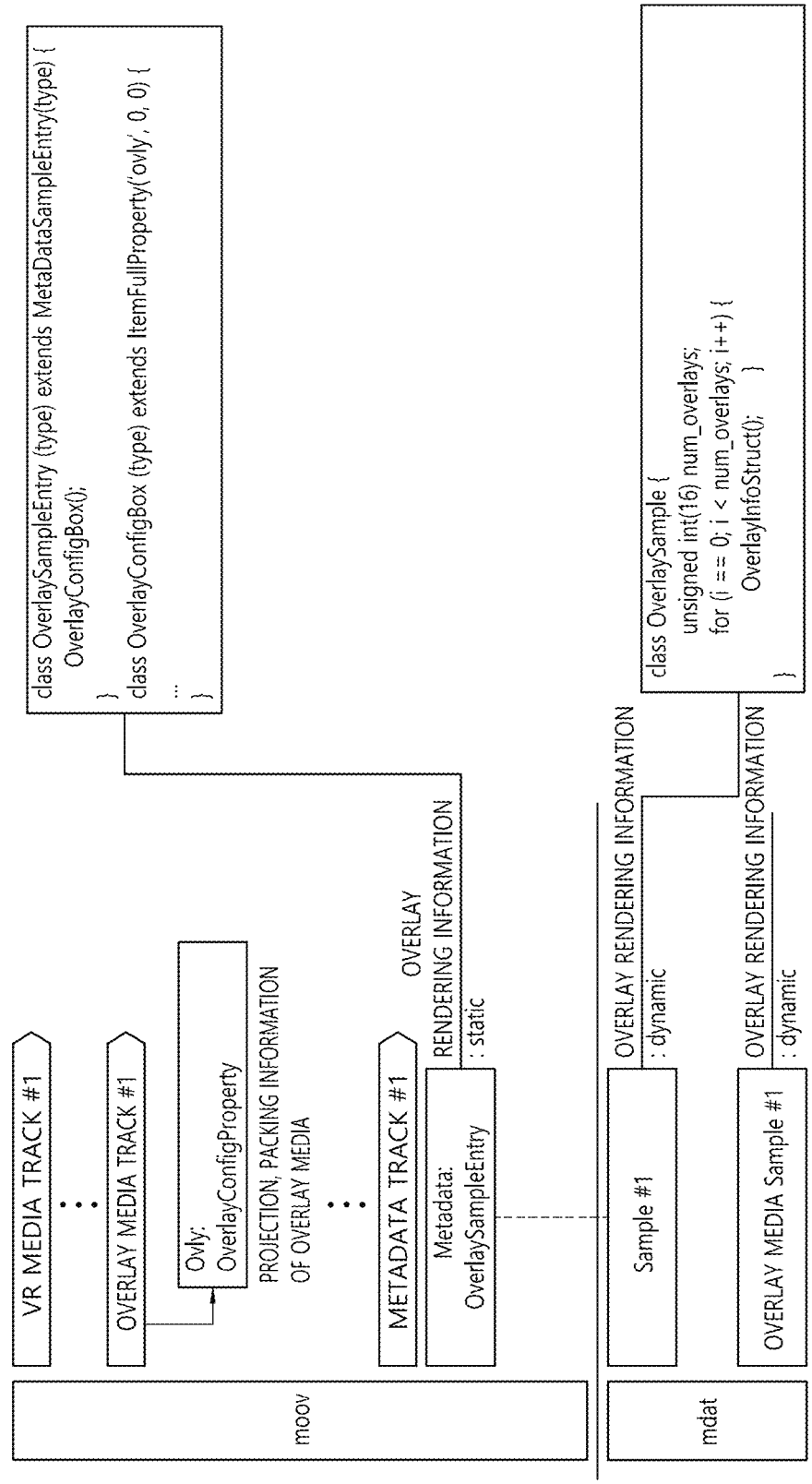
FIG. 47 shows an example of the configuration of the dynamic overlay metadata.

FIG. 47 shows an example of the configuration of the dynamic overlay metadata.

For example, when dynamic overlay metadata is composed of timed-metadata, OverlaySampleEntry is defined as shown in FIG. 47, OverlaySampleEntry inherits MetadataSampleEntry, and OverlayConfigBox can be called. Static overlay rendering metadata can be defined within the OverlayConfigBox. The actual dynamic overlay metadata can be stored in the sample. OverlaySample can consist of overlay number of OverlayInfoStruct. Here, the OverlaySampleEntry, OverlayConfigBox, and OverlaySample may be as shown in FIG. 47, and OverlayInfoStruct may be as shown in Table 21.

The overlay metadata may be stored as a separate metadata track and transmitted in order for the overlay media to support the case where the overlay position or the rendering attribute changes over time. The overlay media metadata track may include one or more samples, each sample containing one or more overlay metadata. Each sample can contain one or more OverlayInfoStruct.

Figure 48:
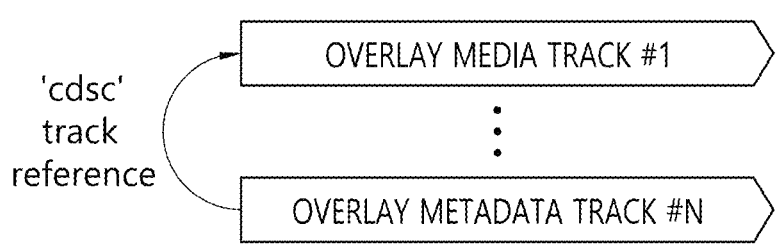
FIG. 48 shows an example of a dynamic overlay meta data track and an overlay media track link signaling.

FIG. 48 shows an example of a dynamic overlay meta data track and an overlay media track link signaling.

The overlay media track can be indicated using TrackReferenceTypeBox of the overlay metadata track. That is, by assigning a reference type value to 'cdsc' and indicating one or more overlay media track identifiers or track group identifiers (when overlay media is delivered through one or more tracks) to track IDs, the overlay media track associated with the overlay metadata may be indicated.

Figure 49:
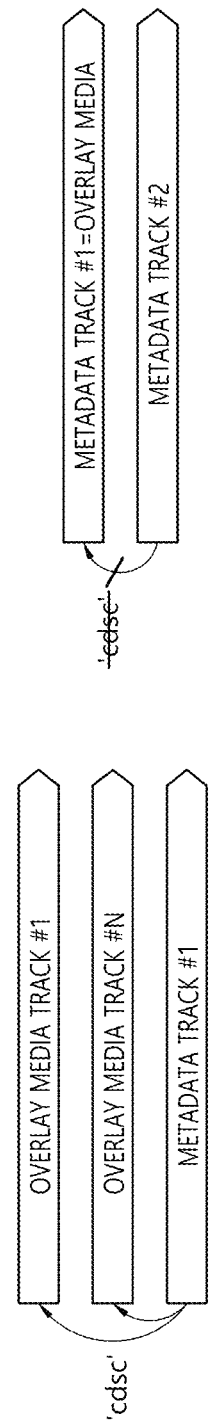
FIG. 49 shows an example of linking overlay metadata and associated overlay media.

FIG. 49 shows an example of linking overlay metadata and associated overlay media.

In one embodiment, the overlay media track referenced by the overlay metadata track may be specified through 'cdsc'. The overlay metadata may refer to one or more overlay media tracks. Here, the linking with the overlay media track can use 'cdsc', but 'cdsc' cannot be used if the overlay media is stored in the metadata track.

However, there may be cases where the metadata track has overlay media content. In this case, as the overlay media track is composed of metadata tracks, a method for a case that the overlay rendering metadata track refers to the overlay media track which is metadata track may be required. In this case, the reference track cannot be linked through 'cdsc', and, for example, Recommended Viewport may be such a case.

Figure 50:
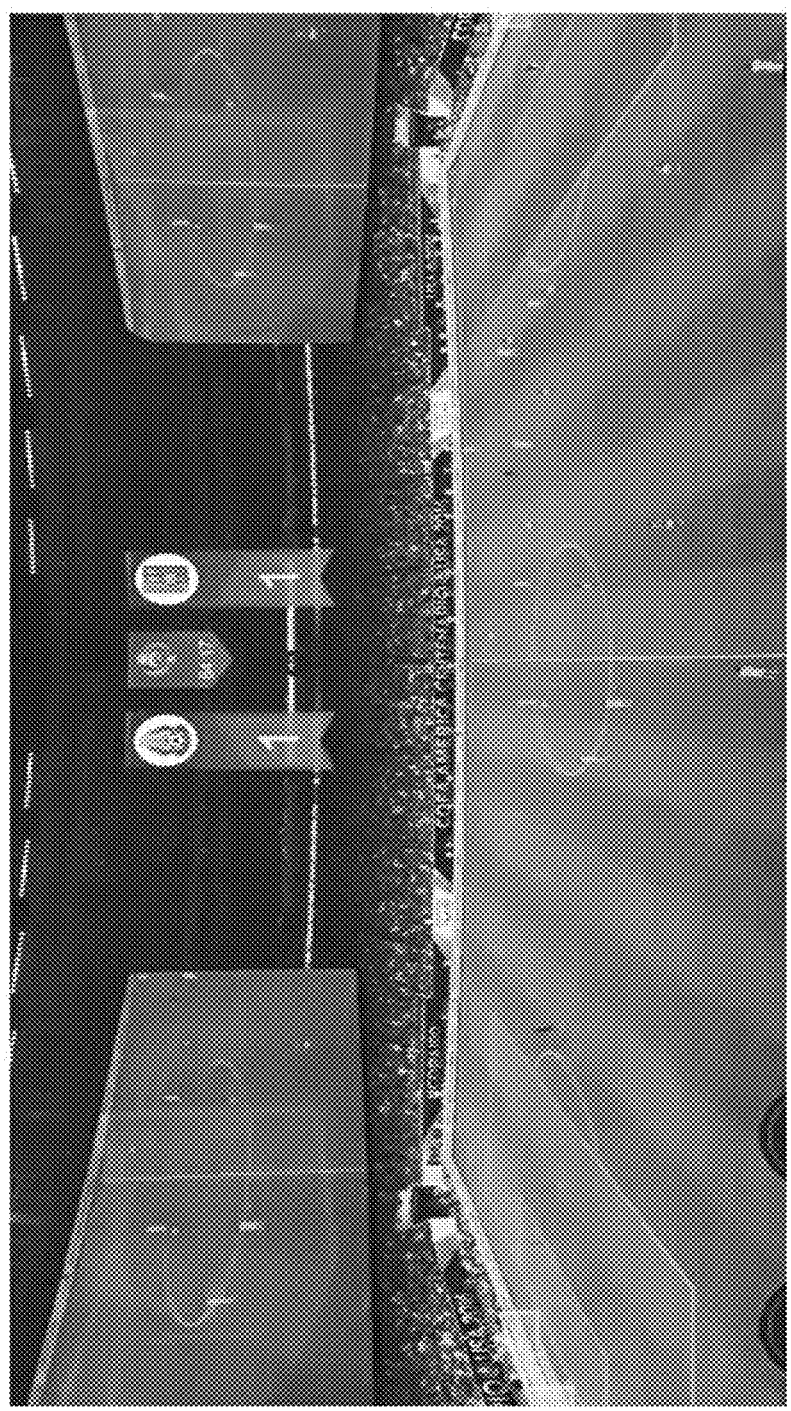
FIG. 50 shows an example of a recommended viewport overlay.

FIG. 50 shows an example of a recommended viewport overlay.

The recommended viewport can store the location of the viewport that recommends hourly to meta-data over time. The recommended viewport can automatically change the user's viewport, but it can also be view as an overlay at a specific location when VR media is rendered.

The windows shown on the left and right in FIG. 50 may correspond to the overlay of the recommended viewport. In this case, a method of linking the overlay media metadata track with the overlay rendering metadata track may be required.

FIG. 51 shows an example of an 'ovrc' track reference.

In one embodiment, a particular region of the VR media, such as a region of interest (ROI), may be overlaid on the VR media. In order to support this, if there is a separate overlay metadata track and a metadata track including a recommended viewport of the VR media, it is possible to signal the relationship between the overlay metadata track and the metadata track of the VR media.

In one embodiment, the TrackReferenceTypeBox of the overlay metadata track may be used to indicate the metadata track (such as the referenced viewport metadata track) to which the overlay metadata will be applied. To this end, by adding a new reference type (i.e. reference_type field value is 'ovrc') and indicating one or more metadata tracks (recommended viewport metadata tracks) or overlay media item identifiers to track_IDs, the metadata track to which overlay metadata is applied, and the image item may be indicated. The track(s) referred to through the 'ovrc' and track_IDs fields may be metadata track(s) or image items to which the current overlay metadata is applied. TrackReferenceBox and TrackReferenceTypeBox may include the following as shown in Table 22 below.

TABLE 22

```
aligned(8) class TrackReferenceBox extends Box( 'tref' ) {
}
aligned(8) class TrackReferenceTypeBox (unsigned int(32) reference_type) extends Box {
unsigned int(32) track_IDs[ ];
}
```

In Table 22, the track_ID field may be an integer that provides a reference from the containing track to another track or image item id within the presentation, and the track_IDs field cannot be reused and cannot have a value equal to 0. Also, the reference type field may be referred to or indicated as described above, and may be set to one of the following values.

Figure 52:
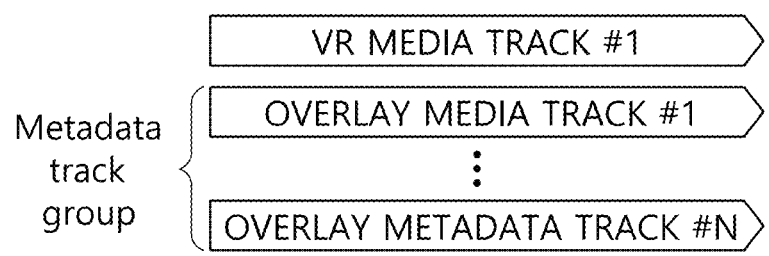
FIG. 52 shows an example of metadata track grouping.

FIG. 52 shows an example of metadata track grouping.

In one embodiment, a particular region of the VR media, such as a region of interest (ROI), may be overlaid on the VR media. In order to support this, if there is a separate overlay metadata track and a metadata track including a recommended viewport of the VR media, it should be possible to signal the relationship between the overlay metadata track and the metadata track of the VR media.

In one embodiment, TrackGroupTypeBox having a Track_group_type field value of 'mtgr' may refer to a group of metadata tracks applied together with media such as overlays in 360 scene. Tracks having the same track_group_id field value can be processed together with an overlay or the like in 360 scenes. The TrackGroupTypeBox may include MetadataGroupBox, which may include the following, as shown in Table 23:

TABLE 23

```
aligned(8) class MetadataGroupBox extends TrackGroupTypeBox( 'mtgr' ) {
   unsigned int(7) metadata_type;
   unsigned int(1) metadata_essential_flag;
}
```

In Table 23, the metadata_type field may indicate the type of metadata. For example, if the value of the metadata_type field is 0, it can indicate the recommended viewport meta data, and if it is 1, it can indicate the overlay meta data. In addition, the metadata_essential_flag field may indicate a flag indicating whether or not metadata is necessarily applied to processing and media. Essentially, if the metadata is to be applied to processing and media, a player that does not support that metadata processing may not play the associated media.

In one embodiment, a timed metadata track having a sample entry type of 'rcvp' may include zero or one SampleToGroupBox. Here, the grouping_type field of SampleToGroupBox may be 'ovmt'. The SampleToGroupBox may represent information that assigns samples in the timed metadata (and consequently the corresponding samples in the media tracks) to specific overlay metadata.

If there is SampleToGroupBox with a group_type field value of 'ovmt', there may also be SampleGroupDescriptionBox with the same group type, and the SampleGroupDescriptionBox may contain the ID of the specific overlay metadata to which the sample group belongs. A sample group entry, i.e., OverlayMetaRefEntry, of which the group_type field value is 'ovmt' may include the following as shown in Table 24 below.

TABLE 24

```
class OverlayMetaRefEntry( ) extends SampleGroupDescriptionEntry('
ovmt' ) {
   OverlayInfoStrut( );
}
```

In Table 24, OverlayInfoStruct( ) may include overlay metadata to be applied to the metadata samples included in the group, and may be as shown in Table 21.

In one embodiment, the tracks may be integrated to extend the overlay media metadata tracks. Accordingly, the metadata track may be configured to be extended to include overlay rendering metadata together with overlay media content data so as not to be linked. A recommended viewport may be an example, and the OverlayRcvpSampleEntry can be used to support it. The OverlayRcvpSampleEntry may include the following, as shown in Table 25:

TABLE 25

```
class OverlayRcvpSampleEntry( ) extends RcvpSampleEntry (' ovmv' ) {
   // overlay rendering info(position, size, opacity ... etc)
   ...
}
```

In one embodiment, an overlay alpha plane may be specified, and a linking scheme between the overlay media and the overlay alpha plane may be proposed.

The overlay or overlay media can include an image or video and can include an alpha channel. Here, the value of the alpha channel may be used to determine whether to use the RGB value of the pixel. For example, an RGB value of a pixel (10, 30) may indicate red as a value of (255, 0, 0), but when the alpha channel value of the pixel is 0, an RGB value may not exist. Or it may not appear. That is, when the value of the alpha channel is 0, it may indicate transparency. However, when the alpha channel value of the corresponding pixel is 255, the RGB value may appear in red. That is, when the value of the alpha channel is 255, it may indicate opaque. Here, the alpha channel may indicate transparency when it is the minimum value and it may indicate opacity when it is the maximum value. The maximum value may be 255, but it may be set to 1.0, and thus the present invention is not limited to specific numerical values. That is, the maximum value may be set to 1.0. In this case, when the alpha channel value is 1.0, the RGB value of the pixel (10, 30) may appear in red.

The overlay media can include an alpha plane, and alpha blending can be supported for overlay media including the alpha plane. However, when the overlay media does not include the alpha plane, alpha blending may be applied on the assumption that the alpha value or the alpha channel value for all pixels of the overlay is 255, which is the maximum value, or 1.0. The overlay alpha plane for overlay media may have the same width and height resolution as the overlay media. Alternatively, the overlay alpha plane for the overlay media may have the same width information and the same height information as the overlay media. In addition, each sample of the overlay video track and the corresponding video track of the overlay alpha plane may be configured with the same composition time. In other words, when an overlay is included in a video track, a sample of the overlay and a sample of the alpha plane for the overlay may be configured based on the same composition time. Here, the composition time may indicate information for matching time such as decoding or composition between samples in the plurality of tracks when there are a plurality of tracks associated with each other, and the samples in the tracks may refer to images, but the present invention is not limited to this example.

Here, the alpha plane may refer to an alpha channel or a set of alpha channel values, and a value corresponding to A in the RGBA value may indicate an alpha channel value. The overlay alpha plane may exist in an image item or video track and may be included in overlay related metadata. The overlay and the alpha plane for the overlay can be linked to the "axul" reference type.

Figure 53:
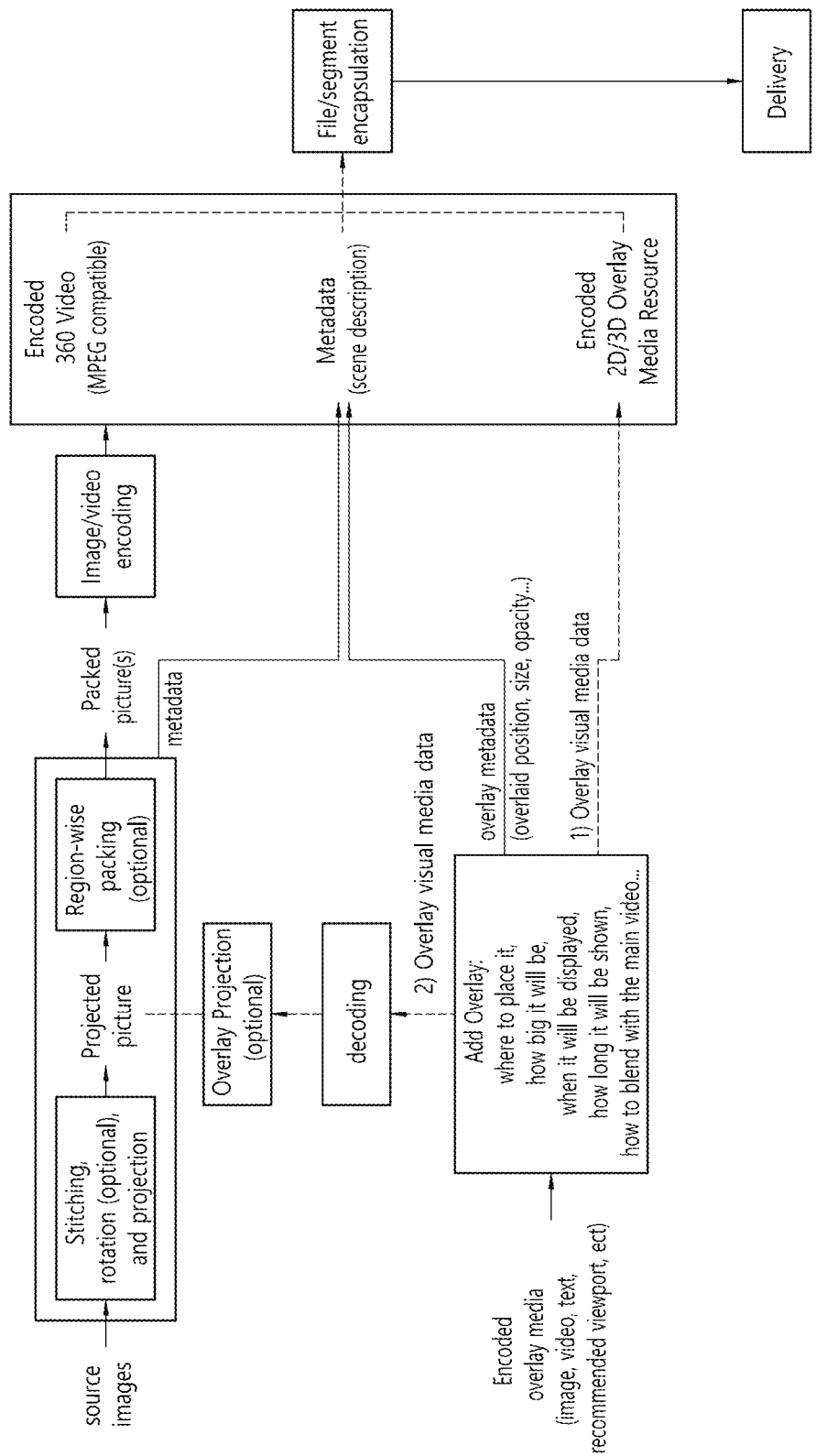
FIG. 53 shows an example of an architecture of a transmitter supporting an overlay placed on the VR media.

FIG. 53 shows an example of an architecture of a transmitter supporting an overlay placed on the VR media.

The transmitter according to an embodiment may acquire overlay media and transmit metadata and overlay media data, which are generated by the author by adjusting the position/side/rendering option, etc. of the overlay, to the receiver through the process of the file/segment encapsulator. Alternatively, a particular projection may or may not be applied to the overlay after decoding according to the packing and projection method, and then texture atlas packing or region-wise packing may be performed to thereby encode the separated overlay media track or the VR media track packed together with the overlay media track, and be transmitted to the receiver after performing the process of the file/segment encapsulator.

Figure 54:
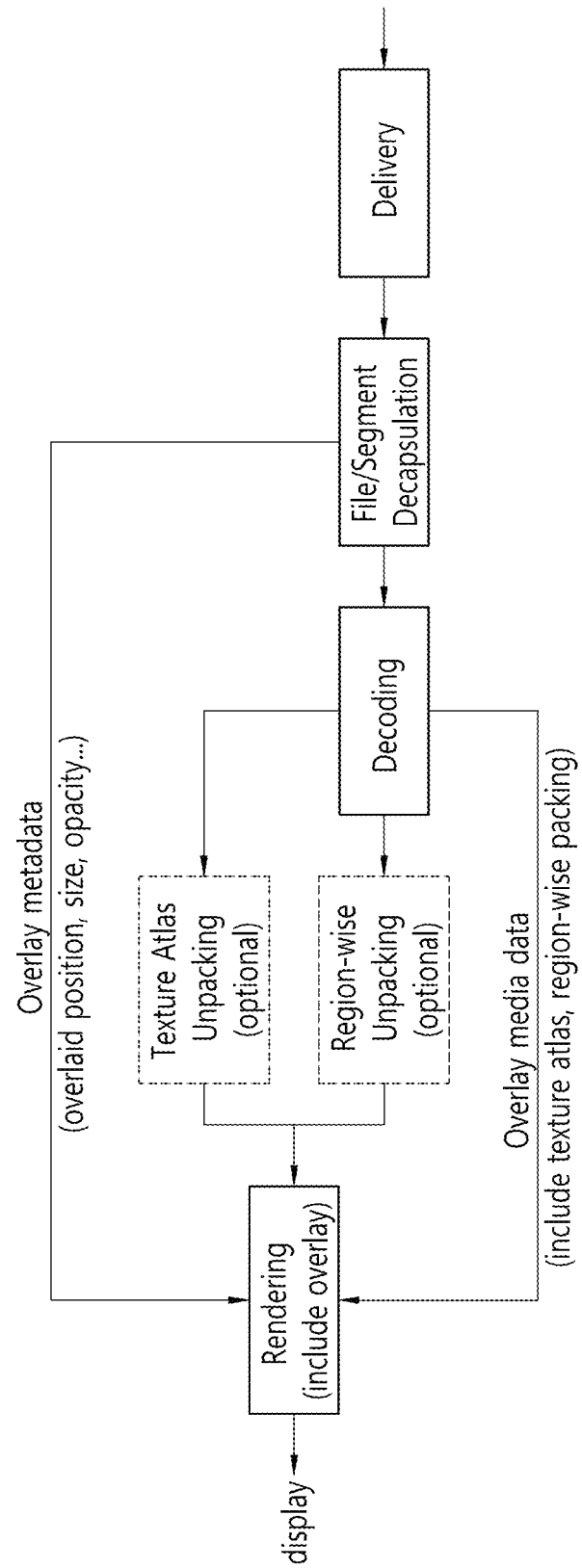
FIG. 54 shows an example of an architecture of a transmitter supporting an overlay placed on the VR media.

FIG. 54 shows an example of an architecture of a transmitter supporting an overlay placed on the VR media.

The receiver according to one embodiment may decapsulate the received data and deliver the overlay metadata to the renderer. The media data to be overlaid may be decoded and, after decoding, if packed with region-wise packing or texture atlas, each of the overlays may be unpacked and delivered to the renderer. Alternatively, the entire data may be passed to the renderer, which may be adjusted by the renderer at the time of rendering. A receiver according to an exemplary embodiment may support one of the two methods described above or may support both of them, or the application method may be adjusted by a receiver according to a hardware specification of the receiver.

Figure 55:
FIG. 55 is a diagram showing another example of overlay metadata signaling on an overlay media track.

FIG. 55 is a diagram showing another example of overlay metadata signaling on an overlay media track.

Referring to FIG. 55, in one embodiment, overlay metadata may also be signaled on the overlay media track in the following manner.

The overlay media track's sample entry may contain OverlayConfigBox. Through this, the corresponding media track includes the overlay media, and the overlay media related metadata included in the track can be signaled. OverlayConfigBox may be included in the overlay metadata, and may include the following as shown in Table 26 below.

TABLE 26

```
class OverlayConfigBox extends FullBox('ovcf', 0, 0) {
   unsigned int(8) num_overlays;
   OverlayMediaPackingStruct(num_overlays)
   for (i=0; i< num_overlays; i++) {
      OverlayInfoStruct( );
   }
}
```

In Table 26, the num_overlay field may indicate the number of overlay media included in each sample of the overlay media track or the maximum number of overlay media contained in the sample. OverlayMediaPackingStruct( ) may include the projection and packing information of the overlay media, and may be as shown in Table 1. OverlayInforStruct( ) may also include overlay metadata, which may be applied to the overlay media included in the sample of the track, and may be as shown in Table 21.

In one embodiment, the overlay media track may include SampleToGroupBox with a grouping_type field value of 'ovgr'. The SampleToGroupBox may refer to the samples to which the same overlay metadata will be applied among the samples included in the track.

If there is SampleToGroupBox having a grouping_type field value 'ovgr' on the track, SampleGroupDescriptionBox having a grouping_type field value 'ovgr' may exist, and the following information that is commonly applied to the samples may be included. A sample group entry with a grouping_type field value of 'ovgr' may be referred to as OverlayGroupEntry, and may include the following as shown in Table 27:

TABLE 27

```
class OverlayGroupEntry( ) extends
SampleGroupDescriptionEntry(' ovmm' ) {
    OverlayInfoStruct( );
}
```

In Table 27, OverlayinfoStruct( ) may include overlay metadata applied to the samples included in the group, and may be as shown in Table 21. Also, ovmm may be replaced by ovgr.

Figure 56:
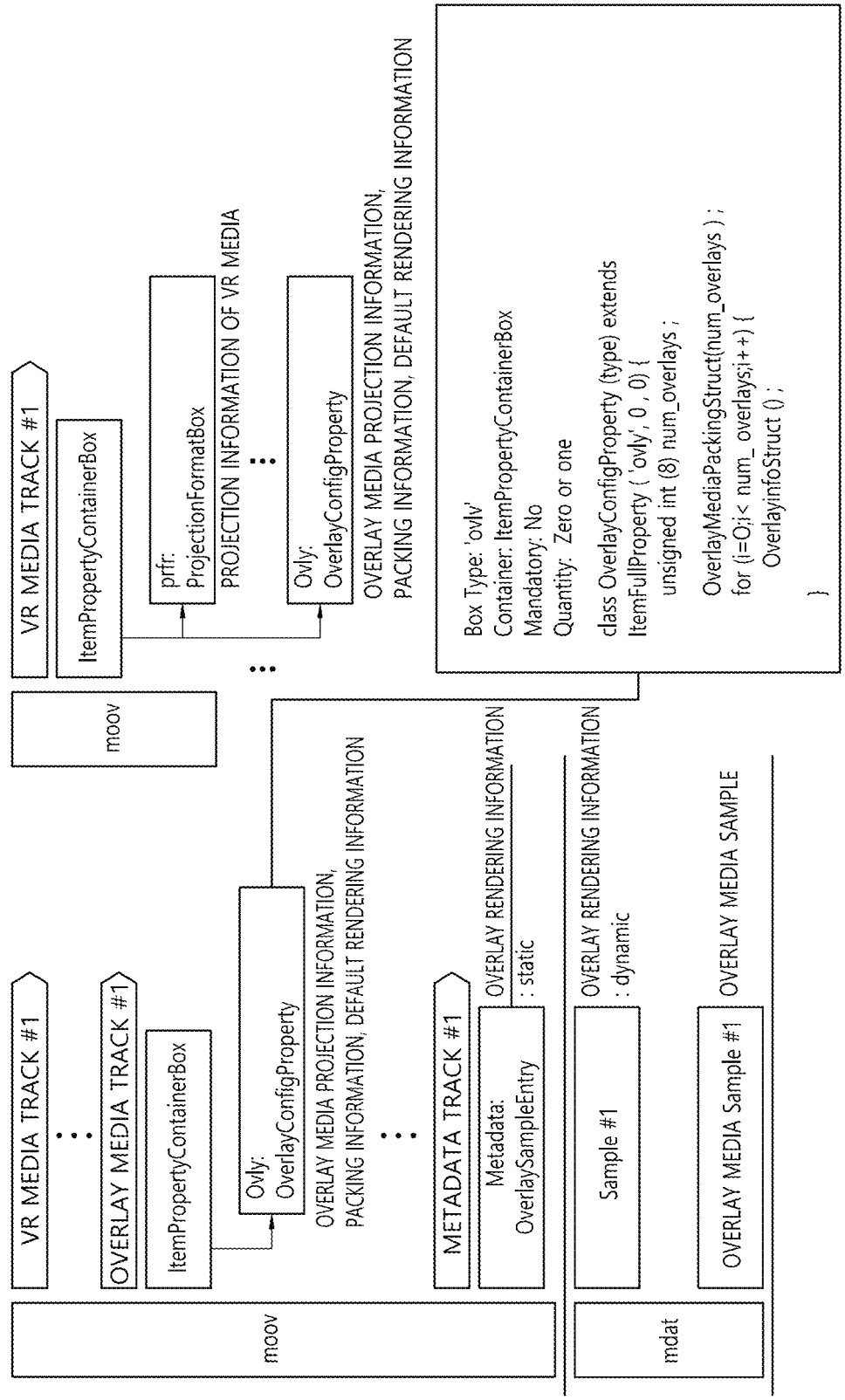
FIG. 56 shows examples of overlay media packing, projection and default rendering signaling.

FIG. 56 shows examples of overlay media packing, projection and default rendering signaling.

Figure 57:
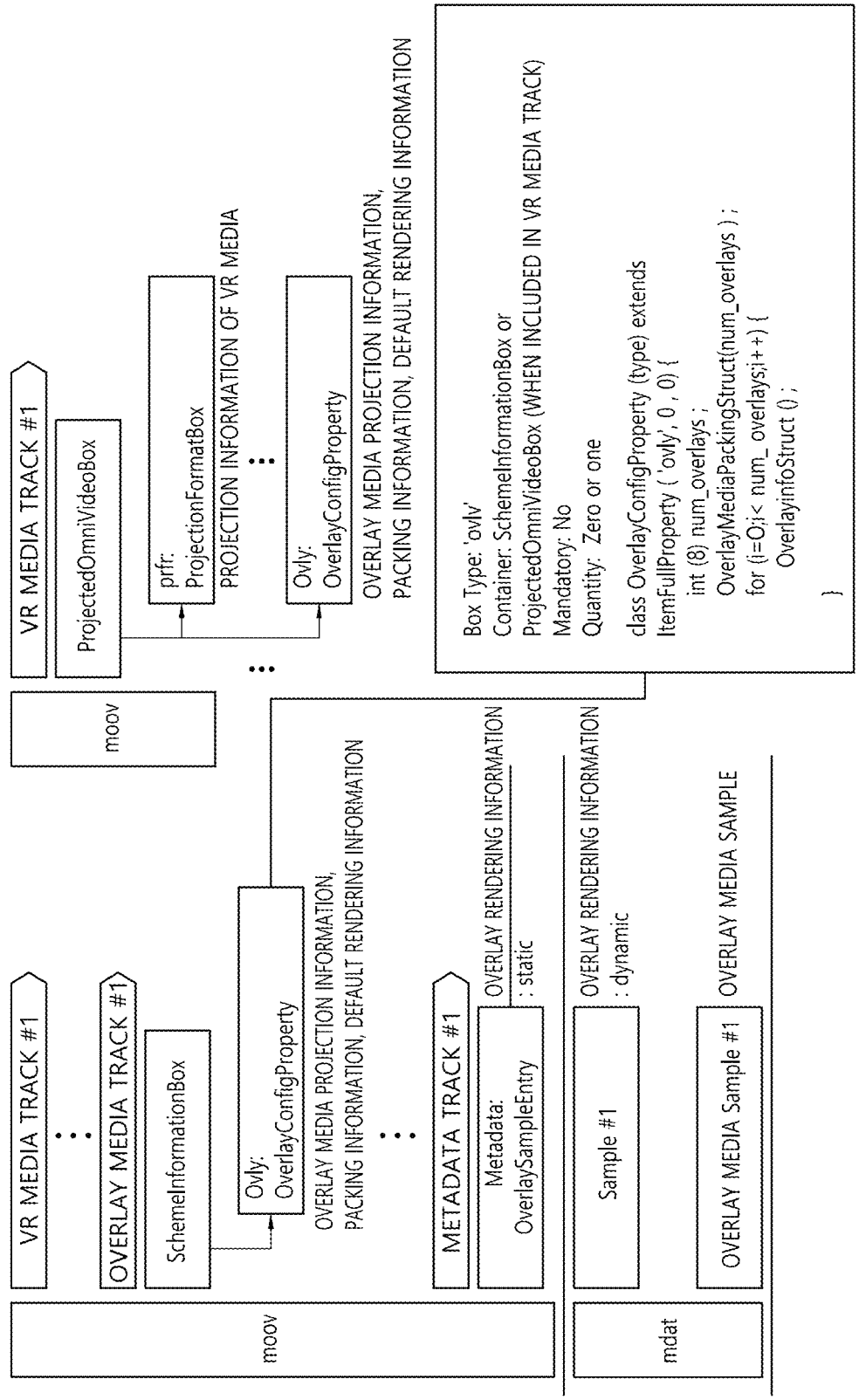
FIG. 57 shows other examples of overlay media packing, projection and default rendering signaling.

FIG. 57 shows other examples of overlay media packing, projection and default rendering signaling.

FIG. 56 may show a case where the overlay media track is an image, and FIG. 57 may show a case where the overlay media track is video.

In one embodiment, the overlay media track may include the above-described OverlayConfigBox in a sample entry, and at the same time include SampleToGroupBox and OverlayGroupEntry( ) with a grouping_type field value of 'ovgr'. In this case, the overlay metadata contained in the overlay media samples associated with the OverlayGroupEntry( ) may be applied.

Alternatively, the num_overlay field, which is the number of overlays existing in the track in order to indicate the overlay default rendering information together with the projection and packing information within the overlay media track, may be defined in OverlayConfigProperty of FIG. 56 or OverlayConfigBox of FIG. 57, may be changed to a scheme that is delivered by parameters, and OverlayInfoStruct( ) may be added. In this case, the OverlayMediaPackingStruct included in the overlay metadata may include the following as shown in Table 28:

TABLE 28

```
aligned(8) class OverlayMediaPackingStruct(num_overlays) {
    unsigned int(5) num_regions;
    for(i = 0; i < num_regions; i++) {
        unsigne int(8) overlay_region_id[i];
        unsigned int(16) overlay_region_width[i];
        unsigned int(16) overlay_region_height[i];
        unsigned int(16) overlay_region_top[i];
        unsigned int(16) overlay_region_left[i];
    }
    for (i = 0; i < num_overlays; i++) {
        unsigned int(16) overlay_source_id[i];
        unsigned int(5) projection_type[i];
        unsigned int(3) packing_type;
        unsigned int(8) overlay_region_id[i];
        if(packing_type != 0) {
            unsigned int(1) guard_band_flag[i];
```

TABLE 28-continued

```
            if (packing_type == 1)
                TextureAtlasPacking(i);
            else if (packing_type == 2)
                RectRegionPacking(i);
            else if (packing_type == 3)
                PolygonRegionPacking(i);
            if (guard_band_flag[i])
                GaurdBand(i);
        }
    }
}
```

In Table 28, each of the fields may correspond to each field of Table 1, and the same information may be indicated, but the present invention is not limited thereto.

An overlay in accordance with one embodiment may be used to add supplemental information, advertisements, logos, etc., within the VR media or 360 degree media. In addition, the overlay can add overlay to VR media as well as a 360 degree real-world environment that looks at see-through instead of 360 degree video/image in augmented reality (AR)/mixed reality (MR), and thus can be extended to AR/MR overlay signaling.

In one embodiment, a method for specifying overlay media and rendering related metadata in a VR media or a 360 degree media and the signaling method may be provided, and a scheme of signaling projection and packing information to the overlay media track and signaling rendering information (location, size, and interaction information) according to time may be configured. Also, in one embodiment, the overlay media track may include projection, packing, and default rendering information, and the metadata track may include rendering information over time as described above.

Figure 58:
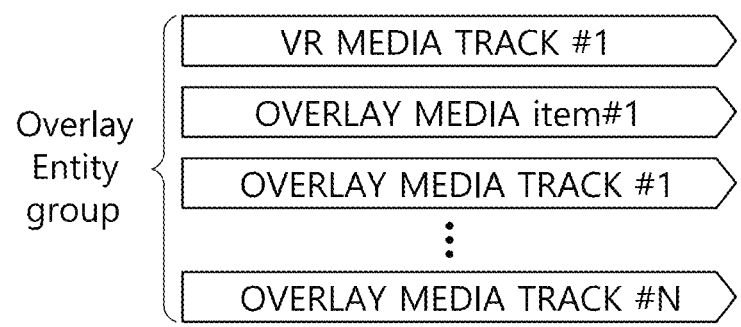
FIG. 58 shows an example of grouping VR media tracks, overlay media tracks, and overlay media items.

FIG. 58 shows an example of grouping VR media tracks, overlay media tracks, and overlay media items.

In one embodiment, in the case of the file #1, when the main VR media and the overlay media are included in the file as separate tracks, the EntityToGroupBox having the grouping_type field value 'ovgr' may indicate the group of the track and/or item including the main VR media and the overlay media. The overlay media may include image items as well as tracks because it includes video and images and the like. That is, it can refer to a group of tracks that can be rendered with an overlay or the like in 360 scene. Tracks/items having the same group_id field value may indicate that they can be rendered with an overlay, etc., in the 360 scene. This allows the player to conveniently retrieve the main media and overlay media.

Referring to FIG. 58, VR media track #1 may be grouped with overlay media item #1 and overlay media tracks #1 to N and may also be grouped with part of overlay media item #1 and overlay media tracks #1 to N. This may be referred to as an overlay entity group. The tracks and/or items in the overlay entity group may contain the same group_id field value. Or tracks and/or items having the same group_id field value may be included in the same group and rendered together. Here, the VR media track may refer to a main media track or a main VR media track. In addition, the information/fields described above may be included in the overlay related metadata. Also, in this case, the track and/or item may include OverlayVideoGroupBox, and the OverlayVideoGroupBox may be included in the EntityToGroupBox and may include the following as shown in Table 29.

TABLE 29

```
aligned(8) class OverlayVideoGroupBox extends
EntityToGroupBox( 'ovgr ' ) {
    for (i = 0; l < num_entities_in_group; i++){
        unsigned int(5) media_type;
        unsigned int(1) main_media_flag;
        unsigned int(1) overlay_media_flag;
        if ((media_type == 1 )|| (overlay_media_flag)){
            unsigned int(1) overlay_essential_flag;
        }
        bit(1) reserved = 0;
    }
}
```

In Table 29, the num_entities_in_group field may indicate the number of entities grouped by EntityToGroupBox, and the media_type field may indicate the type of media in the track group. For example, if the value of the media_type field is 0, it indicates that the media is the main media. If the value is 1, it indicates that the media is the overlay media. In addition, the main_media_flag field may indicate a flag indicating whether the media is main media, and the overlay_media_flag field may indicate a flag indicating whether the media is overlay media. The overlay_essential_flag field may indicate a flag indicating whether the overlay media should be necessarily overlaid. Here, in the case of an overlay media that should be necessarily overlaid, a flare that does not support overlay may not play the main media in the same group.

Meanwhile, the overlay rendering property information according to an embodiment may specify the transparency of the overlay plane applied during the overlay rendering, the rendering option performed when blending the overlay on the VR media, and the focus effect. Here, the overlay rendering attribute information may be included in OverlayRenderStruct( ) For example, OverlayRenderStruct( ) may be included as shown in Table 15, but may include the following as shown in Table 30.

TABLE 30

```
aligned(8) class OverlayRenderStruct( ) {
    unsigned int(1) opacity_info_flag;
    unsigned int(1) alpha_blend_flag;
    unsigned int(1) focus_flag;
    unsigned int(4) reserve =0;
    if(opacity_info_flag == 1) {
        unsigned int(8) opacity;
    }
    if (alpha_blend_flag == 1) {
        unsigned int(8) blending_mode;
    }
    if (focus_flag == 1) {
        unsigned int(8) focus;
    }
}
```

Since the opacity_info_flag field and the focus_flag field in Table 30 are the same as the opacity_info_flag field and the focus_flag field in Table 15, further description will be omitted and the alpha_blend_flag field will be described.

In Table 30, the alpha_blend_flag field may mean a flag indicating whether the overlay media has an alpha channel when synthesizing the overlay and whether alpha blending is applied when synthesizing the alpha value, and the blending_mode field may indicate a blending mode. Here, the blending mode may be classified into two types. The first classification may include a composition corresponding to the basic blending, and the second classification may include blending the color of the pixel with a more complicated operation than the composition.

In the case of the composition corresponding to the basic blending, which is the first classification, when the blending_mode field value is 1, it indicates source_over, when the value is 2, it indicates source_atop, when the value is 3, it indicates source_in, when the value is 4, it indicates source_out, when the value is 5, it indicates dest_atop, when the value is 6, it indicates Dest_over, when the value is 7, it indicates dest_in, when the value is 8, it indicates dest_out, when the value is 9, it indicates clear, and when the value is 10, it indicates xor. The default can be source_over with a blending_mode field value of 1, and the formula, which is applied for each type, may be, for example, as shown in Table 16.

Also, In the case of an operation that is more complicated than the composition, which is the second classification, when the blending_mode field value is 21, it indicates normal, when the value is 22, it indicates multiply, when the value is 23, it indicates screen, when the value is 24, it indicates overlay, when the value is 25, it indicates darken, when the value is 26, it indicates lighten, when the value is 27, it indicates color dodge, when the value is 28, it indicates color-burn, when the value is 29, it indicates hard-light, when the value is 30, it indicates soft-light, when the value is 31, it indicates difference, when the value is 32, it indicates exclusion, when the value is 33, it indicates dissolve, and when the value is 34, it indicates plus. Further, a formula applied to each mode may be, for example, as shown in Table 17 above.

That is, overlay rendering attribute information indicated by alpha_composition_flag field, composition_type field, blending_flag field, and blending_mode field in OverlayRenderStruct( ) as shown in Table 15 may be indicated by alpha_blend_flag field and blending_mode field in OverlayRenderStruct( ) as shown in Table 30.

Meanwhile, overlay miscellaneous information according to an embodiment may also be referred to as overlay miscellaneous property information or overlay rendering other information, which may include information about overlay border support, information on various overlay shapes support, information on whether the billboard is supported, and information indicating a specific point or region pointed by the location of the overlay as the target and overlay are in different locations. Here, the overlay rendering attribute information may be included in OverlayRenderStruct( ) For example, OverlayRenderStruct( ) may be included as shown in Table 15, but may include the following as shown in Table 30.

TABLE 31

```
aligned(8) class OverlayMiscStruct( ) {
    unsigned int(1) frame_flag;
    unsigned int(1) shape_flag;
    unsigned int(1) billboard_flag;
    unsigned int(1) target_flag;
    if (frame_flag == 1) {
        unsigned int(8) frame_border_width;
        unsigned int(32) frame_color[4];
    }
    if (shape_flag == 1) {
        unsigned int(8) shape_type;
        if (shape_type == 1) { // curve
            unsigned int(32) h_curvature;
            unsigned int(32) v_curvature;
        } else if (shape_type == 3) {
            unsigned int(8) num_vertices;
            unsigned int(32) scale;
            for (int i=0; i< num_vertices; i++) {
                unsigned int(32) xyz[3];
                unsigned int(32) st[2];
```

TABLE 31-continued

```
      }
    }
  }
  if (target_flag == 1) {
    unsigned int(8) target_shape_type;
    signed int(32) target_centre_azimuth;
    signed int(32) target_centre_elevation;
    unsigned int(32) target_azimuth_range;
    unsigned int(32) target_elevaton_range;
    signed int(32) target_centre_tilt;
  }
}
```

Since the frame_flag field, shape_flag field, and billbloard_flag field in Table 31 are the same as the frame_flag field, shape_flag field, and billbloard_flag field in Table 18, further description will be omitted, and the target_flag field will be described.

In Table 31, the target_flag field may mean a flag for presence or absence of an overlay target. Here, the overlay target may refer to the specific region when the overlay indicates information on a specific region which is different from the overlay in its position, or may be referred to as an overlay target region. When the target_flag field value is 1, information on the overlay target region may be included. Here, the target_shape_type field may indicate a target region. That is, it may indicate the shape of the target region. In addition, the target_centre_azimuth field and the target_centre_elevation field may indicate information about the center position of the overlay region, the specific region, or the target region. That is, each may indicate altitude information (or altitude value) and azimuth information (or azimuth value) of the center position of the overlay region, the specific region or the target region. In addition, the target_azimuth_range field and the target_elevation_range field may indicate information about the range of the overlay region, the specific region, or the target region. That is, each may indicate altitude range information and azimuth range information for the overlay region, the specific region or the target region. In addition, the target_centre_tilt field may indicate rotation information of the overlay region, the specific region or the target region, or rotation information of the center thereof.

That is, the information related to the target_flag field in OverlayMiscStruct( ) as shown in Table 18 may be more specifically indicated by at least one of target_flag field, target_shape_type field, target_centre_azimuth field, target_centre_elevation field, target_azimuth_range field, target_elevation_range field, and target_centre_tilt field in the OverlayMiscStruct( ) as shown in Table 31.

Figure 59:
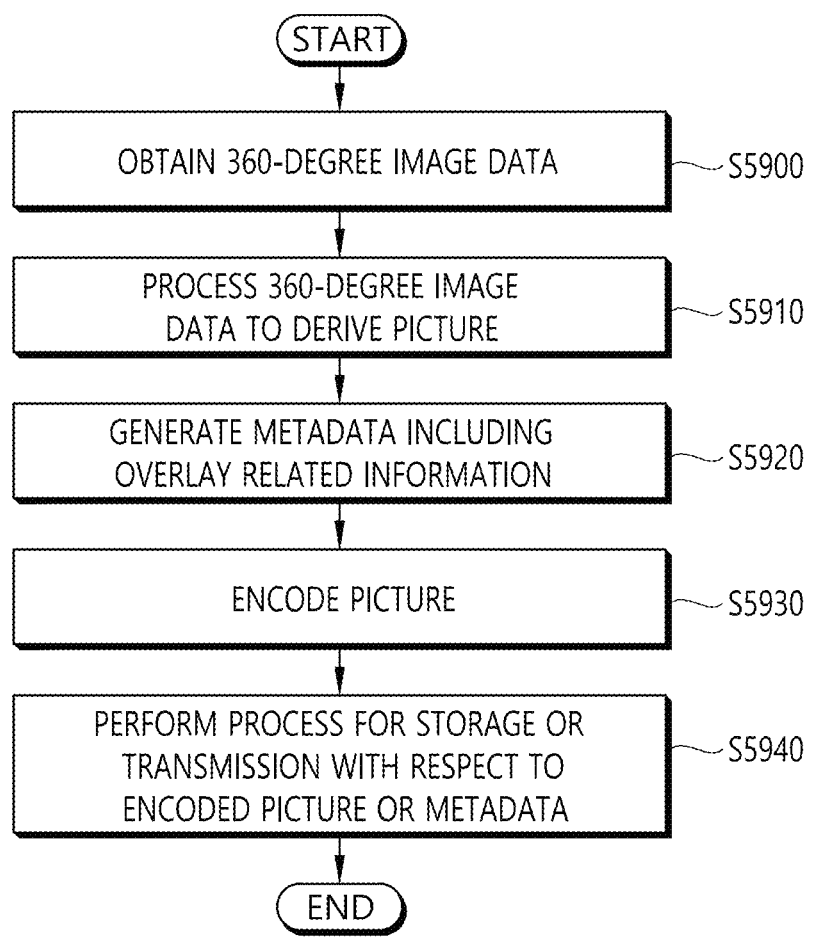
FIG. 59 schematically shows a method of processing 360 video data by the 360 video transmission apparatus according to the present invention.

FIG. 59 schematically shows a method of processing 360 video data by the 360 video transmission apparatus according to the present invention. The method disclosed in FIG. 59 can be performed by the 360 video transmission apparatus disclosed in FIG. 5 or FIG. 6.

Referring to FIG. 59, the 360 video transmission apparatus acquires a 360 video (S5900). Herein, the 360 video may be a video/image captured by at least one camera. Or a part or the whole of the 360 video may be a virtual image generated by a computer program or the like. The 360 video can be your own still images, or can be part of the 360 video.

The 360 video transmission apparatus processes the 360 video/image to derive a picture (S5910). The 360 video transmission apparatus can derive the 2D-based picture based on the above-described various projection formats, region-wise packing procedures, and the like. The derived picture may correspond to the projected picture or may correspond to a packed picture (when the region-wise packing process is applied).

The 360 video transmission apparatus generates the metadata related to the 360 video/image (S5920). Here, the metadata may include the fields described above. The fields may be included in boxes of various levels or may be included as data in a separate track within the file. For example, the metadata may include some or all of the fields/information described in Tables 1 to 31 above. For example, the metadata may include the above-described overlay-related metadata (including information/fields).

For example, the overlay related metadata may include information about an alpha plane of the overlay. Here, the alpha plane may refer to an alpha channel or a set of alpha channel values and may exist in an image item or a video track. That is, when the overlay is an image, it may be included in an image item with RGB values, and when the overlay is video, it may be included in a video track along with RGB values. In other words, RGBA information including alpha plane or alpha channel values may be included in an image item or video track. Here, information corresponding to A of RGBA may mean an alpha plane or an alpha channel value.

For example, when the overlay is included in the video track, the sample of the alpha plane video track may have a composition time such as the sample of the overlay video track. Here, the alpha plane video track may represent a video track including information about the alpha plane of the overlay, and may also be referred to as an alpha plane, an alpha plane video or an alpha plane track. In addition, the overlay video track may represent a video track including information on the overlay and may be referred to as an overlay, overlay media, overlay media track, overlay video, or overlay track.

In other words, the samples of the alpha plane for the overlay can be used to render the overlay in conjunction with the samples of the overlay, so they can have the same composition time from each other.

For example, the overlay and the alpha plane for the overlay may have the same width information and height information. Alternatively, they may have the same width and height resolution. Alternatively, the height and width of the overlay may be the same as the height and width of the alpha plane.

For example, the overlay and the alpha plane may be connected using an "auxl" reference type. In other words, the overlay and the alpha plane for the overlay may be rendered in connection with each other, and the connection information for this may be included in the metadata. That is, the overlay and the alpha plane for the overlay may be linked with each other based on the reference type of "auxl".

For example, the overlay related metadata may include location information about a specific region, and the specific region may be a target region related to the overlay. Here, the location information on the specific region may include information on the center of altitude of the specific region, information on the center of the orientation, information on the center of rotation, information on the altitude range and information on the orientation range. In addition, the specific region may mean an region indicated by the overlay as an region which is different from the overlay in its position, and may be referred to as an overlay target, an overlay target region, or a target region associated with the overlay. According to an embodiment, the target_flag field in the overlay related metadata may indicate information on the presence or absence of the specific region described above.

When the target_flag field value is 1, the target region may be indicated by the target_shape_type field, and the target_centre_azimuth field and the target_centre_elevation field may indicate altitude information and azimuth information regarding the center position of the specific region. In addition, the target_azimuth_range field and the target_elevation_range field may indicate information about a range of a specific region. In addition, the target_centre_tilt field may indicate rotation information of a specific region. The above information and/or field may be included in OverlayMiscStruct( ) and OverlayMiscStruct( ) may be included in overlay related metadata. More detailed description has been given above with Table 31.

For example, overlay related metadata includes group information about the overlay and main media to be rendered with the overlay, the decoded picture includes the main media, and the group information may include a num_entities_in_group field indicating the number of grouped entities. Information indicating a picture to be rendered with the overlay may be included in the EntityToGroupBox, and a num_entities_in_group field may be included in the EntityToGroupBox. Here, the EntityToGroupBox may refer to a track and/or a group of items including the main VR media and the overlay media, and the main VR media and the overlay media in the group may be rendered together. This can be used when the main VR media and the overlay media are included in separate tracks. Here, the main media may be included in the decoded picture, and may be referred to as a main VR media or VR media or a background media or a decoded picture or part of a decoded picture.

For example, when the overlay and the main media are packed together, the region of the overlay does not overlap with the region of the main media, and the decoded picture may include the main media. In other words, the main media and the overlay may be packed together, the main media may be positioned in some regions within the packed picture or packed picture, and the overlay may be positioned in some other regions. Here, the region where the main media is located and the region where the overlay is located may not overlap each other. Information about the region where the main media is located and/or the region where the overlay is located may be specified through the RegionWisePackingBox. Here, the packed picture may include a decoded picture or a part of the decoded picture. Here, the main media may be included in the decoded picture, and may be referred to as a main VR media or VR media or a background media or a decoded picture or part of a decoded picture.

For example, the overlay related metadata may include static information of the overlay, and if the overlay is an image, the static information of the overlay may be stored in OverlayConfigProperty. The OverlayConfigProperty may be included in ItemPropertyContainerBox. Further, timed metadata among the overlay related metadata may be stored in the sample. Here, the static metadata may refer to metadata that does not change with time, and the timed metadata may refer to metadata that varies with time.

The 360 video transmission apparatus encodes the derived picture (S5930). The 360 video transmission apparatus can encode the two-dimensional picture and output it as a bitstream.

The 360 video transmission apparatus may encode and output the overlay texture (media) according to the type of the texture (media) to be overlaid. In this case, the encoded overlay texture (media) may be included in 360 image/video data to be described later.

Alternatively, the texture (media) to be overlaid may be stored in the 360 video reception apparatus, or may be transmitted separately through the network.

The 360 video transmission apparatus performs processing for storing or transmitting the encoded picture and the metadata (S5940). The 360 video transmission apparatus may generate 360 image/video data based on the data regarding the encoded picture and/or the metadata. When a series of pictures for a series of images constituting 360 video are encoded, the 360 video data including the encoded pictures may be generated. The picture may include main media (background media) as described above.

The 360 video transmission apparatus may encode and output the overlay media according to the type of overlay media. In this case, the encoded overlay media may be included in 360 image/video data to be described later. For example, the 360 image/video data may include the main media and/or the overlay media in units of tracks.

Alternatively, the overlay media may be pre-stored in the 360 video reception apparatus, and may be signaled to the 360 video reception apparatus via the network separately from the 360 image/video data. Or the overlay media may be signaled from a separate entity to the 360 video reception apparatus through the network.

The 360 video transmission device may encapsulate the data regarding the encoded picture(s) and/or the metadata in the form of a file or the like. The 360 video transmission apparatus can encapsulate the encoded 360 video data and/or the metadata in a file format such as ISOBMFF or CFF or process them in a form such as other DASH segments in order to store or transmit them. The 360 video transmission device may include the metadata on a file format. For example, the metadata may be included in boxes of various levels on an ISOBMFF file format, or may be included as data in separate tracks within a file.

Also, the 360 video transmission device may encapsulate the metadata itself into a file. The 360 video transmission device may apply processing for transmission to the 360 video data encapsulated according to the file format. The 360 video transmission device can process the 360 video data according to any transmission protocol. The processing for transmission may include processing for transmission through a broadcasting network, or processing for transmission via a communication network such as broadband. In addition, the 360 video transmission apparatus may apply processing for transmission to the metadata. The 360 video transmission apparatus may transmit the 360 image/video data (including the metadata), which has been transmitted, through the broadcasting network and/or broadband.

Figure 60:
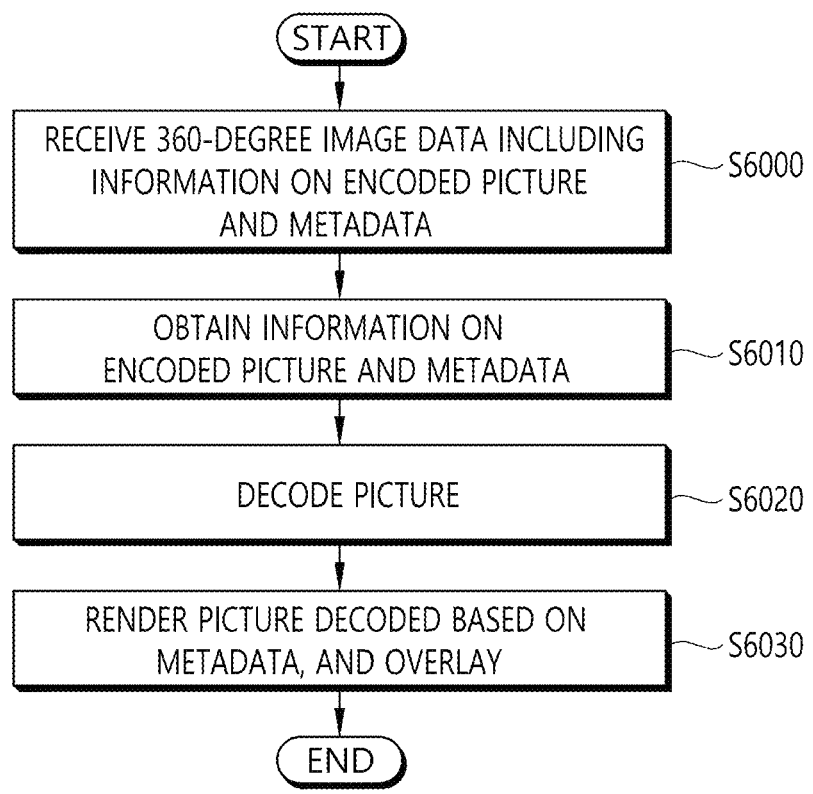
FIG. 60 schematically shows a method of processing 360 video data by the 360 video reception apparatus according to the present invention.

FIG. 60 schematically shows a method of processing 360 video data by the 360 video reception apparatus according to the present invention. The method disclosed in FIG. 60 can be performed by the 360 video reception apparatus disclosed in FIG. 6 or FIG. 17.

Referring to FIG. 60, the 360 video reception apparatus receives 360 image/video data (signal) (S6000). The 360 video reception apparatus can receive the 360 image/video data signaled from the 360 video transmitting apparatus through the broadcasting network. The 360 image/video data may include information about the encoded picture(s) of the 360 image/video, and the metadata. In addition, the 360 video reception apparatus may receive 360 image/video data through a communication network such as broadband, or a storage medium.

The 360 video reception apparatus obtains the information about the encoded picture and the metadata (S6010). Information on the encoded picture and the metadata may be obtained from the 360 image/video data through a procedure such as file/segment decapsulation.

The metadata may include the fields described above. The fields may be included in boxes of various levels or may be included as data in a separate track within the file. For example, the metadata may include some or all of the fields/information described in Tables 1 to 31 above. For example, the metadata may include the above-described overlay-related metadata (including information/fields).

For example, the overlay related metadata may include information about an alpha plane of the overlay. Here, the alpha plane may refer to an alpha channel or a set of alpha channel values and may exist in an image item or a video track. That is, when the overlay is an image, it may be included in an image item with RGB values, and when the overlay is video, it may be included in a video track along with RGB values. In other words, RGBA information including alpha plane or alpha channel values may be included in an image item or video track. Here, information corresponding to A of RGBA may mean an alpha plane or an alpha channel value.

For example, when the overlay is included in the video track, the sample of the alpha plane video track may have a composition time such as the sample of the overlay video track. Here, the alpha plane video track may represent a video track including information about the alpha plane of the overlay, and may also be referred to as an alpha plane, an alpha plane video or an alpha plane track. In addition, the overlay video track may represent a video track including information on the overlay and may be referred to as an overlay, overlay media, overlay media track, overlay video, or overlay track.

In other words, the samples of the alpha plane for the overlay can be used to render the overlay in conjunction with the samples of the overlay, so they can have the same composition time from each other.

For example, the overlay and the alpha plane for the overlay may have the same width information and height information. Alternatively, they may have the same width and height resolution. Alternatively, the height and width of the overlay may be the same as the height and width of the alphaplane.

For example, the overlay and the alpha plane may be connected using an "auxl" reference type. In other words, the overlay and the alpha plane for the overlay may be rendered in connection with each other, and the connection information for this may be included in the metadata. That is, the overlay and the alpha plane for the overlay may be linked with each other based on the reference type of "auxl".

For example, the overlay related metadata may include location information about a specific region, and the specific region may be a target region related to the overlay. Here, the location information on the specific region may include information on the center of altitude of the specific region, information on the center of the orientation, information on the center of rotation, information on the altitude range and information on the orientation range. In addition, the specific region may mean an region indicated by the overlay as an region which is different from the overlay in its position, and may be referred to as an overlay target, an overlay target region, or a target region associated with the overlay. According to an embodiment, the target_flag field in the overlay related metadata may indicate information on the presence or absence of the specific region described above. When the target_flag field value is 1, the target region may be indicated by the target_shape_type field, and the target_centre_azimuth field and the target_centre_elevation field may indicate altitude information and azimuth information regarding the center position of the specific region. In addition, the target_azimuth_range field and the target_elevation_range field may indicate information about a range of a specific region. In addition, the target_centre_tilt field may indicate rotation information of a specific region. The above information and/or field may be included in OverlayMiscStruct( ) and OverlayMiscStruct( ) may be included in overlay related metadata. More detailed description has been given above with Table 31.

For example, overlay related metadata includes group information about the overlay and main media to be rendered with the overlay, the decoded picture includes the main media, and the group information may include a num_entities_in_group field indicating the number of grouped entities. Information indicating a picture to be rendered with the overlay may be included in the EntityToGroupBox, and a num_entities_in_group field may be included in the EntityToGroupBox. Here, the EntityToGroupBox may refer to a track and/or a group of items including the main VR media and the overlay media, and the main VR media and the overlay media in the group may be rendered together. This can be used when the main VR media and the overlay media are included in separate tracks. Here, the main media may be included in the decoded picture, and may be referred to as a main VR media or VR media or a background media or a decoded picture or part of a decoded picture.

For example, when the overlay and the main media are packed together, the region of the overlay does not overlap with the region of the main media, and the decoded picture may include the main media. In other words, the main media and the overlay may be packed together, the main media may be positioned in some regions within the packed picture or packed picture, and the overlay may be positioned in some other regions. Here, the region where the main media is located and the region where the overlay is located may not overlap each other. Information about the region where the main media is located and/or the region where the overlay is located may be specified through the RegionWisePackingBox. Here, the packed picture may include a decoded picture or a part of the decoded picture. Here, the main media may be included in the decoded picture, and may be referred to as a main VR media or VR media or a background media or a decoded picture or part of a decoded picture.

For example, the overlay related metadata may include static information of the overlay, and if the overlay is an image, the static information of the overlay may be stored in OverlayConfigProperty. The OverlayConfigProperty may be included in ItemPropertyContainerBox. Further, timed metadata among the overlay related metadata may be stored in the sample. Here, the static metadata may refer to metadata that does not change with time, and the timed metadata may refer to metadata that varies with time.

The 360 video reception apparatus decodes the picture(s) based on the information about the encoded picture (S6020). The decoded picture may correspond to the projected picture or may correspond to a packed picture (when the region-wise packing process is applied). The decoded picture may include a main medium (background media). Or the decoded picture may include overlay media.

The 360 video reception apparatus may decode the overlay texture (media) according to the type of texture (media) to be overlaid. In this case, the encoded overlay texture (media) may be included in the above 360 image/video data.

Alternatively, the overlay media may be pre-stored in the 360 video reception apparatus, and may be signaled to the 360 video reception apparatus via the network separately from the 360 image/video data. Or the overlay media may be signaled from a separate entity to the 360 video reception apparatus through the network.

The 360 video reception apparatus may decode the picture based on the metadata as the case may be. This may include, for example, a case of performing decoding for a portion of a picture in which a viewport is located, or a case of changing the view point or when a decoding of another specific picture at a location linked to the overlay is required, etc.

The 360 video reception apparatus renders the decoded picture and the overlay based on the metadata (S6030). The 360 video reception apparatus may process and render the decoded picture and the overlay based on the metadata. Alternatively, the overlay may be rendered based on the overlay related metadata. In this case, the decoded picture may be rendered on a 3D surface through a procedure such as re-projection as described above. In the case of the overlay, it may be rendered on a viewport, a 3D surface, a 3D space, etc. according to the above-described overlay type based on the metadata.

The steps described above may be omitted according to the embodiment, or may be replaced by other steps performing similar/same operations.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

The embodiments of the present invention described above may be applied to VR and AR. The embodiments of the present invention described above may be implemented based on a chip-set as below.

Figure 61:
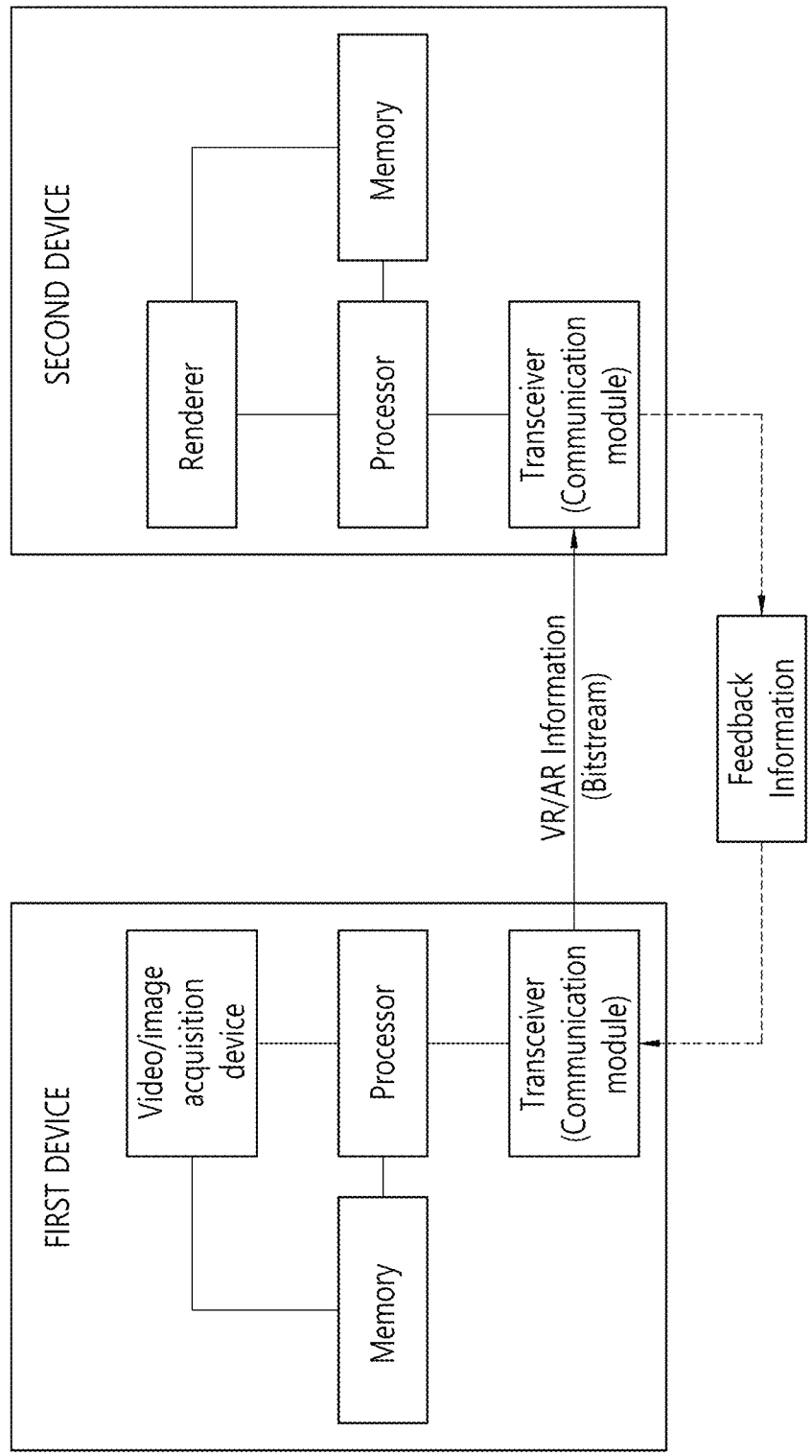
FIG. 61 illustrates an apparatus that can support embodiments of the present invention.

FIG. 61 illustrates an apparatus that may support the embodiments of the present invention. For example, the first device may include a transmission apparatus (e.g., 360-degree video transmission apparatus), and the second device may include a reception apparatus (e.g., 360-degree video reception apparatus). The technical feature of the present disclosure for the transmission apparatus and the reception apparatus described above may be applied to this embodiment.

For example, the first device may include a processor, a memory, a video/image acquisition device and a transceiver. The processor may be configured to perform the function, procedure and/or method proposed in the present disclosure. For example, the processor may be configured to control and/or perform the procedure such as stitching, projection, (region-wise) packing, composition, (video/image) encoding, metadata generation and process described above. The processor may be configured to control and/or perform 360-degree video/image acquisition procedure and a procedure for encapsulation and transmission of VR/AR information (e.g., 360-degree video/image data, etc.). The processor may control configuration and transmission of the metadata described in the embodiments of the present invention. The memory is operably coupled with the processor and stores various types of information for operating the processor. The transceiver is operably coupled with the processor and transmits and/or receives wired/wireless signal.

In addition, for example, the second device may include a processor, a memory, and a renderer. The renderer may be omitted and implemented as an external device. The processor may be configured to perform the function, procedure and/or method proposed in the present disclosure. For example, the processor may be configured to control and/or perform the procedure such as acquisition and process of the metadata described above, (video/image) decoding, (region-wise) unpacking, selection, composition, re-projection, rendering. The processor may be configured to control and/or perform decapsulation of VR/AR information (e.g., 360-degree video/image data, etc.) and a procedure for a reception process. The processor may control configuration and transmission of the metadata described in the embodiments of the present invention. The memory is operably coupled with the processor and stores various types of information for operating the processor. The transceiver is operably coupled with the processor and transmits and/or receives wired/wireless signal.

In the present disclosure, the processor may include application-specific integrated circuit (ASIC), other chipset, logical circuit and/or data processing device. The memory may include read-only memory (ROM), random access memory (RAM), flash memory, memory card, storage medium and/or other storage device. The transceiver may include base band circuit for processing radio frequency signal. In the case that the embodiment is implemented by software, the techniques described in the present disclosure may be implemented by a module (e.g., process, function, etc.) performing the function described in the present disclosure. The memory may be implemented inside of the processor. In addition, the memory may be implemented outside of the processor, and may be connected to the processor in which communication is available through various means published in the technical field.

The first device may be a device in relation to a base station, a network node, a transmission UE, a reception UE, a wireless device, a wireless communication device, a vehicle, a vehicle on which an autonomous driving function is mounted, a Connected Car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin tech device (or financial device), a security device, a climate/environment device, a device related to 5G service or other device related to the fourth industrial revolution field.

The second device may be a device in relation to a base station, a network node, a transmission UE, a reception UE, a wireless device, a wireless communication device, a vehicle, a vehicle on which an autonomous driving function is mounted, a Connected Car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin tech device (or financial device), a security device, a climate/environment device, a device related to 5G service or other device related to the fourth industrial revolution field.

For example, a terminal may include a mobile phone, a smart phone, a laptop computer, a digital broadcasting terminal, a personal digital assistant (PDA), a portable multimedia player (PMP), a navigation, a slate PC, a tablet PC, an ultra-book, a wearable device (e.g., smart watch, smart glass, head mounted display) and the like. For example, the HMD may be a display device in the form of mounting on a head. For example, the HMD may be used for implementing VR, AR or MR.

For example, the drone may be a flying object flying by a wireless control signal, on which a man does not board. For example, the VR device may include a device implementing an object or a surrounding of virtual world. For example, the AR device may include a device implementing by connecting an object or a surrounding of virtual world to an object or a surrounding of real world. For example, the MR device may include a device implementing by fusing an object or a surrounding of virtual world to an object or a surrounding of real world. For example, the hologram device may include a device implementing 360-degree stereoscopic image by recoding and playing stereoscopic information by utilizing the interference phenomenon of light which may occur when two Laser rights meet. For example, the public safety device may include an image relay device or an image device mountable on a body of a user. For example, the MTC device and the IoT device may be a device that does not require a direct intervention or manipulation of a man. For example, the MTC device and the IoT device may include a smart meter, a bending machine, a thermometer, a smart bulb, a door lock or various types of sensors. For example, the medical device may be a device used for the purpose of diagnosing, relieving, treating or preventing disease. For example, the medical device may be a device used for the purpose of diagnosing, treating, relieving or amending injury or disability. For example, the medical device may be a device used for the purpose of examining, replacing or deforming a structure or a function. For example, the medical device may be a device used for the purpose of adjusting pregnancy. For example, the medical device may include a treating device, an operational device, a (extracorporeal) diagnostic device, a hearing-aid or a surgical procedure device. For example, the security device may be a device installed to prevent a danger concerned to be occurred and keeping a safety. For example, security device may be a camera, a CCTV, a recorder or a black box. For example, the pin tech device may be a device that may provide a financial service such as a mobile payment. For example, the pin tech device may include a payment device or a Point of Sales (POS). For example, the climate/environment device may include a device of monitoring or anticipating climate/environment.

The first device and/or the second device may have one or more antennas. For example, the antenna may be configured to transmit and receive a radio signal.

The technical features according to the present invention described above may be applied to various services such as VR/AR. In addition, the technical features according to the present invention described above may be performed through fifth generation (5G) or next generation communication. For example, data (e.g., including video/image bitstream, metadata, etc.) output from a transmission apparatus (e.g., 360-degree video transmission apparatus) may be transmitted to a reception apparatus (e.g., 360-degree video reception apparatus) through the 5G communication. In addition, (VR/AR) image/video acquisition device may be separately provided in outside and forward the acquired image/video through the 5G communication to the transmission apparatus. In addition, the transmission apparatus and/or the reception apparatus according to the present invention may support various service scenarios through the 5G communication.

Figure 62:
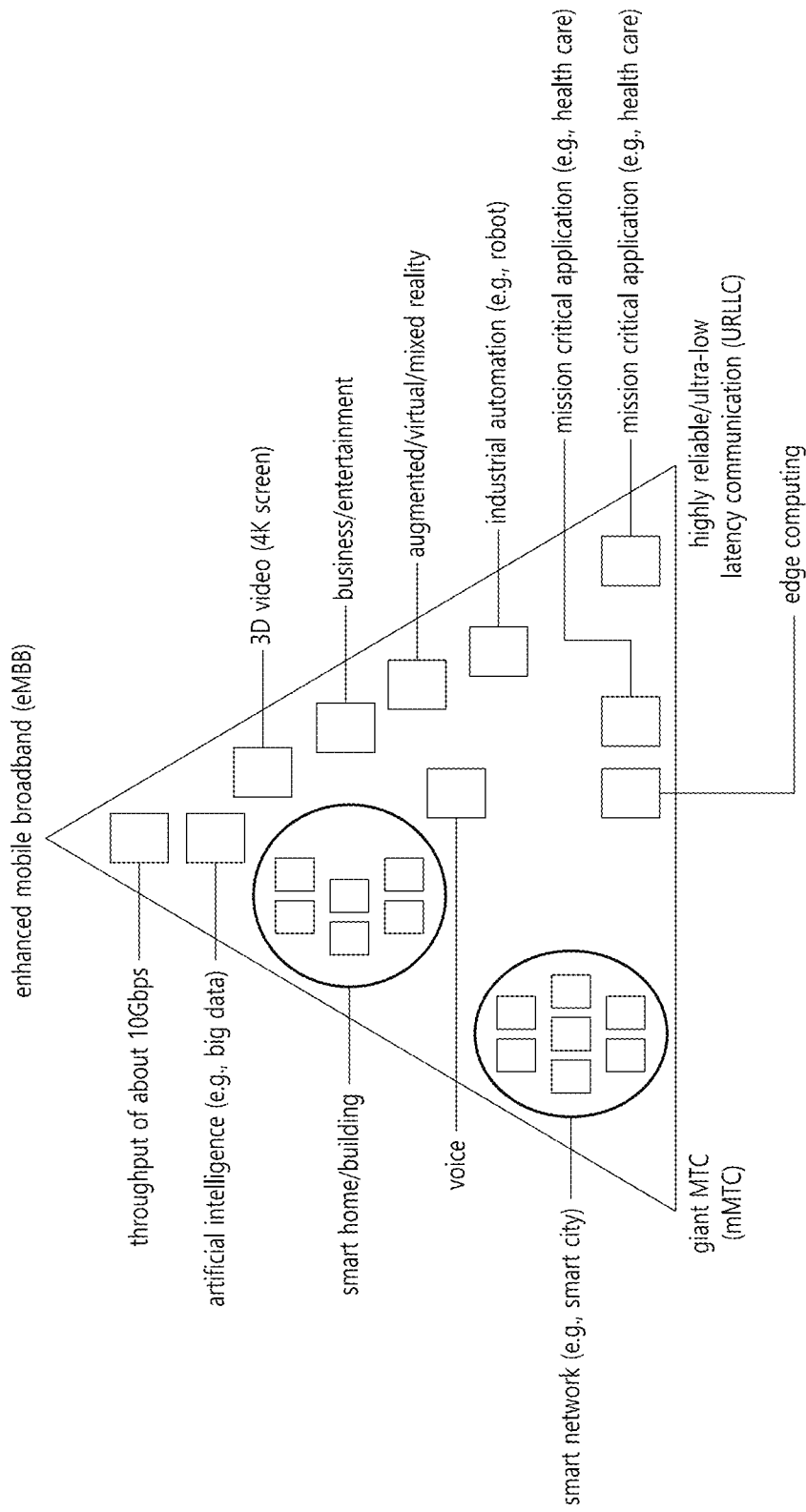
FIG. 62 shows an example of a 5G usage scenario to which the technical features of the present invention may be applied.

FIG. 62 illustrates an example of 5G use scenario to which the technical feature of the present invention may be applied. Here, the 5G use scenario shown herein is just an example, but the technical feature of the present invention may also be applied to other 5G use scenario which is not shown.

Referring to FIG. 62, three main requirements area of 5G includes (1) enhanced mobile broadband (eMBB) area, (2) massive machine type communication (mMTC) area and (3) ultra-reliable and low latency communications (URLLC) area. Some part of use example may require multiple areas for optimization, and another use example may be focused only on a key performance indicator (KPI). 5G supports such various use examples in flexible and reliable way.

eMBB is focused on data speed, latency, user density, capacity of mobile broadband access and overall improvement of coverage. eMBB is targeted to throughput of about 10 Gbps. eMBB enables basic mobile internet access to be surpassed and covers abundant bi-directional task and media and entertainment application in cloud or augmented reality. Data is one of main power, and a dedicated voice service may not be shown first in 5G era. In 5G, a voice is expected to be processed as an application program using a data connection provided by a communication system simply. Main cause of increased amount of traffic is due to an increase of contents size and an increase of the number of applications that require high data transmission rate. A streaming service (audio and video), an interactive video and a mobile internet connection may be more widely used as more devices are connected to internet. Such many applications require a connectivity which is always turned on for pushing real time information and an alarm to a user. Cloud storage and application are increased abruptly in a mobile communication platform, which may be applied to both of business and entertainment. The Cloud storage is a special use example that tows a growth of uplink data transmission rate. 5G is also used for remote business on cloud and requires far lower end-to-end latency so maintain good user experience when a touch interface is used. In the entertainment, for example, cloud game and video streaming are another core element that increases a request for mobile broadband capacity. The entertainment is essential in a smart phone and a tablet in any place including high mobile environment such as a train, a vehicle and an airplane. Another use case is the augmented reality and information search for the entertainment. Here, the augmented reality requires very low latency and instantaneous data amount.

mMTC is designed for enabling a communication between large number of low-cost devices driven by a battery, and for supporting an application such as a smart meter, a distribution, a field and a body sensor. mMTC is targeted for about a million devices per battery of about ten years and/or 1 km2. mMTC enables an embedded sensor to be connected in all fields and one of 5G use example which is anticipated dominantly. Potentially, IoT devices may be reached to 20 billion devices up to year 2020. An industrial IoT is one of area that performs an important role that enables a smart city, an asset tracking, a smart utility, agriculture and security infra by 5G.

URLLC enables a device and a machine to communicate with highly reliable, very low latency and high availability, and idealistic for vehicle communication, industrial control, factory automation, remote surgery, smart grid and public safely application. URLLC is targeted to latency of about 1 ms. URLLC includes a new service that may change industry through ultra-high reliability/low latency link such as a remote control of main infra and autonomous driving vehicle. Level of reliability and latency is essential for smart grid control, industry automation, robot engineering, drone control and adjustment.

Next, a plurality of use examples included in a triangle of FIG. 62 is described in detail.

5G is a means for providing a stream evaluated as a few hundred mega bit per second to giga bit per second and may supplement fiber-to-the-home (FTTH) and cable-based broadband (or DOCSIS). Such fast speed may be requested for forwarding TV in 4K or more (6K, 8K or more) resolution as well as virtual reality (VR) and augmented reality (AR). VR and AR applications include immersive sport game normally. A specific application may require a specific network configuration. For example, in the case of VR game, a game company needs to integrate a core server with an edge network server of a network operator to minimize latency.

An automotive is anticipated as an important new power in 5G together with many use examples for mobile communication for a vehicle. For example, the entertainment for a passenger requires high capacity and high mobile broadband simultaneously. The reason is because a future user expects a high-quality connection continuously without regard to position or speed. Another use example of automotive field is augmented reality dash board. A driver may identify an object in the dark in addition to watching a front window through the augmented reality dash board. The augmented reality dash board displays information informing to a driver for a distance and a motion of an object in overlapping manner. In the future, a wireless module enables communication between vehicles, information exchange between a vehicle and a supported infrastructure and information exchange between a vehicle and other connected device (e.g., device accompanied by a pedestrian). Safety system may lower risk of accident by guiding alternative course of conduct such that a driver may drive safe driving. The next step is expected to a remote driving vehicle or an autonomous driving vehicle. This requires very reliable and fast communication between different autonomous driving vehicles and/or between a vehicle and an infra. In the future, an autonomous driving vehicle performs overall driving activity, and a driver concentrates only on a traffic abnormality that the vehicle is unable to identify. The technical requirement of the autonomous driving vehicle requires ultra-low latency and ultra-high reliability such that traffic safety increases to the extent that a man is unable to reach.

A smart city and a smart home mentioned as a smart society may be embedded in high-density wireless sensor network. Distribution network of an intelligent sensor may identify the cost of a city or a house and the condition for maintaining energy efficiency. Similar configuration may be performed for each home. All a temperature sensor, a window and a heating controller, a burglar alarm and a home appliance are connected wirelessly. Many of such sensors requires low data transmission speed, low power and low cost. However, for example, real time HD video may be requested in a device of a specific type for surveillance.

Since energy consumption and distribution including heat or gas are highly distributed, automated control of distributed sensor network is requested. Smart grid connects the sensor with each other using digital information and communication technique so as to collect information and conduct as such. Since the information may include a service provide and a conduct of consumer, the information enables the smart grid to improve the distribution of fuel such as electricity in efficient, economic, sustainable of production and automated schemes. The smart grid may be regarded as another sensor network of which latency is low.

Health part contains many applications that may enjoy the benefit of mobile communication. The communication system may support a remote treatment that provides a clinical treatment in a remote place. This may help to reduce an obstacle due to distance and improve an access to a medical service that is not persistently used in a remote farming area. This is also used to save a life in an important treatment and an emergency. Wireless sensor network based on mobile communication may provide remote monitoring and sensor for parameters such as heart rate and blood pressure.

Wireless and mobile communication become gradually important in the industrial application field. Wiring has high installation and maintenance cost. Accordingly, the possibility of replacing cable to reconfigurable wireless link is an attractive chance in many industrial fields. However, the attainment requires that a wireless connection operates in latency, reliability and capacity like cable and simplification of the maintenance. Low latency and very low error rate are new requirements that is required to be connected in 5G.

Distribution and tracking of goods are important use examples for mobile communication that enables tracking of inventory and package to be available in any place using position-based information system. The use example of distribution and tracking of goods requires low data speed typically, but wide range and reliable position information are required.

In addition, the embodiments of the present invention may be performed to support eXtended Reality (XR). XR is a generic term of Virtual Reality (VR), Augmented Reality (AR) and Mixed Reality (MR). The VR technology provides an object or a surrounding of real world to a CG image, the AR technology provides a CG image virtually made on a real object image together, and the MR technology is a computer graphical technology that provides a real world and virtual objects which are mixed and combined.

The MR technology is similar to the AR technology on the point that a real object and a virtual object are displayed together. Whereas, in the AR technology, the virtual object is used in the form of compensating the real object, in the MR technology, the virtual object and the real object are used in equivalent characteristics.

The XR technology may be applied to a Head-Mount Display (HMD), a Head-Up Display (HUD), a mobile phone, a tablet PC, a laptop, a desktop, a TV, a digital signage, and the like, and a device to which the XR technology is applied may be referred to as an XR device. The XR device may include the first device and/or the second device described above.

The XR device may be connected to various services through communication network based on 5G communication, and the like.

Figure 63:
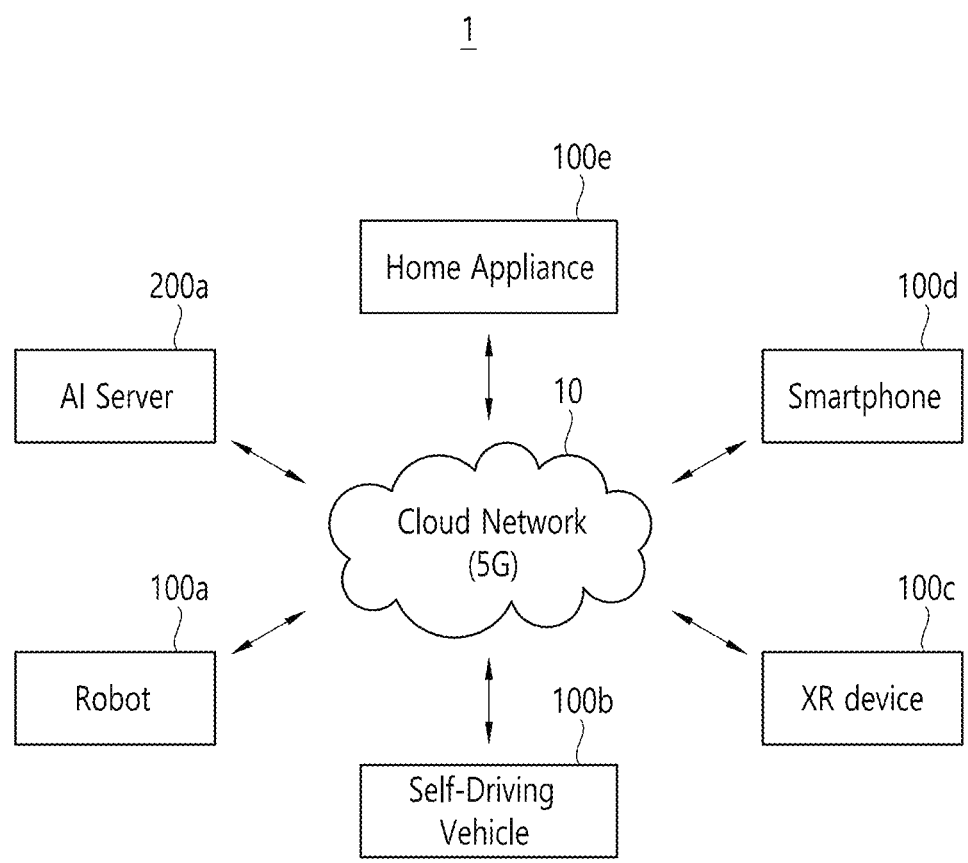
FIG. 63 shows a service system according to an embodiment of the present invention.

FIG. 63 illustrates a service system according to an embodiment of the present invention.

Referring to FIG. 63, an XR device 100c may be connected to at least one of an AI server 200a, a robot 100a, an autonomous driving vehicle 100b, a smart phone 100d or a home appliance 100e through a network 10. Here, the robot 100a, the autonomous driving vehicle 100b, the XR device 100c, the smart phone 100d or the home appliance 100e to which the AI technology is applied may be referred to as an AI device.

The network 10 may include wired/wireless communication network. The network 10 may include a cloud network. The cloud network may mean a network that configures a part of cloud computing infra or is included the cloud computing infra. Here, the cloud network may be configured by using 3G network, 4G or Long-Term Evolution (LTE) network or 5G network, and the like.

Each of the devices (100a to 100e, 200a) included in the system 1 may be connected to each other through the cloud network 10. Particularly, each the devices (100a to 100e, 200a) may communicate with each other through a base station but may also communicate with each other directly.

The AI server 200a may include a server that performs AI processing and a server that performs an operation for big data.

The AI server 200a may be connected to at least one of the robot 100a, the autonomous driving vehicle 100b, the XR device 100c, the smart phone 100d or the home appliance 100e through the network 10, and may help at least a part of the AI processing of the connected AI devices 100a to 100e.

At this time, the AI server 200a may learn artificial neural network according to machine learning algorithm replacing the AI devices 100a to 100e and store a learning model or transmit it to the AI devices 100a to 100e.

In this case, the AI server 200a may receive input data from the AI devices 100a to 100e, infer a result value for the input data received using the learning model, generate a response or control command based on the inferred result value and transmit it to the AI devices 100a to 100e.

Alternatively, the AI devices 100a to 100e may infer a result value for the input data using a learning model directly and generate a response or control command based on the inferred result value.

The XR device 100c may be implemented with a Head-Mount Display (HMD), a Head-Up Display (HUD) mounted on a vehicle, a television, a mobile phone, a smart phone, a computer, a wearable device, a home appliance machine, a digital signage, a vehicle, a fixed type robot or a mobile type robot, and the like.

The XR device 100c may analyze 3-dimensional point cloud data or image data obtained through various sensors or an external device and generate position data and attribute data, and accordingly obtain information on neighboring space or real object and render and output an XR object to output. For example, the XR device may output an XR object including additional information for an identified object by corresponding it to the corresponding identified object.

The XR device 100c may perform the operations described above by using a learning model including at least one artificial neural network. For example, the XR device 100c may identify a real object in 3-dimensional point cloud data or image data using a learning model, and provide information corresponding to the identified real object. Here, the learning model may be learned directly in the XR device 100c or learned outside such as in the AI server 200a, and the like.

In this case, the XR device 100c may perform an operation by generating a result using a learning model directly but may perform an operation by transmitting sensor information to an external device such as the AI server 200a and receiving a generated result accordingly.

The robot 100a may include a guide robot, a transport robot, a cleaning robot, a wearable robot, an entertainment robot, a pet robot, an unmanned flying robot, a drone, and the like.

The robot 100a may include a robot control module for controlling an operation, and the robot control module may mean a software module or a chip implementing it in hardware.

The robot 100a may obtain state information of the robot 100a using sensor information obtained from various types of sensors, detect (identify) neighboring environment or object, generate map data, determine a moving path or driving schedule, determine a response to a user interaction, or determine an operation.

Here, the robot 100a may use sensor information obtained from at least one sensor of a lidar, a radar and a camera for determining the moving path or driving schedule.

The XR device 100c may remote-access and/or remote-control the robot 100a through the network 10. In this case, the robot 100a may share a view or a screen with a user that uses the XR device 100c, and by controlling a driving unit based on control/interaction of the user, perform an operation or drive. At this time, the robot 100a may obtain intention information of an interaction according to a user action or voice and perform an operation by determining a response based on the obtained intention information.

The robot 100a to which the XR technology is applied may mean a robot targeted to control/interaction in an XR image. In this case, the robot 100a may be distinguished from the XR device 100c and may be interlinked with each other. When the robot 100a targeted to control/interaction in an XR image obtains sensor information from sensors including a camera, the robot 100a or the XR device 100c may generate an XR image based on the sensor information and the XR device 100c may output the generated XR image. In addition, the robot 100a may operate based on a control signal input through the XR device 100c or a user interaction.

For example, a user may identify an XR image corresponding to a view point of the robot 100a which is remotely interlinked through an external device such as the XR device 100c, adjust an autonomous driving path of the robot 100a, control an operation or a driving, or identify information of a neighboring object.

The autonomous driving vehicle 100b may include a mobile robot, a vehicle, a train, a manned/unmanned flying object, a ship, and the like.

The autonomous driving vehicle 100b may include an autonomous driving control module for controlling autonomous driving function, and the autonomous driving control module may mean a software module or a chip implementing it as hardware. The autonomous driving control module may be included inside of the autonomous driving vehicle 100b as a component of the autonomous driving vehicle 100b but may be constructed as separate hardware outside of the autonomous driving vehicle 100b and connected to it.

The autonomous driving vehicle 100b may obtain state information of the autonomous driving vehicle 100b using sensor information obtained from various types of sensors, detect (identify) neighboring environment and object, generate map data, determine a moving path or driving schedule, determine a response to a user interaction, or determine an operation.

Here, the autonomous driving vehicle 100b may use sensor information obtained from at least one sensor of a lidar, a radar and a camera for determining the moving path or driving schedule, like the robot 100a.

Particularly, the autonomous driving vehicle 100b may identify a shaded area or environment or object of an area of a predetermined distance or more by receiving sensor information from external devices or receive information directly identified from the external devices.

The XR device 100c may remote-access and/or remote-control the autonomous driving vehicle 100b through the network 10. In this case, the autonomous driving vehicle 100b may share a view or a screen with a user that uses the XR device 100c, and by controlling a driving unit based on control/interaction of the user, perform an operation or drive. At this time, the autonomous driving vehicle 100b may obtain intention information of an interaction according to a user action or voice and perform an operation by determining a response based on the obtained intention information.

The autonomous driving vehicle 100b to which the XR technology is applied may mean an autonomous driving vehicle provided with a means for providing an XR image or an autonomous driving vehicle targeted to control/interaction in an XR image. Particularly, the autonomous driving vehicle 100b targeted to control/interaction in an XR image may be distinguished from the XR device 100c and may be interlinked with each other.

The autonomous driving vehicle 100b provided with a means for providing an XR image may obtain sensor information from sensors including a camera and output a generated XR image based on the obtained sensor information. For example, the autonomous driving vehicle 100b may be provided with a HUD and output an XR image, and accordingly, provide an XR object corresponding to a real object or an object in an image to a passenger.

At this time, in the case that the XR object is output on a HUD, the XR object may be output such that at least a part of the XR object is overlapped with a real object facing a view of a passenger. On the other hand, in the case that the XR object is output on a display provided inside of the autonomous driving vehicle 100b, the XR object may be output such that at least a part of the XR object is overlapped with an object in an image. For example, the autonomous driving vehicle 100b may output XR objects corresponding to an object such as a lane, another vehicle, a traffic light, a traffic sign board, a bicycle, a pedestrian, a building.

When the autonomous driving vehicle 100b targeted to control/interaction in an XR image obtains sensor information from sensors including a camera, the autonomous driving vehicle 100b or the XR device 100c may generate an XR image based on the sensor information, and the XR device 100c may output the generated XR image. In addition, the autonomous driving vehicle 100b may operate based on a control signal input through the XR device 100c or a user interaction.

The XR device 100c may be provided inside of the robot 100a and/or the autonomous driving vehicle 100b and provide separate VR contents to a user or provide an image inside/outside of the robot 100a and/or the autonomous driving vehicle 100b to a user.

In addition, the XR device 100c may be used for various services such as entertainment, sports, education, traffic, medicine, electronic commerce, manufacture, national defense, and the like. For example, a movie, a theme park, sports may be experienced and/or watched through the XR device 100c, and the XR device 100c may support medical practice, a training in dangerous environment such as a fire site. In addition, through the XR device 100c, a pathfinding service such as AR Ways utilizing a position recognition and map generation (SLAM) technique may be provided, and in addition, shopping or purchasing of an object is available by accessing a virtual shopping mall.

According to the present invention, it is possible to efficiently transmit VR content (360 content) in an environment that supports next-generation hybrid broadcast using a territorial broadcasting network and the Internet network.

According to the present invention, it is possible to provide interactive experience to a user who is enjoying 360 content.

According to the present invention, it is possible to perform signaling to exactly reflect a producer of 360 content in user's consumption of 360 content.

According to the present invention, it is possible to efficiently increase transmission capacity and deliver necessary information in transmission of 360 content.

According to the present invention, it is possible to efficiently provide an overlay to a 360 video and efficiently display additional information based on the user's vision.

According to the present invention, it is possible to provide a link with a specific target through an overlay for a 360 video.

According to the present invention, it is possible to provide a link for efficiently converting a screen and providing additional information through an overlay.

According to the present invention, it is possible to efficiently store and transmit signaling information on 360-degree video data using an International Organization for Standardization (ISO)-based media file format such as an ISO base media file format (ISOBMFF).

According to the present invention, it is possible to transmit signaling information on 360-degree video data through HyperText Transfer Protocol (HTTP)-based adaptive streaming, such as Dynamic Adaptive Streaming over HTTP (DASH).

According to the present invention, it is possible to store and transmit signaling information on 360-degree video data through Supplemental enhancement information (SEI) message or Video Usability Information (VUI), thereby enhancing overall transmission efficiency.

What is claimed is:

1. A 360-degree image and video data processing method performed by a 360-degree image and video reception apparatus, the method comprising:
receiving 360-degree image and video data;
decapsulating an encoded picture and metadata from the 360-degree image and video data;
decoding the encoded picture; and
rendering the decoded picture and an overlay based on the metadata,
wherein the metadata includes overlay related metadata,
wherein the overlay related metadata includes mode information for composing the overlay, and the mode information has a value for representing that a source pixel for the overlay is placed over a destination pixel,
wherein the overlay related metadata further includes region information for the overlay, the region information including width information for a region for the overlay and height information for the region for the overlay,
wherein the overlay is associated with an alpha plane,
wherein width and height of the alpha plane are same as width and height of the overlay, and the alpha plane is included in an image item or a video track, and the alpha plane and the overlay are linked based on a reference of an auxiliary value,
wherein the overlay related metadata further includes information for a specific region related to the overlay,
wherein the information for the specific region includes information on an azimuth of a center, information on an elevation of the center, information on a tilt angle of the center, information on an azimuth range of the specific region and information on an elevation range of the specific region.

2. The method of claim 1, wherein a sample of an alpha plane video track has a same composition time as a sample of an overlay video track when the overlay is included in the video track, and
wherein the alpha plane video track represents a video track including the mode information and the overlay video track represents a video track including information on the overlay.

3. The method of claim 1, wherein the region information further includes top information for the region for the overlay, and left information for the region for the overlay.

4. The method of claim 1,
wherein the decoded picture includes background media, and
wherein in response that both the overlay and the background media are packed together in a same video track or a same image item, a region for the overlay is not overlapped with a region of the background media.

5. The method of claim 1, wherein the overlay related metadata is included in at least one of an ItemPropertyContainerBox or a ProjectedOmniVideoBox.

6. The method of claim 1, wherein the overlay related metadata further includes group information for the overlay and main media to be rendered with the overlay,
wherein the decoded picture comprises the main media, and
wherein the group information includes num_entities_in_group field indicating a number of grouped entities.

7. The method of claim 1, wherein the overlay related metadata further includes shape type information for the overlay representing whether the overlay is rendered on a sphere region.

8. A 360-degree image and video data processing method performed by a 360-degree image and video transmission apparatus, the method comprising:
generating a 360-degree image and video;
generating a picture from the 360-degree image and video;
generating metadata about the 360-degree image and video;
encoding the picture; and
performing a process for storage or transmission of the encoded picture and the metadata,
wherein the metadata includes overlay related metadata,
wherein the overlay related metadata includes mode information for composing an overlay, and the mode information has a value for representing that a source pixel for the overlay is placed over a destination pixel,
wherein the overlay related metadata further includes region information for the overlay, the region information including width information for a region for the overlay and height information for the region for the overlay,
wherein the overlay is associated with an alpha plane,
wherein width and height of the alpha plane are same as width and height of the overlay, and the alpha plane is included in an image item or a video track, and the alpha plane and the overlay are linked based on a reference of an auxiliary value,
wherein the overlay related metadata further includes information for a specific region related to the overlay,
wherein the information for the specific region includes information on an azimuth of a center, information on an elevation of the center, information on a tilt angle of the center, information on an azimuth range of the specific region and information on an elevation range of the specific region.

9. The method of claim 8, wherein a sample of an alpha plane video track has a same composition time as a sample of an overlay video track when the overlay is included in the video track, and
wherein the alpha plane video track represents a video track including the mode information and the overlay video track represents a video track including information on the overlay.

10. The method of claim 8, wherein the region information further includes top information for the region for the overlay, and left information for the region for the overlay.

11. The method of claim 8,
wherein the encoded picture includes background media, and
wherein in response that both the overlay and the background media are packed together in a same video track or a same image item, a region for the overlay is not overlapped with a region of the background media.

12. The method of claim 8, wherein the overlay related metadata is included in at least one of an ItemPropertyContainerBox or a ProjectedOmniVideoBox.

13. The method of claim 8, wherein the overlay related metadata further includes group information for the overlay and main media to be rendered with the overlay,
wherein the encoded picture comprises the main media, and
wherein the group information includes num_entities_in_group field indicating a number of grouped entities.

14. The method of claim 8, wherein the overlay related metadata further includes shape type information for the overlay representing whether the overlay is rendered on a sphere region.

15. A 360-degree image and video reception apparatus comprising:
- at least one hardware processor, wherein the at least one hardware processor is configured to:
- receive 360-degree image and video data and decapsulate an encoded picture and metadata from the 360-degree image and video data;
- decode the encoded picture; and
- render the decoded picture and an overlay based on the metadata,
- wherein the metadata includes overlay related metadata,
- wherein the renderer renders the overlay based on the overlay related metadata,
- wherein the overlay related metadata includes mode information for composing the overlay, and the mode information has a value for representing that a source pixel for the overlay is placed over a destination pixel,
- wherein the overlay related metadata further includes region information for the overlay, the region information including width information for a region for the overlay and height information for the region for the overlay,
- wherein the overlay is associated with an alpha plane,
- wherein width and height of the alpha plane are same as width and height of the overlay, and the alpha plane is included in an image item or a video track, and the alpha plane and the overlay are linked based on a reference of an auxiliary value,
- wherein the overlay related metadata further includes information for a specific region related to the overlay,
- wherein the information for the specific region includes information on an azimuth of a center, information on an elevation of the center, information on a tilt angle of the center, information on an azimuth range of the specific region and information on an elevation range of the specific region.

16. A 360-degree image and video data transmission apparatus comprising:
- a first hardware processor configured to generate a 360-degree image and video, generate a picture from the 360-degree image and video, and generate metadata about the 360-degree image and video;
- an encoder configured to encode the picture; and
- a second hardware processor configured to transmit the encoded picture and the metadata,
- wherein the metadata includes overlay related metadata,
- wherein the overlay related metadata includes mode information for composing an overlay, and the mode information has a value for representing that a source pixel for the overlay is placed over a destination pixel,
- wherein the overlay related metadata further includes region information for the overlay, the region information including width information for a region for the overlay and height information for the region for the overlay,
- wherein the overlay is associated with an alpha plane,
- wherein width and height of the alpha plane are same as width and height of the overlay, and the alpha plane is included in an image item or a video track, and the alpha plane and the overlay are linked based on a reference of an auxiliary value,
- wherein the overlay related metadata further includes information for a specific region related to the overlay,
- wherein the information for the specific region includes information on an azimuth of a center, information on an elevation of the center, information on a tilt angle of the center, information on an azimuth range of the specific region and information on an elevation range of the specific region.

* * * * *